(12) United States Patent
Davis et al.

(10) Patent No.: US 9,015,860 B2
(45) Date of Patent: Apr. 21, 2015

(54) BEHAVIORAL FINGERPRINTING VIA DERIVED PERSONAL RELATION

(71) Applicant: Elwha LLC, Bellevue, WA (US)

(72) Inventors: Marc E. Davis, San Francisco, CA (US);
Matthew G. Dyor, Bellevue, WA (US);
Daniel A. Gerrity, Seattle, WA (US);
Xuedong Huang, Bellevue, WA (US);
Roderick A. Hyde, Redmond, WA (US);
Royce A. Levien, Lexington, MA (US);
Richard T. Lord, Tacoma, WA (US);
Robert W. Lord, Seattle, WA (US);
Mark A. Malamud, Seattle, WA (US);
Nathan P. Myhrvold, Bellevue, WA (US);
Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/631,667

(22) Filed: Sep. 28, 2012

(65) Prior Publication Data
US 2013/0117214 A1 May 9, 2013

Related U.S. Application Data

(63) Continuation-in-part of application No. 13/373,685, filed on Nov. 23, 2011, now Pat. No. 8,555,077, and a continuation-in-part of application No. 13/373,684, filed on Nov. 23, 2011, which is a continuation-in-part (Continued)

(51) Int. Cl.
*H04L 9/32* (2006.01)
*G06N 5/02* (2006.01)
*G06Q 10/08* (2012.01)
*G06Q 50/00* (2012.01)
*H04L 29/10* (2006.01)

(52) U.S. Cl.
CPC .............. *G06N 5/02* (2013.01); *G06Q 10/0833* (2013.01); *G06Q 50/01* (2013.01)

(58) Field of Classification Search
None
See application file for complete search history.

(56) References Cited

U.S. PATENT DOCUMENTS 6,084,953 A    7/2000  Bardenheuer et al.
6,957,199 B1  10/2005  Fisher
(Continued)

FOREIGN PATENT DOCUMENTS

WO    WO 2011/119273 A3    9/2011

OTHER PUBLICATIONS

Personalization Systems and Processes Review based on a Predetermined User Interface Categorization. Germanakos et al. Proceedings of the III INternational conference on communication and reality, digital utopia in the media: From discourses to facts. May 2005.*

(Continued)

*Primary Examiner* — Venkat Perungavoor

(57) ABSTRACT

Disclosed herein are example embodiments for behavioral fingerprinting via derived personal relation. For certain example embodiments, at least one indication of personal relation for at least one authorized user may be derived via at least one user-device interaction, and the at least one indication of personal relation may be incorporated into at least one behavioral fingerprint that is associated with the at least one authorized user, the at least one behavioral fingerprint including one or more indicators of utilization of one or more user devices by the at least one authorized user.

60 Claims, 30 Drawing Sheets

Related U.S. Application Data of application No. 13/373,680, filed on Nov. 23, 2011, now Pat. No. 8,689,350, which is a continuation-in-part of application No. 13/373,677, filed on Nov. 23, 2011, now Pat. No. 8,688,980, and a continuation-in-part of application No. 13/373,682, filed on Nov. 23, 2011, and a continuation-in-part of application No. 13/475,564, filed on May 18, 2012, now Pat. No. 8,713,704, and a continuation-in-part of application No. 13/538,385, filed on Jun. 29, 2012, now Pat. No. 8,869,241, and a continuation-in-part of application No. 13/552,502, filed on Jul. 18, 2012, and a continuation-in-part of application No. 13/563,599, filed on Jul. 31, 2012, and a continuation-in-part of application No. 13/602,061, filed on Aug. 31, 2012.

(60) Provisional application No. 61/632,836, filed on Sep. 24, 2011, provisional application No. 61/572,309, filed on Oct. 13, 2011.

(56) References Cited

U.S. PATENT DOCUMENTS

| | | |
|---|---|---|
| 7,433,960 B1 | 10/2008 | Dube et al. |
| 7,577,987 B2 | 8/2009 | Mizrah |
| 7,689,418 B2 | 3/2010 | Ramaswamy et al. |
| 7,827,592 B2 | 11/2010 | Fifer et al. |
| 7,908,237 B2 | 3/2011 | Angell et al. |
| 7,975,150 B1 | 7/2011 | Lillibridge et al. |
| 8,020,005 B2 | 9/2011 | Mani et al. |
| 8,051,468 B2 | 11/2011 | Davis et al. |
| 8,155,999 B2 | 4/2012 | de Boer et al. |
| 8,161,530 B2 | 4/2012 | Meehan et al. |
| 8,290,908 B2 | 10/2012 | McCarthy et al. |
| 8,316,237 B1 | 11/2012 | Felsher et al. |
| 8,358,579 B1 | 1/2013 | Walsh et al. |
| 8,392,969 B1 | 3/2013 | Park et al. |
| 8,522,147 B2 | 8/2013 | Bladel et al. |
| 8,689,350 B2 | 4/2014 | Davis et al. |
| 8,713,704 B2 | 4/2014 | Davis et al. |
| 8,726,036 B2 | 5/2014 | Kornafeld et al. |
| 8,732,089 B1 | 5/2014 | Fang et al. |
| 8,776,168 B1 | 7/2014 | Gibson et al. |
| 8,806,598 B2 | 8/2014 | Assam |
| 8,819,789 B2 | 8/2014 | Orttung et al. |
| 2002/0046105 A1 | 4/2002 | Gardenswartz et al. |
| 2002/0073046 A1 | 6/2002 | David |
| 2003/0220980 A1 | 11/2003 | Crane |
| 2004/0002329 A1 | 1/2004 | Bhatia et al. |
| 2004/0193892 A1 | 9/2004 | Tamura et al. |
| 2005/0071643 A1 | 3/2005 | Moghe |
| 2005/0100198 A1 | 5/2005 | Nakano et al. |
| 2005/0171832 A1 | 8/2005 | Hull et al. |
| 2005/0268107 A1 | 12/2005 | Harris et al. |
| 2006/0020814 A1 | 1/2006 | Lieblich et al. |
| 2006/0133651 A1 | 6/2006 | Polcha et al. |
| 2006/0218153 A1 | 9/2006 | Voon et al. |
| 2006/0224898 A1 | 10/2006 | Ahmed |
| 2007/0067853 A1 | 3/2007 | Ramsey |
| 2007/0245157 A1 | 10/2007 | Giobbi et al. |
| 2007/0245158 A1 | 10/2007 | Giobbi et al. |
| 2007/0250550 A1 | 10/2007 | Berninger |
| 2008/0091453 A1 | 4/2008 | Meehan et al. |
| 2008/0092209 A1 | 4/2008 | Davis et al. |
| 2008/0098456 A1 | 4/2008 | Alward et al. |
| 2008/0146193 A1 | 6/2008 | Bentley et al. |
| 2008/0172461 A1 | 7/2008 | Thattai et al. |
| 2008/0281668 A1 | 11/2008 | Nurminen |
| 2009/0006846 A1 | 1/2009 | Rosenblatt |
| 2009/0025081 A1 | 1/2009 | Quigley et al. |
| 2009/0030985 A1 | 1/2009 | Yuan |
| 2009/0070435 A1 | 3/2009 | Abhyanker |
| 2009/0113040 A1 | 4/2009 | Zalewski |
| 2009/0298514 A1 | 12/2009 | Ullah |
| 2010/0073202 A1 | 3/2010 | Mazed |
| 2010/0115592 A1 | 5/2010 | Belz et al. |
| 2010/0115610 A1 | 5/2010 | Tredoux et al. |
| 2010/0130165 A1 | 5/2010 | Snyder et al. |
| 2010/0169343 A1 | 7/2010 | Kenedy et al. |
| 2010/0174709 A1 | 7/2010 | Hansen et al. |
| 2010/0179857 A1 | 7/2010 | Kalaboukis et al. |
| 2010/0186066 A1 | 7/2010 | Pollard |
| 2010/0250676 A1 | 9/2010 | Ufford et al. |
| 2010/0299292 A1 | 11/2010 | Collazo |
| 2010/0319053 A1 | 12/2010 | Gharabally |
| 2011/0016534 A1 | 1/2011 | Jakobsson et al. |
| 2011/0029887 A1 | 2/2011 | Pearson et al. |
| 2011/0072487 A1 | 3/2011 | Hadar et al. |
| 2011/0112898 A1 | 5/2011 | White |
| 2011/0145927 A1 | 6/2011 | Hubner et al. |
| 2011/0196926 A1 | 8/2011 | Crawford |
| 2011/0225048 A1 | 9/2011 | Nair |
| 2011/0238482 A1 | 9/2011 | Carney et al. |
| 2011/0239276 A1 | 9/2011 | Garcia Garcia et al. |
| 2011/0251823 A1 | 10/2011 | Davis et al. |
| 2011/0276486 A1 | 11/2011 | Kuba |
| 2011/0302640 A1 | 12/2011 | Liu et al. |
| 2011/0314017 A1 | 12/2011 | Yariv et al. |
| 2011/0314559 A1 | 12/2011 | Jakobsson |
| 2011/0321157 A1 | 12/2011 | Davis et al. |
| 2012/0030764 A1 | 2/2012 | White et al. |
| 2012/0041822 A1 | 2/2012 | Landry et al. |
| 2012/0131034 A1 | 5/2012 | Kenedy et al. |
| 2012/0136936 A1 | 5/2012 | Quintuna |
| 2012/0137340 A1 | 5/2012 | Jakobsson et al. |
| 2012/0144468 A1 | 6/2012 | Pratt et al. |
| 2012/0159647 A1 | 6/2012 | Sanin et al. |
| 2012/0198491 A1 | 8/2012 | O'Connell et al. |
| 2012/0198532 A1 | 8/2012 | Headley |
| 2012/0226701 A1 | 9/2012 | Singh |
| 2012/0284602 A1 | 11/2012 | Seed et al. |
| 2012/0284779 A1 | 11/2012 | Ingrassia, Jr. et al. |
| 2012/0323685 A1 | 12/2012 | Ullah |
| 2013/0013404 A1 | 1/2013 | Suprock et al. |
| 2013/0019289 A1 | 1/2013 | Gonser et al. |
| 2013/0024916 A1 | 1/2013 | Evans |
| 2013/0036458 A1 | 2/2013 | Liberman et al. |
| 2013/0036459 A1 | 2/2013 | Liberman et al. |
| 2013/0042327 A1 | 2/2013 | Chow |
| 2013/0054433 A1 | 2/2013 | Giard et al. |
| 2013/0054470 A1 | 2/2013 | Campos et al. |
| 2013/0055367 A1 | 2/2013 | Kshirsagar et al. |
| 2013/0061285 A1 | 3/2013 | Donfried et al. |
| 2013/0067546 A1 | 3/2013 | Thavasi et al. |
| 2013/0091262 A1 | 4/2013 | Rajakarunanayake et al. |
| 2013/0096980 A1 | 4/2013 | Basavapatna et al. |
| 2013/0097669 A1 | 4/2013 | Davis et al. |
| 2013/0097673 A1 | 4/2013 | Meehan et al. |
| 2013/0097683 A1 | 4/2013 | Davis et al. |
| 2013/0102283 A1 | 4/2013 | Lau et al. |
| 2013/0133052 A1 | 5/2013 | Davis et al. |
| 2013/0133054 A1 | 5/2013 | Davis et al. |
| 2013/0159413 A1 | 6/2013 | Davis et al. |
| 2013/0167207 A1 | 6/2013 | Davis et al. |
| 2013/0191887 A1 | 7/2013 | Davis et al. |
| 2013/0291099 A1 | 10/2013 | Donfried et al. |
| 2013/0305325 A1 | 11/2013 | Headley |
| 2013/0305336 A1 | 11/2013 | Konertz et al. |
| 2014/0158760 A1 | 6/2014 | Seker |

OTHER PUBLICATIONS

Creating Adaptive Web Sites Through Usage-based Clustering of URLS. Mobasher et al.IEEE(1999).*
PCT International Search Report; International App. No. PCT/US13/48664; Dec. 3, 2013; pp. 1-3.
Trejo et al.; "Using Cloud Computing MapReduce operations to Detect DDoS Attacks on DNS servers"; Proceedings of the 4th Iberian Grid Infrastructure Conference; pdf created Mar. 1, 2013; pp. 1-13.
Xie et al.; "Privacy-Preserving Matchmaking for Mobile Social Networking Secure Against Malicious Users"; 2011 Ninth Annual International Conference on Privacy, Security and Trust; bearing a date of Jul. 11, 2011; pp. 1-8; IEEE.

(56) References Cited

OTHER PUBLICATIONS

U.S. Appl. No. 13/373,682, Davis et al.
Brainard, John; Juels, Ari; Rivest, Ronald L.; Szydlo, Michael; Yung, Moti; "Fourth-Factor Authentication: Somebody You Know"; ACM CCS; 2006; pp. 168-178; Alexandria, Virginia.
Diep, Francie; "Your finger swipe could become your password"; NBC News Future Tech; Oct. 2, 2012; http://www.nbcnews.com/technology/futureoftech/your-finger-swipe-could-become-your-password-6215845.
Gianchandani, Erwin; "DARPA Seeking to Develop a 'Cognitive Fingerprint'"; Computing Community Consortium Blog; Jan. 27, 2012; http://www.cccblog.org/2012/01/27/drapa-seeking-to-develop-a-cognitive-fingerprint/.
Jacobs, Tom; "Identity Protection That Really Clicks"; Pacific Standard Magazine; May 3, 2012; http://www.psmag.com/business-economics/identity-protection-that-really-clicks-42048/.
Jorgensen, Zach; Yu, Ting; "On Mouse Dynamics as a Behavioral Biometric for Authentication"; 2011; pp. 476-482; Department of Computer Science, North Carolina State University; Releigh, North Carolina.
Riva, Oriana; Qin, Chuan; Strauss, Karin; Lymberopoulos, Dimitrios; "Progressive authentication: deciding when to authenticate on mobile phones"; Microsoft Research; Aug. 8, 2012; http://research.microsoft.com/apps/pubs/default/aspx?id=168102.
Monrose et al.; "Keystroke dynamics as a biometric for authentication"; Future Generation Computer Systems; Mar. 3, 1999; pp. 351-359; vol. 16; © 2000 Elsevier Science B.V.
Nauman et al.; "TOKEN: Trustable Keystroke-Based Authentication for Web-Based Applications on Smartphones"; ISA 2010, CCIS 76; 2010 (created on May 9, 2014); pp. 286-297; © Springer-Verlap Berlin Heidelberg 2010.

* cited by examiner

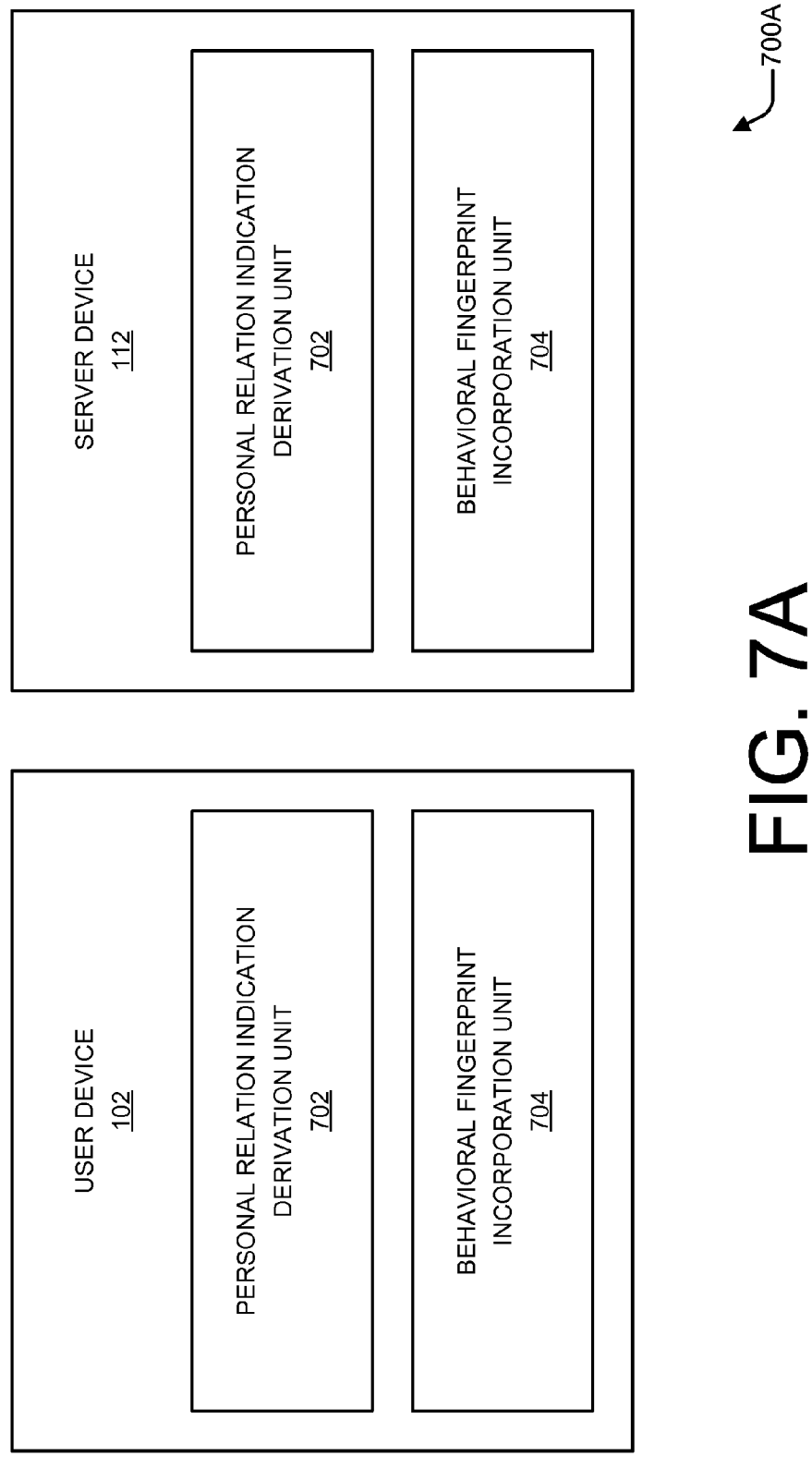

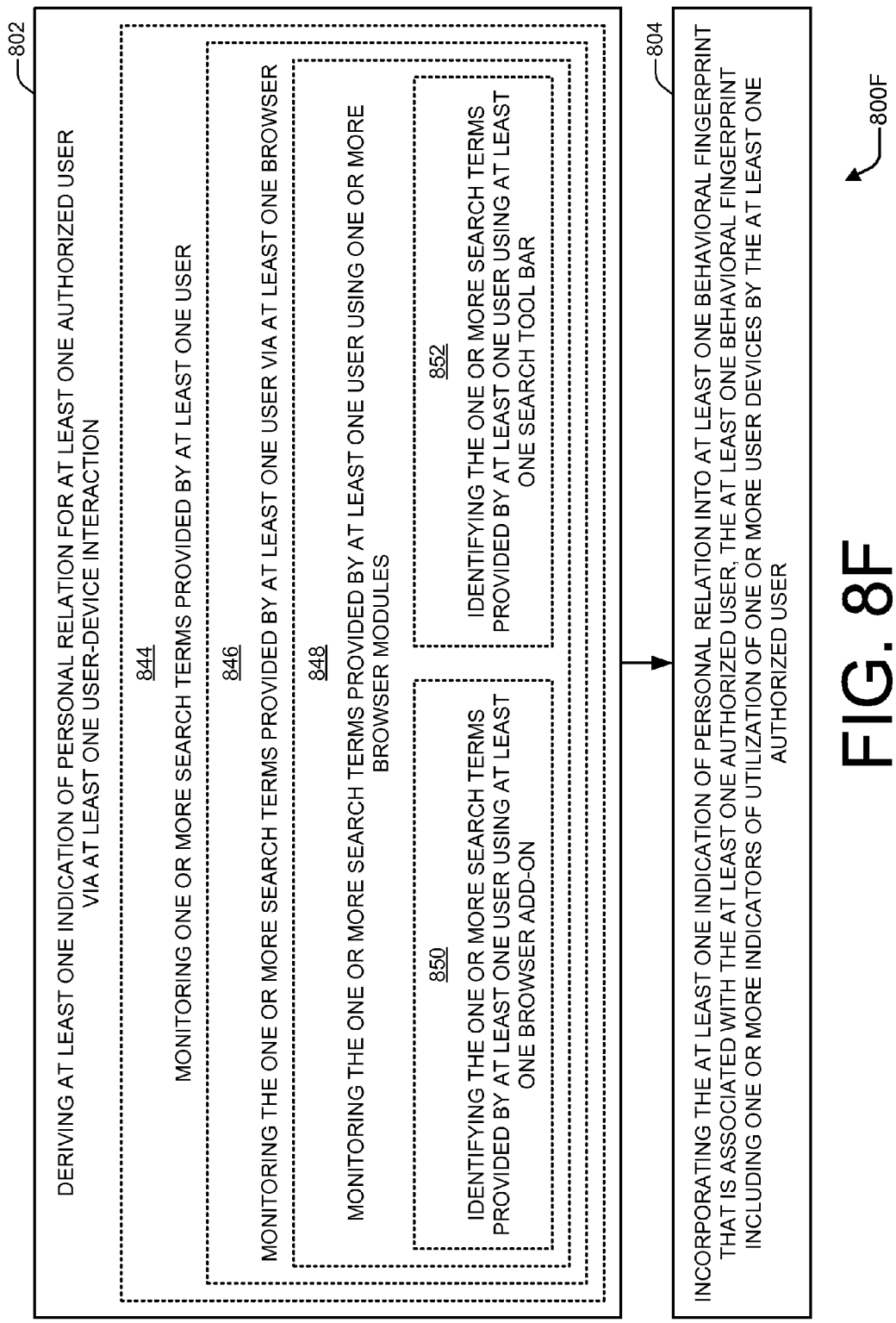

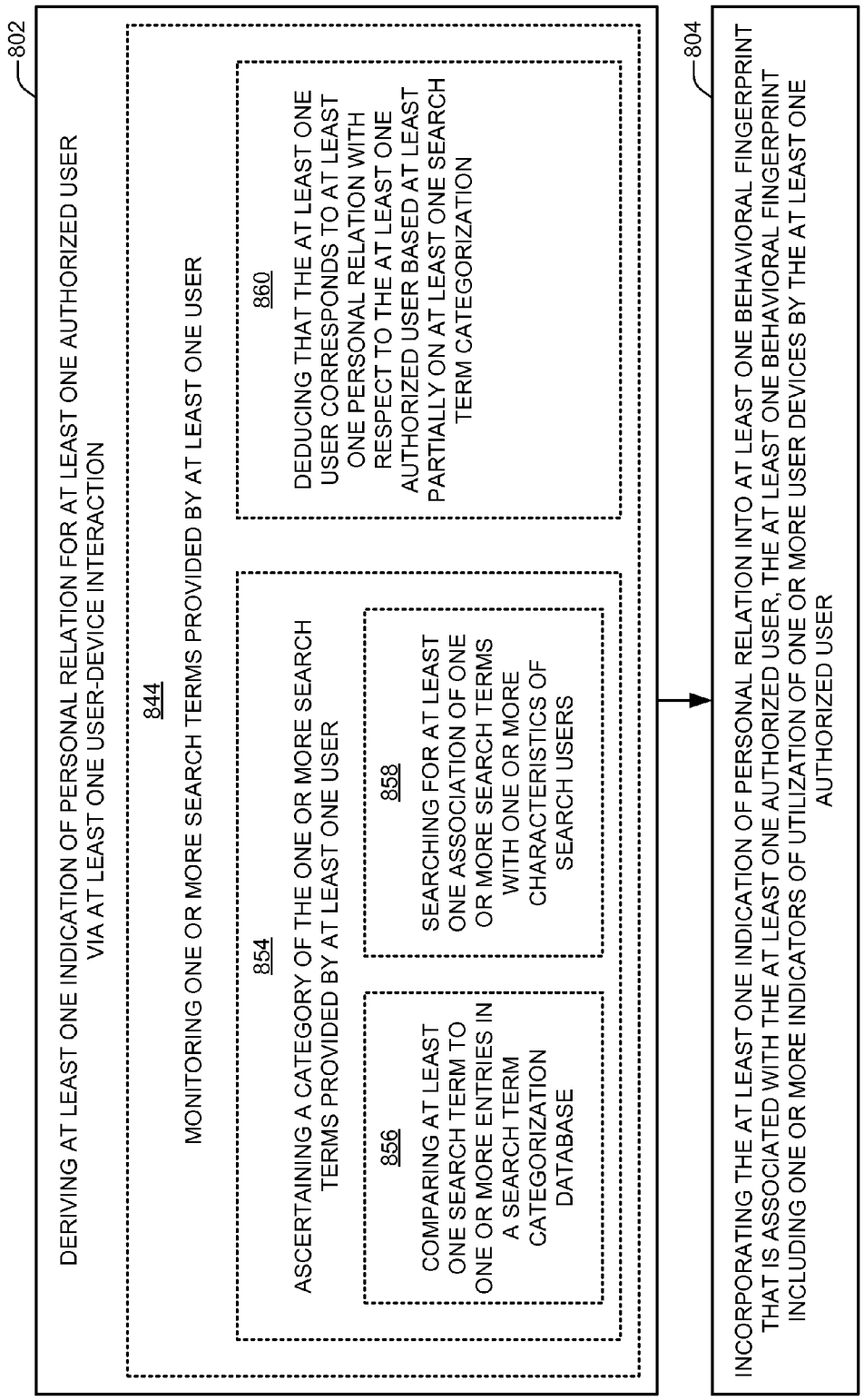

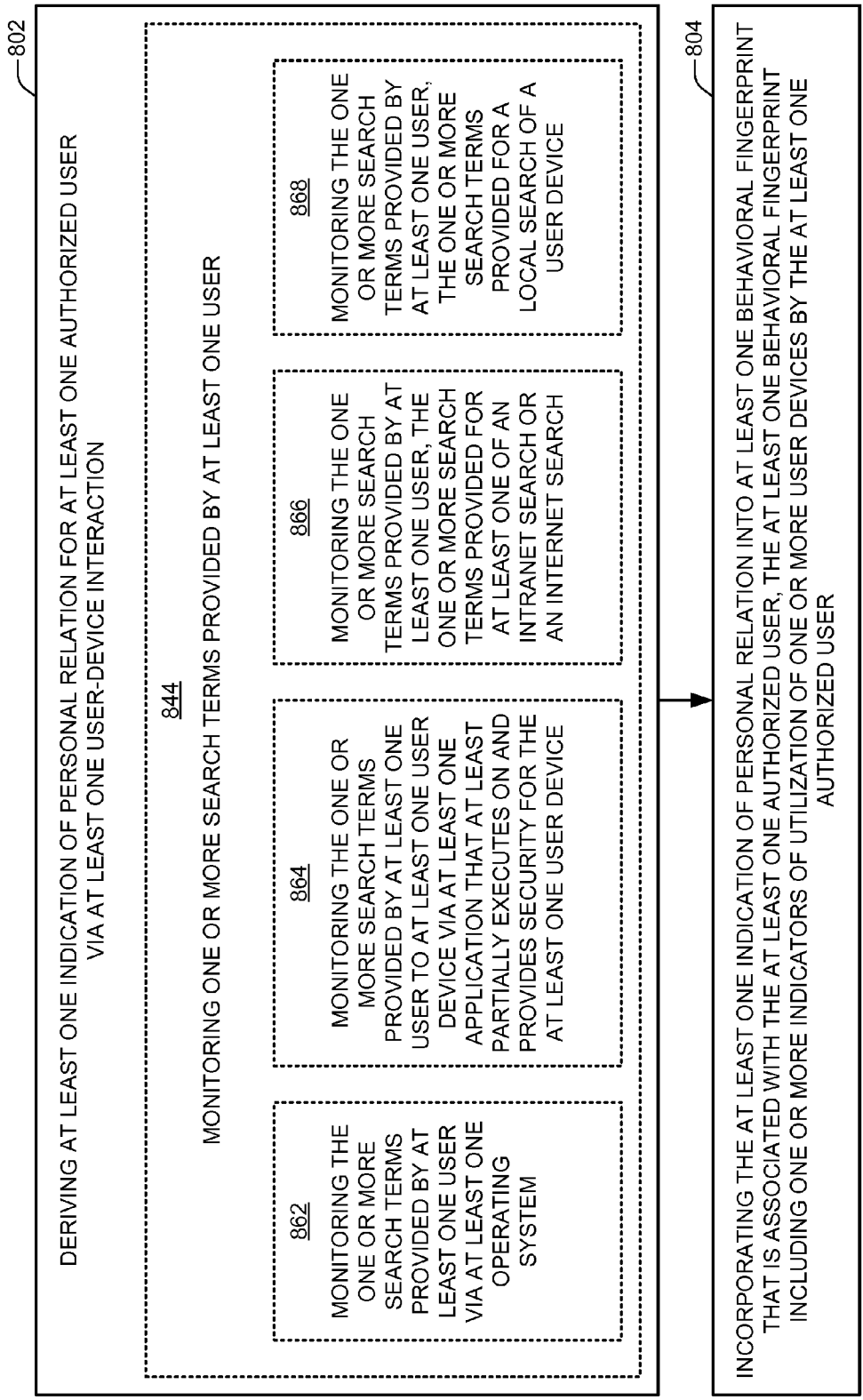

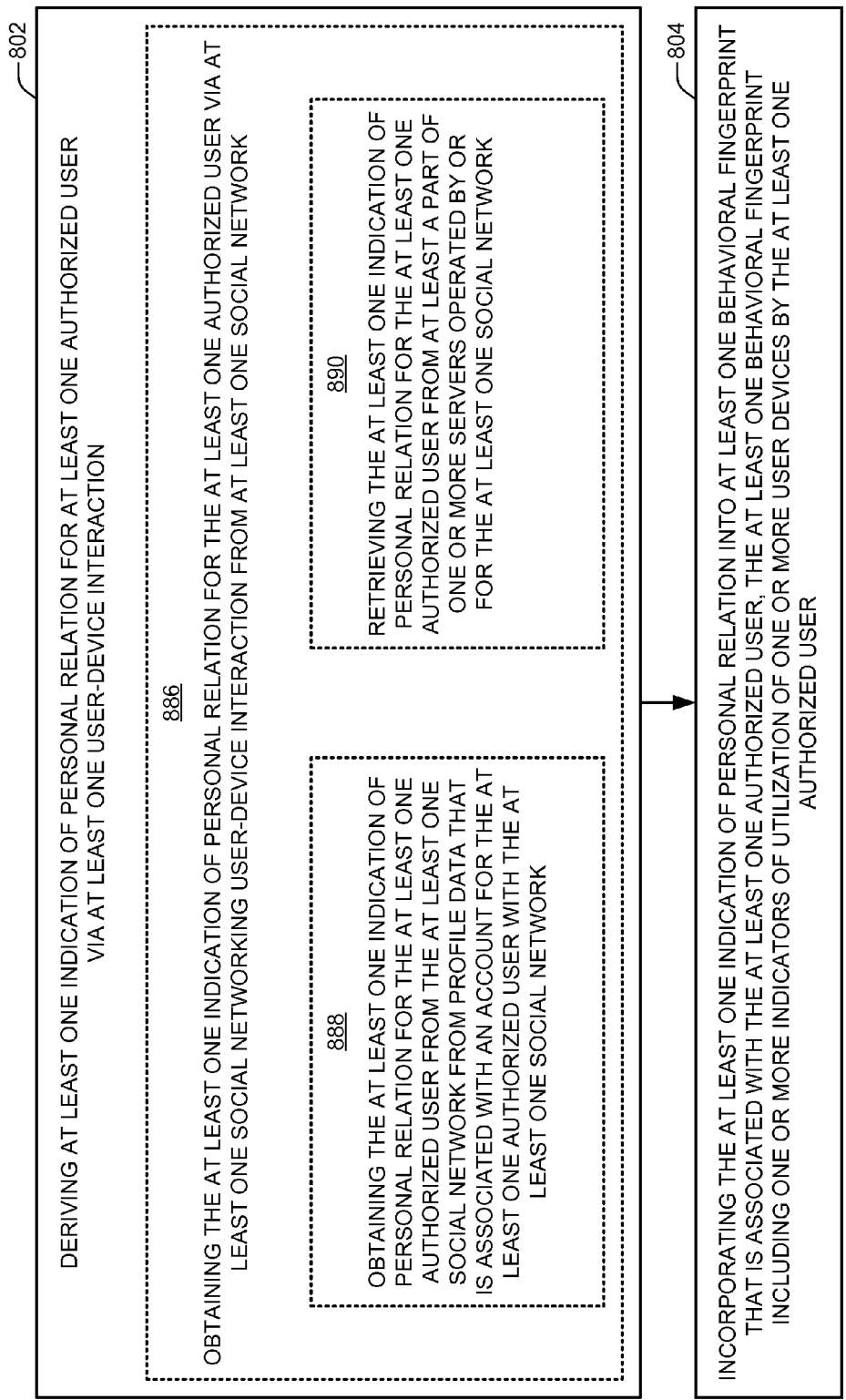

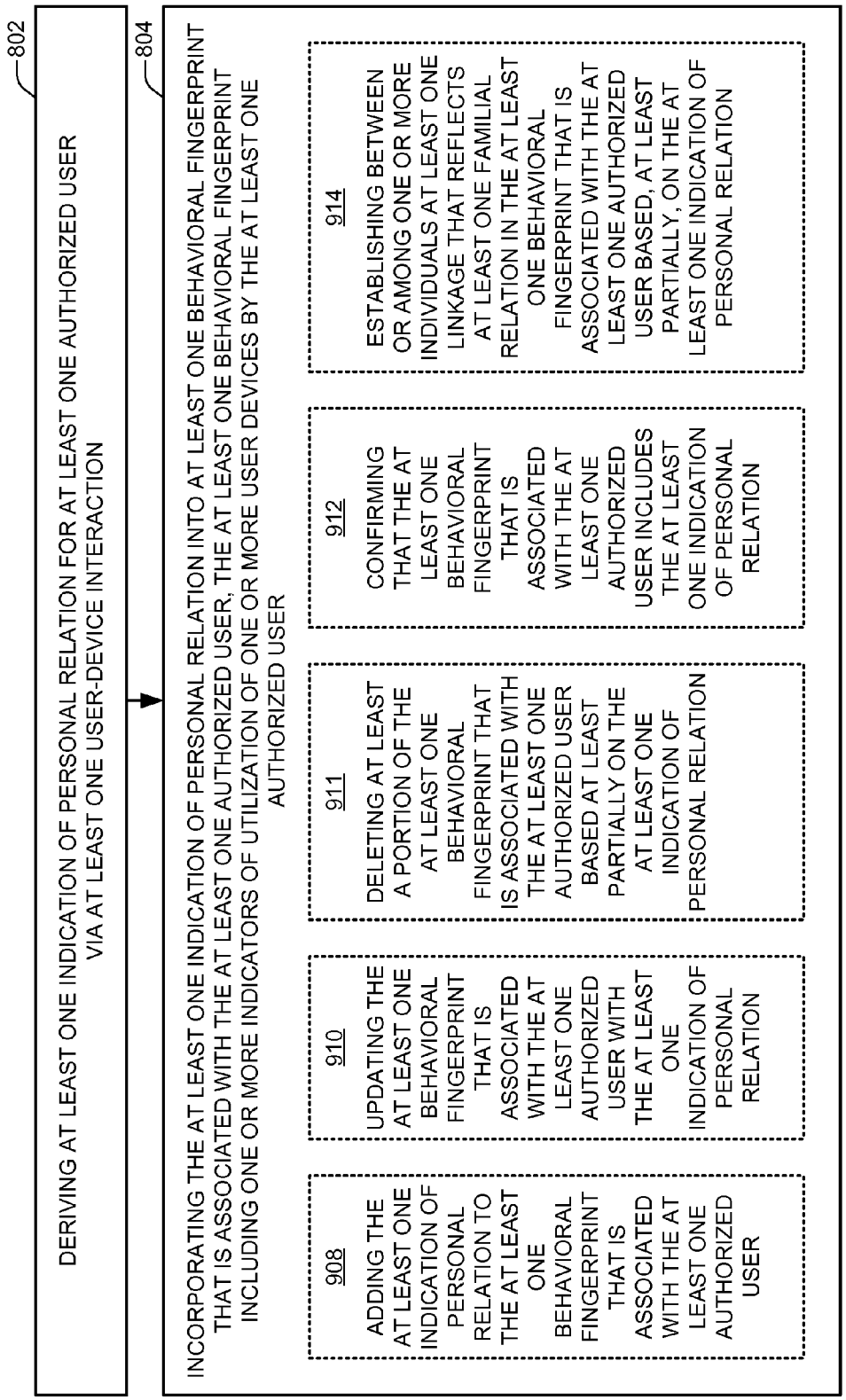

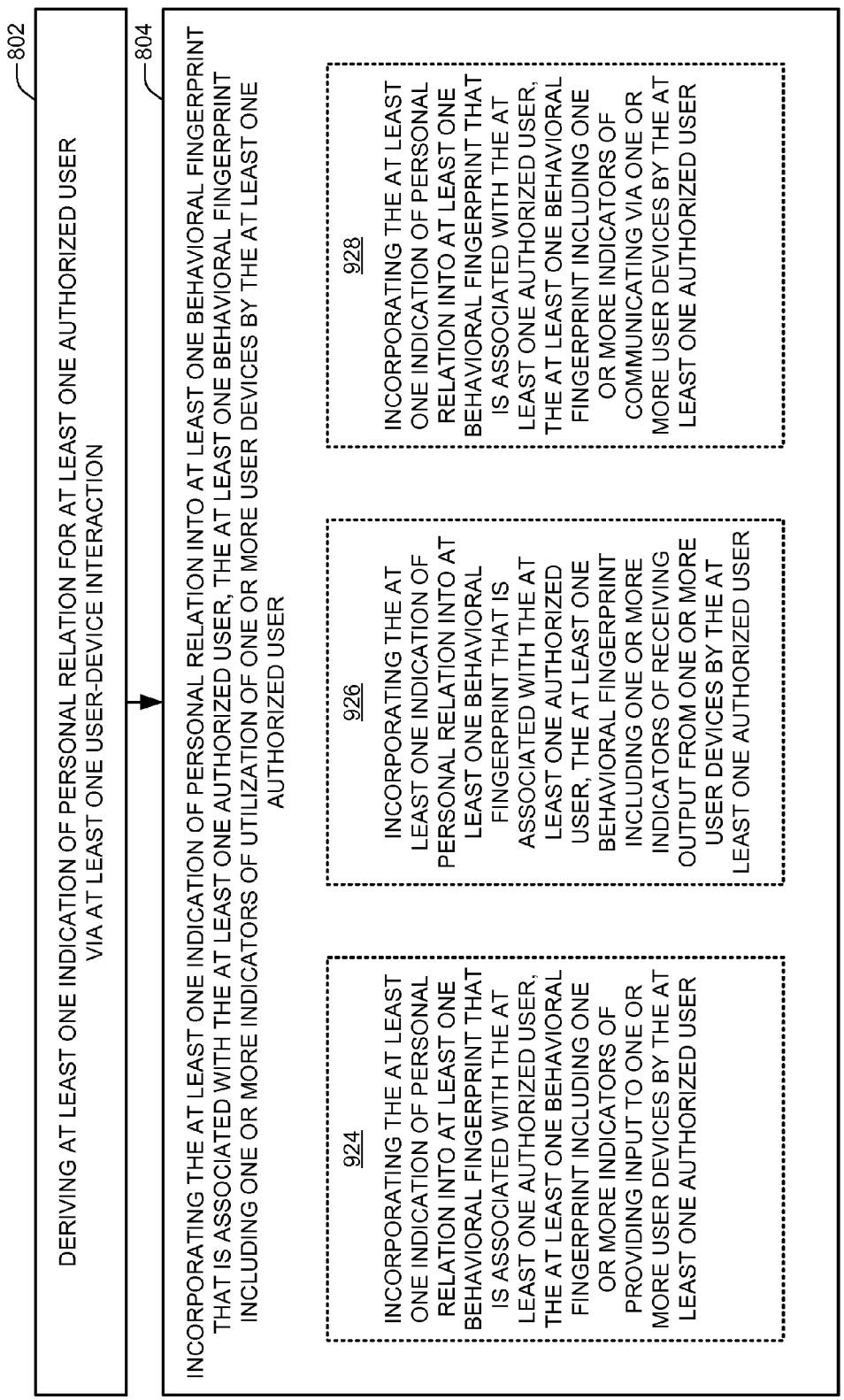

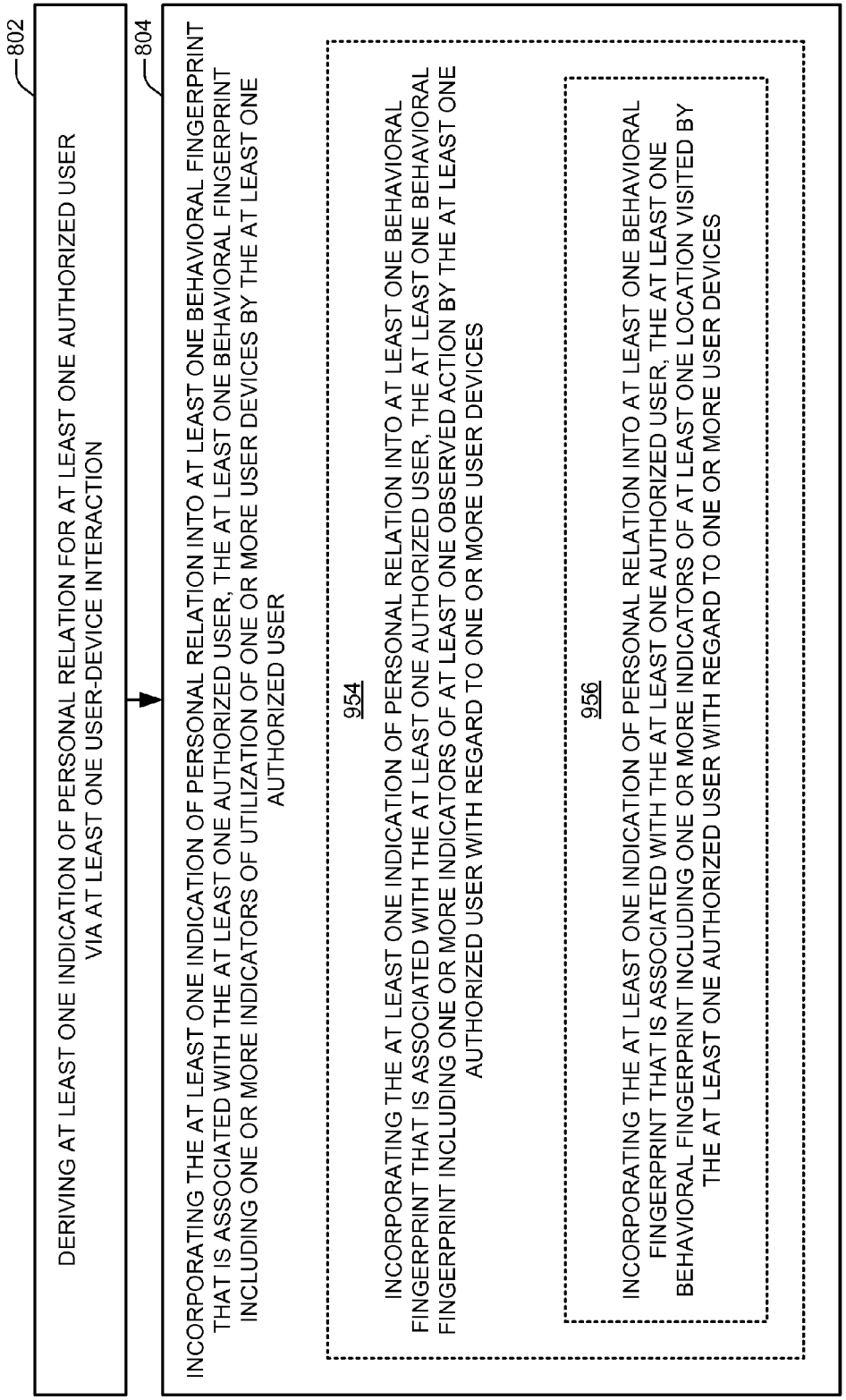

BEHAVIORAL FINGERPRINTING VIA DERIVED PERSONAL RELATION

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC 119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application claims benefit of priority of U.S. Provisional Patent Application No. 61/632,836, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 24 Sep. 2011, which was filed within the twelve months preceding the filing date of the present application or is an application of which a currently co-pending application is entitled to the benefit of the filing date.

(2) For purposes of the USPTO extra-statutory requirements, the present application claims benefit of priority of U.S. Provisional Patent Application No. 61/572,309, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 13 Oct. 2011, which was filed within the twelve months preceding the filing date of the present application or is an application of which a currently co-pending application is entitled to the benefit of the filing date.

(3) For purposes of the USPTO extra-statutory requirements, the present application constitutes a continuation-in-part of U.S. patent application Ser. No. 13/373,685, entitled "Behavioral Fingerprint Device Identification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/373,684, entitled "Behavioral Fingerprint Controlled Automatic Task Determination", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/373,680, entitled "Behavioral Fingerprint Controlled Theft Detection and Recovery", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/373,677, entitled "Trust Verification Schema Based Transaction Authorization", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/373,682, entitled "Social Network Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 23 Nov. 2011, which is currently co-pending or is an application of which a currently co-pending application is entitled to the benefit of the filing date.

(8) For purposes of the USPTO extra-statutory requirements, the present application constitutes a continuation-in-part of U.S. patent application Ser. No. 13/475,564, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 18 May 2012, which is currently co-pending or is an application of which a currently co-pending application is entitled to the benefit of the filing date.

(9) For purposes of the USPTO extra-statutory requirements, the present application constitutes a continuation-in-part of U.S. patent application Ser. No. 13/538,385, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 29 Jun. 2012, which is currently co-pending or is an application of which a currently co-pending application is entitled to the benefit of the filing date.

(10) For purposes of the USPTO extra-statutory requirements, the present application constitutes a continuation-in-part of U.S. patent application Ser. No. 13/552,502, entitled "Relationship Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 18 Jul. 2012, which is currently co-pending or is an application of which a currently co-pending application is entitled to the benefit of the filing date.

(11) For purposes of the USPTO extra-statutory requirements, the present application constitutes a continuation-in-part of U.S. patent application Ser. No. 13/563,599, entitled "Multi-Device Behavioral Fingerprinting", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Jul. 2012, which is currently co-pending or is an application of which a currently co-pending application is entitled to the benefit of the filing date.

(12) For purposes of the USPTO extra-statutory requirements, the present application constitutes a continuation-in-part of U.S. patent application Ser. No. 13/602,061, entitled "Behavioral Fingerprinting Via Social Networking Interaction", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed 31 Aug. 2012, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application is designating the present application as a continuation in part of its parent applications as set forth above, but expressly points out that such designations are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIG. 7A is a schematic diagram that includes at least one example device that is capable of handling scenarios for behavioral fingerprinting via derived personal relation in accordance with certain example embodiments.

FIGS. 8B-8L depict example additions or alternatives for a flow diagram of FIG. 8A in accordance with certain example embodiments.

FIGS. 9A-9G depict example additions or alternatives for a flow diagram of FIG. 8A in accordance with certain example embodiments.

DETAILED DESCRIPTION

Figure 1:
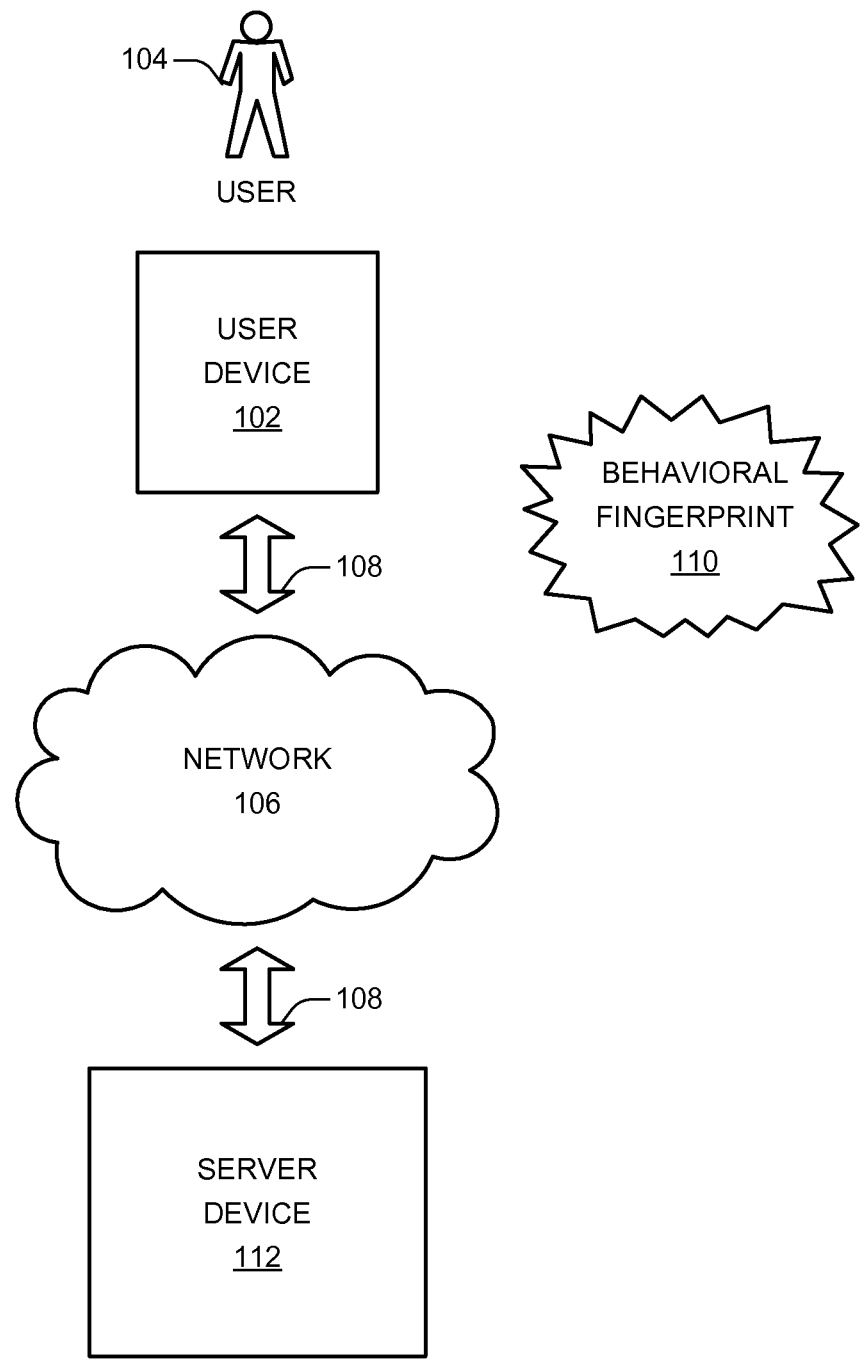
FIG. 1 is a schematic diagram of a user device, a server device, and at least one behavioral fingerprint, any of which may be involved individually or jointly in example authentication scenarios in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a user device, a server device, and at least one behavioral fingerprint, any of which may be involved individually or jointly in example authentication scenarios in accordance with certain example embodiments. As shown in FIG. 1, by way of example but not limitation, schematic diagram 100 may include at least one user device 102, at least one user 104, at least one network 106, at least one channel 108, at least one behavioral fingerprint 110, or at least one server device 112. More specifically, at least one channel 108 may extend from or lead to a device 102 or 112 to facilitate communication therewith.

For certain example embodiments, a user 104 may correspond to or be utilizing at least one user device 102. A user 104 may utilize a user device 102 in accordance with a usage that may be at least partially represented by, modeled by, incorporated into, stored at, tracked by, summarized in, a combination thereof, etc. at least one behavioral fingerprint 110. A user device 102 may comprise, by way of example but not limitation, a mobile phone, a smart phone, a mobile terminal, a laptop or notebook computer, a personal digital assistant (PDA), a netbook, an entertainment appliance (e.g., a television, a gaming console, a set-top box, a music player, a combination thereof, etc.), a portable gaming device, a user equipment, a tablet or slate computer, a desktop computer, a personal navigation device (PND), a vehicle with user-accessible computational capabilities, videoconferencing equipment, some combination thereof, or so forth. A user 104 may comprise, by way of example only, at least one person, a couple, siblings, a family, a partnership, an organizational group, a company, a robotic user (e.g., a computational entity), an electronic agent, a portion thereof, some combination thereof, or so forth. However, claimed subject matter is not limited to any particular described embodiments, implementations, examples, etc.

For certain example embodiments, a network 106 may comprise, by way of example but not limitation, at least a portion of one or more networks having one or more nodes that transmit, receive, forward, generate, buffer, store, route, switch, process, a combination thereof, etc. one or more messages, packets, signals, waves, voltage or current levels, some combination thereof, or so forth. A network may comprise, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof, or so forth. A node may comprise, by way of example but not limitation, a server; a router; an end user device, such as a mobile phone, a tablet computer, a desktop computer, an entertainment appliance, a vehicle, a combination thereof, etc.; a switch; a base station; a gateway; some combination thereof; or so forth. However, claimed subject matter is not limited to any particular described embodiments, implementations, examples, etc.

For certain example embodiments, a channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a PSTN, at least part of a cable network, at least part of a cellular network connection, at least part of an Internet connection, at least part of a Wi-Fi connection, at least part of a WiMax connection, at least part of an internet backbone, at least part of a satellite network, at least part of a fiber optic network, multiple instances of any of the above, one or more network nodes, some combination of the above, or so forth. A channel 108 may include one or more nodes (e.g., a telecommunication node, an access point, a base station, an internet server, a gateway, an internet or telecommunications switch, a combination thereof, etc.) through which signals are propagated. A communication may comprise, by way of example but not limitation, a transmission of data, a reception of data, an exchange of data, a flow of data (e.g., between or among two or more intermediate nodes or endpoints), some combination thereof, or so forth. A user device 102 may communicate with a server device 112, or vice versa, via one or more signals (not explicitly shown) using one or more channels 108. A couple of examples of channels 108 are illustrated in schematic diagram 100 (as well as in additional figures, such as schematic diagram 200A of FIG. 2A). Signals may propagate via one or more channels 108. Signals, by way of example but not limitation, may comprise, electrical signals, magnetic signals, electromagnetic signals, photonic signals, wireless signals, wired signals, multiples ones thereof, some combination thereof, or so forth. However, claimed subject matter is not limited to any particular described embodiments, implementations, examples, etc.

For certain example embodiments, a server device 112 may comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, or so forth. However, claimed subject matter is not limited to any particular described embodiments, implementations, examples, etc.

For certain example embodiments, at least one behavioral fingerprint 110 may comprise, by way of example but not limitation, one or more indicators representing one or more behaviors of at least one user with respect to at least one user device. Examples of one or more indicators representing one or more behaviors of at least one user with respect to at least one user device may include, but are not limited to, one or more indicators representing one or more habits of at least one user with respect to at least one user device, one or more indicators representing usage of at least one user device by at least one user, one or more indicators representing one or more actions of at least one user with respect to at least one user device, some combination thereof, or so forth. Additionally or alternatively, at least one behavioral fingerprint 110 may comprise, by way of example but not limitation, one or more indicators representing one or more predicted acts (e.g., behaviors, such as habits, usages, actions, a combination thereof, etc.) of at least one user with respect to at least one device. Additionally or alternatively, at least one behavioral fingerprint 110 may comprise, by way of example but not limitation, at least one status of a user that is utilizing or that corresponds to a user device. For certain example implementations, a user whose behavior is being monitored to at least partially establish at least a portion of at least one behavioral fingerprint 110 may comprise an authorized user, which is described herein below. However, claimed subject matter is not limited to any particular described embodiments, implementations, examples, etc.

For certain example embodiments, a user may be utilizing a user device, by way of example but not limitation, if the user is accessing the user device, if the user is interacting with the user device, if the user is carrying the user device, if the user is providing input to the user device, if the user is receiving output from the user device, if the user is directing operation of the user device, some combination thereof, or so forth. A user may correspond to a user device, by way of example but not limitation, if the user is an authorized user of the user device. However, claimed subject matter is not limited to any particular described embodiments, implementations, examples, etc.

For certain example embodiments, a user 104 of a user device 102 may comprise an authorized user of the user device 102: if the user 104 comprises, by way of example but not limitation, a true owner, a manager, an information technology (IT) specialist, a controller, a purchaser, a lessee, an approved borrower, a primary user, a combination thereof, etc. of the user device 102; if the user 104 is or has been authorized by a true owner, a manager, an IT specialist, a controller, a purchaser, a lessee, an approved borrower, a primary user, a combination thereof, etc. of the user device 102; some combination thereof; or so forth. In certain example implementations, a determination that a user 104 comprises (e.g., is, is becoming, is being designated, a combination thereof, etc.) an authorized user of a user device 102: may be effectuated if or when a user first registers a profile, an account, a combination thereof, etc. on a device (e.g., after a purchase or a 'hard' reset); may be effectuated if or when one or more 'sign-ins' (e.g., entry of a password, code, PIN, pattern, biometric input, a combination thereof, etc.) are performed by a user; may be effectuated if or when one or more user ID/secret information combinations (e.g., entry of an account name, email address, individualized identification, a combination thereof, etc. along with a corresponding password, code, PIN, pattern, biometric input, a combination thereof, etc.) are entered by a user; may be effectuated if or when a given user is identified as, designated as, or otherwise indicated to comprise an authorized user by one who is already an authorized user; some combination of such authorized user determinations; or so forth. An authorized user may add a new authorized user, by way of example only: by providing a name or other identification of another user or his or her biometric information (e.g., a facial photo, a voice sample, a fingerprint image, a retinal scan, a combination thereof, etc.); by providing a name or other identification of a user or temporary or permanent secret information, such as a password, a code, a PIN, a pattern, biometric input, a combination thereof, etc. (e.g., that a newly authorized user may be capable of changing or confirming); some combination thereof; or so forth. An authorized user, such as a true owner or IT specialist, may be empowered to remove someone from a list of authorized user(s). In certain example embodiments, different authorized users may have different levels of authorization (e.g., different levels of access, capabilities, rights, privileges, a combination thereof, etc.) with respect to a given user device 102. For certain example implementations, but by way of example only, one authorized user may comprise an administrator with full access rights or privileges, yet another authorized user may comprise a regular, non-administrative, or junior user with fewer access rights or privileges. Additionally or alternatively, one authorized user may have full access rights to applications and content stored on a device or associated with a particular account/profile, yet another authorized user may have restricted access rights to applications or content stored on a device such that access is prevented, for instance, to particular device settings or adult content. Other approaches to providing different levels of authorization may also or instead be implemented. By way of example only, an authorized user who is a true owner may add a new authorized user that is permitted to utilize existing applications and content but is prohibited from adding new applications or making particular purchases (e.g., individual purchases above a predetermined dollar amount or multiple purchases beyond a total dollar amount).

Figure 2A:
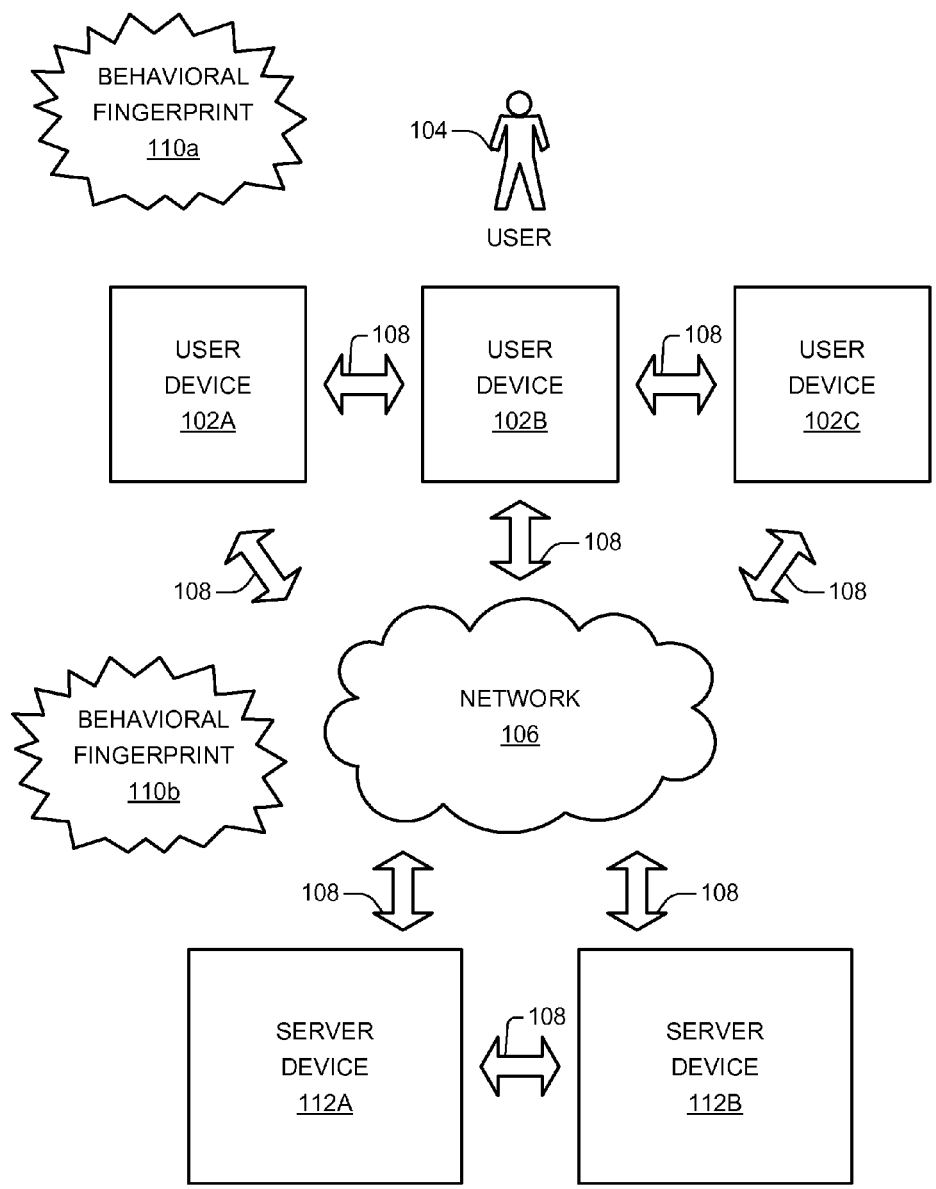
FIG. 2A is a schematic diagram of multiple user devices, multiple server devices, and at least one behavioral fingerprint, any of which may be involved individually or jointly in example authentication scenarios in accordance with certain example embodiments.

FIG. 2A is a schematic diagram 200A of multiple user devices, multiple server devices, and at least one behavioral fingerprint, any of which may be involved individually or jointly in example authentication scenarios in accordance with certain example embodiments. As shown in FIG. 2A, by way of example but not limitation, schematic diagram 200A may include at least one user device 102, at least one user 104, at least one network 106, at least one channel 108, at least one behavioral fingerprint 110, or at least one server device 112. More specifically, schematic diagram 200A may include, by way of example only, three user devices 102 (e.g., a user device 102A, a user device 102B, or a user device 102C, etc.), two server devices 112 (e.g., a server device 112A, or a server device 112B, etc.), or two behavioral fingerprints 110 (e.g., a behavioral fingerprint 110a, or a behavioral fingerprint 110b, etc.).

For certain example embodiments, a user 104 may correspond to or be utilizing multiple user devices 102, such as at least two of user device 102A, user device 102B, or user device 102C, at least partially simultaneously or from time to time. By way of example only, a user 104 may own at least two of: a mobile phone, a tablet computer, a vehicle with an intelligent computing apparatus, a laptop computer, or a desktop computer. For certain example implementations, at least part of a combined behavioral fingerprint 110 (e.g., a behavioral fingerprint 110a/110b) may be associated with a user 104 and each corresponding user device 102. Additionally or alternatively, an individualized behavioral fingerprint 110 (e.g., a behavioral fingerprint 110a or a behavioral fingerprint 110b) may be associated with a user 104 and each corresponding individual or respective user device 102. However, claimed subject matter is not limited to any particular described embodiments, implementations, examples, etc.

For certain example embodiments, a behavioral fingerprint 110, 110a, or 110b; an at least partially combined instantiation of at least two of a behavioral fingerprint 110, 110a, or 110b; a portion of a behavioral fingerprint 110, 110a, or 110b; a combination thereof; etc. may be distributed across or stored at, by way of example only, one or more of: a user device 102A, a user device 102B, a user device 102C, a network 106 or node thereof, a server device 112A, a server device 112B, some combination thereof, or so forth. Additionally or alternatively, a behavioral fingerprint 110, 110a, or 110b; an at least partially combined instantiation of at least two of a behavioral fingerprint 110, 110a, or 110b; a portion of a behavioral fingerprint 110, 110a, or 110b; a combination thereof; etc. may be transmitted, received, exchanged, a combination thereof, etc., by way of example only, via one or more of: at least one network 106, one or more channels 108, some combination thereof, or so forth. A user device 102 or a server device 112 may transmit, receive, exchange, a combination thereof, etc. at least a portion of a behavioral fingerprint 110, 110a, or 110b directly between or among devices 102 or 112 or indirectly via at least one node (not explicitly shown) of one or more networks 106. However, claimed subject matter is not limited to any particular described embodiments, implementations, examples, etc.

Figure 2B:
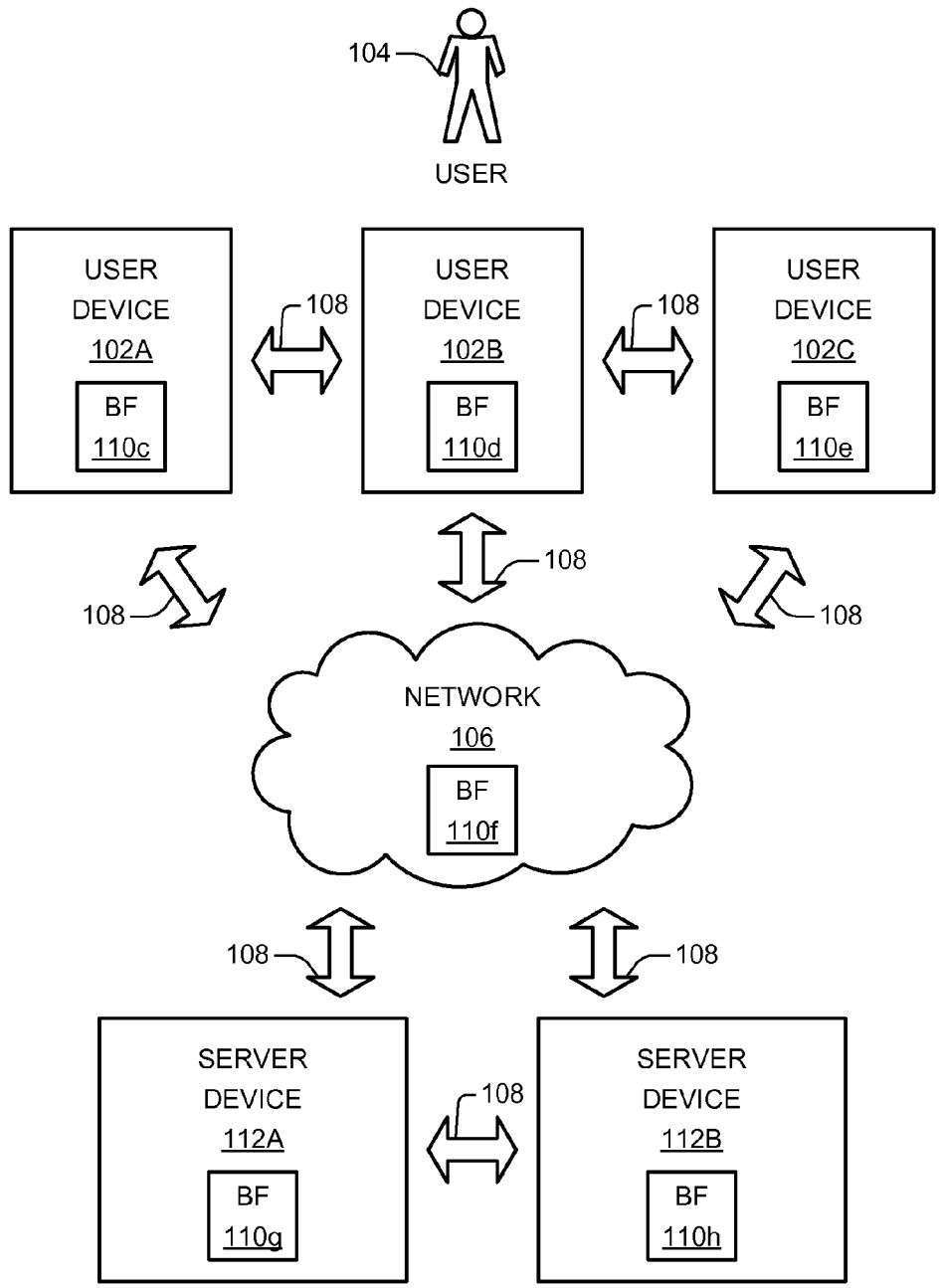
FIG. 2B is a schematic diagram of multiple user devices, multiple server devices, and multiple example locations for at least a portion of at least one behavioral fingerprint in accordance with certain example embodiments.

FIG. 2B is a schematic diagram 200B of multiple user devices, multiple server devices, and multiple example locations for at least a portion of at least one behavioral fingerprint in accordance with certain example embodiments. As shown in FIG. 2B, by way of example but not limitation, schematic diagram 200B may include at least one user device 102, at least one user 104, at least one network 106, at least one channel 108, at least one behavioral fingerprint 110, or at least one server device 112. More specifically, schematic diagram 200B may include, by way of example only, three user devices 102 (e.g., a user device 102A, a user device 102B, or a user device 102C, etc.), two server devices 112 (e.g., a server device 112A, or a server device 112B, etc.), or six behavioral fingerprints 110 (e.g., a behavioral fingerprint 110c, a behavioral fingerprint 110d, a behavioral fingerprint 110e, a behavioral fingerprint 110f, a behavioral fingerprint 110g, or a behavioral fingerprint 110h, etc.).

For certain example embodiments, a given behavioral fingerprint 110 or portion thereof may be located at (stored at, distributed at least partially across, accessible from, associated with, a combination thereof, etc.) one or more devices 102 or 112. By way of example only, a behavioral fingerprint 110c may be located at a user device 102A, a behavioral fingerprint 110d may be located at a user device 102B, a behavioral fingerprint 110e may be located at a user device 102C, a behavioral fingerprint 110f may be located at a network 106 (e.g., at a cloud service or system), a behavioral fingerprint 110g may be located at a server device 112A, or a behavioral fingerprint 110h may be located at a server device 112B. For certain example implementations, any one or more of behavioral fingerprints 110c-110h may comprise one or more separate or individualized behavioral fingerprints 110; may comprise one or more combined, amalgamated, distributed, a combination thereof, etc. behavioral fingerprints 110; may comprise at least a portion of at least one behavioral fingerprint 110; some combination thereof; or so forth. However, claimed subject matter is not limited to any particular described embodiments, implementations, examples, etc.

For certain example embodiments, at least one behavioral fingerprint 110 (e.g., of behavioral fingerprints 110c-110h) may be associated with at least one user 104 or one or more of user devices 102A, 102B, or 102C. For certain example implementations, a behavioral fingerprint 110c, which may be stored at a user device 102A, may be associated with a user 104 and user device 102A. For certain example implementations, a behavioral fingerprint 110g, which may be stored at a server device 112A, may be associated with a user 104 and a user device 102A. For certain example implementations, a behavioral fingerprint 110h, which may be stored at a server device 112B, may be associated with a user 104, a user device 102B, and a user device 102C. For certain example implementations, a behavioral fingerprint 110c, which may be stored at a user device 102A and associated therewith, and a behavioral fingerprint 110d, which may be stored at a user device 102B and associated therewith, may be individually or jointly associated with a user 104. A behavioral fingerprint 110c and a behavioral fingerprint 110d may be identical to each other, partially the same, different from one another, updated to keep one at least partially coherent or consistent with the other, some combination thereof, or so forth. For certain example implementations, a behavioral fingerprint 110d, which may be stored at a user device 102B and associated therewith, and a behavioral fingerprint 110g, which may be stored at a server device 112A and associated with a user device 102C, may be individually or jointly associated with a user 104. A behavioral fingerprint 110d and a behavioral fingerprint 110g may be identical to each other, partially the same, different from one another, updated to keep one at least partially coherent or consistent with the other, some combination thereof, or so forth. For certain example implementations, a behavioral fingerprint 110e, which may be stored at a user device 102C and associated therewith, and a behavioral fingerprint 110h, which may be stored at a server device 112b and also associated with user device 102C, may be individually or jointly associated with a user 104. A behavioral fingerprint 110e and a behavioral fingerprint 110h may be identical to each other, partially the same, different from one another, updated to keep one at least partially coherent or consistent with the other, some combination thereof, or so forth. For certain example implementations, a behavioral fingerprint 110e, which may be stored at a user device 102C, may be associated with a user 104 and a user device 102b. Although each user device 102 and server device 112 (and network 106) is shown in schematic diagram 200B as having a behavioral fingerprint 110 located there at, one or more user devices 102 or server devices 112 (or networks 106) may alternatively not have a behavioral fingerprint 110 located there at. Furthermore, other additional or alternative approaches may instead be implemented.

For certain example embodiments, a behavioral fingerprint 110 (including but not limited to any one or more of behavioral fingerprints 110a-110h) may comprise a whole behavioral fingerprint, a portion of a behavioral fingerprint, a behavioral fingerprint associated with a single user device, a behavioral fingerprint associated with multiple user devices, a part of a distributed behavioral fingerprint, a whole behavioral fingerprint that is distributed across multiple devices, a portion or a whole behavioral fingerprint that is located at one device, one or more indicators of one or more behavior-related acts, some combination thereof, or so forth. Examples of behavioral fingerprint(s) 110 are described further herein below with particular reference to FIG. 3. However, claimed subject matter is not limited to any particular described embodiments, implementations, examples, etc.

Figure 3:
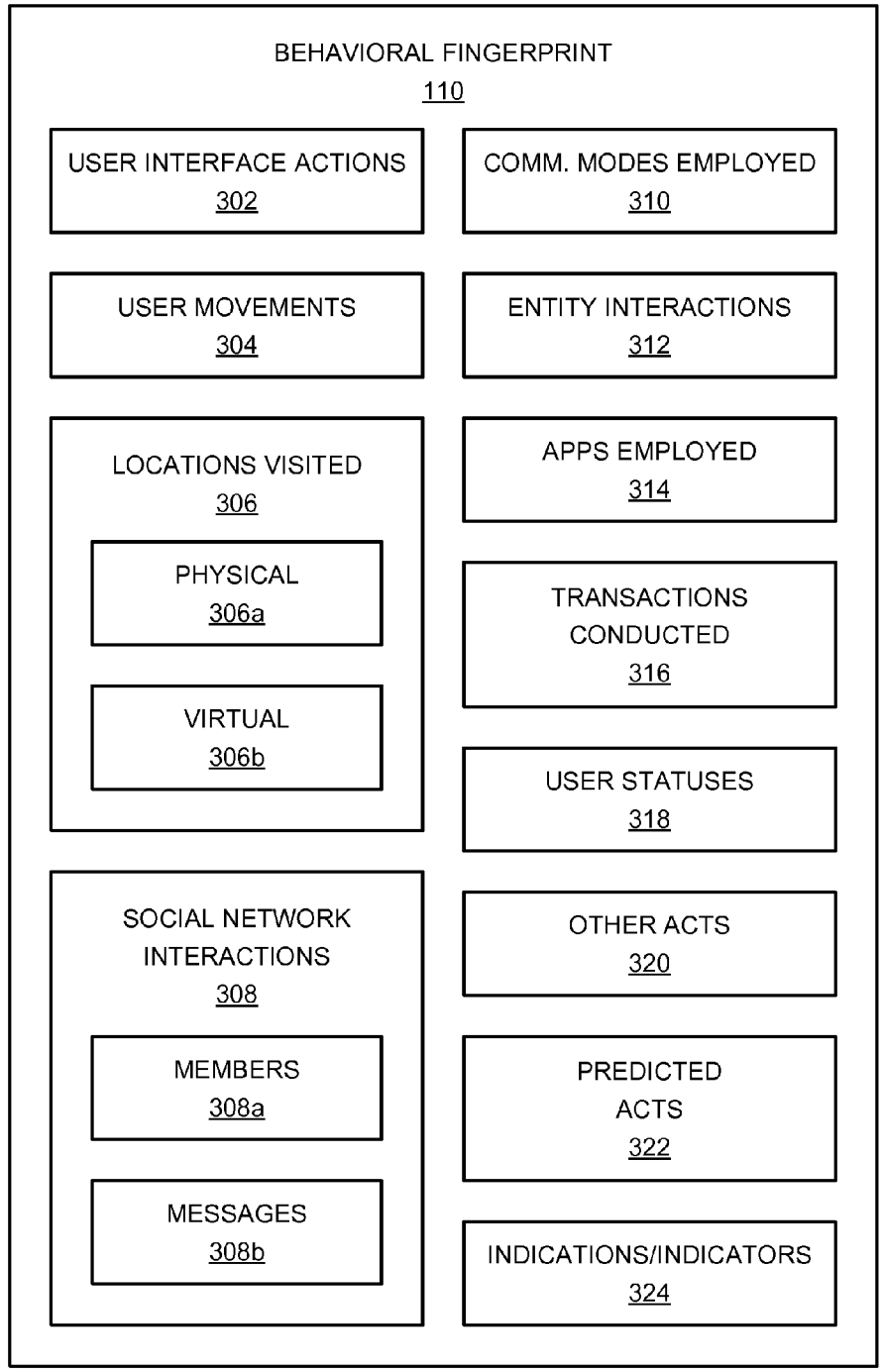
FIG. 3 is a schematic diagram illustrating an example behavioral fingerprint including one or more example indicators of one or more behavior-related acts in accordance with certain example embodiments.
Figure 3:
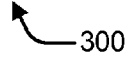

FIG. 3 is a schematic diagram 300 illustrating an example behavioral fingerprint including one or more example indicators of one or more behavior-related acts in accordance with certain example embodiments. As shown in FIG. 3, by way of example but not limitation, schematic diagram 300 may comprise a behavioral fingerprint 110, which behavioral fingerprint 110 may include any one or more of indications of various acts 302-322 or other indications 324. Example indications 302-324 that are illustrated may include, but are not limited to, user interface actions 302, user movements 304, locations visited 306, social network interactions 308, communication modes employed 310, entity interactions 312, apps employed 314, transactions conducted 316, user statuses 318, other acts 320, predicted acts 322, other indications or indicators 324, some combination thereof, or so forth. More specifically, locations visited 306 may include physical locations visited 306a, virtual locations visited 306b, a combination thereof, etc., or social network interactions 308 may include social network members 308a, social network messages 308b, a combination thereof, etc. Additional or alternative implementations to those of schematic diagram 300 for a behavioral fingerprint 110 are described further herein below as well as above. Moreover, a behavioral fingerprint 110 may alternatively include more, fewer, or different indication(s) from those that are illustrated without departing from claimed subject matter.

For certain example embodiments, one or more user interface actions 302 may include, but are not limited to, a type of user interaction (e.g., buttons, keys, physical keyboard, touch screen, swipes, virtual buttons, virtual keyboard, multi-finger touch, speech, textual, movement sensing input such as a shake or a twist, a combination thereof, etc.), a speed of user interaction (e.g., speech rate, speech cadence, typing speed, swiping speed, scrolling speed, speed moving between or among windows or apps, duration of a swipe or press of a virtual or physical key or button, a combination thereof, etc.), a user input apparatus (e.g., a built-in microphone, a wireless microphone, a built-in keyboard, a virtual keyboard, a detachable/attachable keyboard, a wireless keyboard, an input apparatus identifiable such as by name or number, a combination thereof, etc.), a position of user interaction (e.g., a location of touch for a touch-sensitive screen having a keyboard or button or swipe area, a location of a swipe, a length of a swipe, an offset from a designated key or slide area, a combination thereof, etc.), a user output apparatus (e.g., a screen, a built-in speaker, a separate speaker, a vibration unit, an integrated output apparatus, a wired output apparatus, a wireless output apparatus, an output apparatus identifiable such as by name or number, a combination thereof, etc.), some combination thereof, or so forth. However, claimed subject matter is not limited to any particular described embodiments, implementations, examples, etc.

For certain example embodiments, one or more user movements 304 may include, but are not limited to, device orientation (e.g., cardinal direction a device is pointed at, angle a device is held at, a combination thereof, etc.), device shakes or deformations (e.g., how a device is moved to provide input, how a device is pressed or twisted or curved to provide input, a combination thereof, etc.), a pattern of vibrations or jostling applied to or experienced by a device during daily use (e.g., as a result of carrying it, commuting with it, placing it in a pack or purse, placing it in a pocket, a combination thereof, etc.), some combination thereof, or so forth. However, claimed subject matter is not limited to any particular described embodiments, implementations, examples, etc.

For certain example embodiments, one or more locations visited 306 may include, but are not limited to, locations that a user carries, sends, places, or travels with a device; locations that a user directs software to acquire data from or send data to; some combination thereof; or so forth. For certain example implementations, physical locations visited 306a may include, but are not limited to, an address, a room, a store, a building, a neighborhood, a city, a state, a country, one or more satellite positioning system (SPS) coordinates, a check-in location, a business, one or more geographical (e.g., cardinal) coordinates, a geographical zone (e.g., coordinates or approximate position in conjunction with a distance or range), some combination thereof, or so forth. For certain example implementations, virtual locations visited 306b may include, but are not limited to, an internet address, a web page, a web site, a social network, a destination within a social network, a virtual world, a destination within a virtual world, a chat room, a bulletin board, a blog, some combination thereof, or so forth. However, claimed subject matter is not limited to any particular described embodiments, implementations, examples, etc.

For certain example embodiments, one or more social network interactions 308 may include, but are not limited to, accessing a social network, reading a communication from one or more social network members, sending a communication to one or more social network members, changing profile or account information for a social network, viewing publicly-available social network information (e.g., viewing a person's wall, board, stream, pinning, a combination thereof, etc.), viewing private social network information (e.g., viewing a targeted or personalized message, tweet, picture, a combination thereof, etc.), searching for entities on a social network, playing games via a social network, experiencing entertainment (e.g., video, audio, clips, pictures, a combination thereof, etc.) via a social network, a listing of which social network(s) are accessed, an order of which social networks are accessed, a day or time of accessing particular social network(s), some combination thereof, or so forth. For certain example implementations, social network member interactions 308a may include, but are not limited to, identifying or listing members interacted with via receiving, retrieving, sending, replying to a combination thereof, etc. one or more communications; noting particular social network protocols or modes (e.g., wall writing or viewing, tweet sending or receiving, picture sending or viewing, public versus private communicating, a combination thereof, etc.) used to communicate with particular members individually or in groups; noting particular social network protocols or modes used to communicate with particular member groups; some combination thereof; or so forth. For certain example implementations, social network message interactions 308b may include, but are not limited to, noting (e.g., recording, memorializing, storing, identifying, a combination thereof, etc.) messages sent or received, noting an order of message sending or viewing, noting a type (e.g., a social network protocol) of message sent or received, noting a number of messages sent or received, noting a duration between arrival of a message (e.g., generally or from a particular member) and viewing of the message, noting a duration between arrival or viewing of a message (e.g., generally or from a particular member) and responding to the message, some combination thereof, or so forth. However, claimed subject matter is not limited to any particular described embodiments, implementations, examples, etc.

For certain example embodiments, one or more communication modes employed 310 may include, but are not limited to, speech, a phone call, a voice-over-internet-protocol (VoIP) communication, text messaging, instant messaging, a video communication (e.g., a video call, a video conference, a combination thereof, etc.), a social-network-based communication (e.g., a communication that is effectuated at least partially using a social network app, web site, service, a combination thereof, etc.), some combination thereof, or so forth. Additionally or alternatively, one or more communication modes employed 310 may include, but are not limited to, indications of which communication mode is employed if/when responding to a received communication of a given communication mode (e.g., it may be noted that an authorized user may respond to most phone calls or phone calls from particular people with text messages). However, claimed subject matter is not limited to any particular described embodiments, implementations, examples, etc.

For certain example embodiments, one or more entity interactions 312 may include, but are not limited to, identification of at least one entity (e.g., business, service, person, social network member, group, organization, a combination thereof, etc.) that a user interacts with (e.g., with or without an indication of a communication mode, such as via a telephone capability, via email, via instant messaging, via a social network communication protocol, via VoIP, via a video capability, via a speech capability, a combination thereof, etc.), a listing of entities interacted with, an order of entities interacted with, notations of when (e.g., a day, a time, days of week, a combination thereof, etc.) entities are interacted with, notations of how (e.g., a communication mode used, a duration, a combination thereof, etc.) entities are interacted with, some combination thereof, or so forth. However, claimed subject matter is not limited to any particular described embodiments, implementations, examples, etc.

For certain example embodiments, one or more apps employed 314 may include, but are not limited to, identification of one or more apps (e.g., applications, native applications, downloaded applications, installed applications, software applications, web applications, a combination thereof, etc.) employed (e.g., accessed, started, opened, launched, viewed, consulted, manipulated, configured, installed, executed, a combination thereof, etc.) by a user, a listing of apps employed, an order of apps employed, a notation of a time or a day at which apps are employed, a notation of duration(s) for which apps are employed, some combination thereof, or so forth. However, claimed subject matter is not limited to any particular described embodiments, implementations, examples, etc.

For certain example embodiments, one or more transactions conducted 316 may include, but are not limited to, an identification of transactions (e.g., exchanges of consideration, purchases, orders, downloads, a combination thereof, etc.) conducted (e.g., initiated, requested, consummated, effectuated, accomplished, monitored, a combination thereof, etc.), a list of transactions, a notation of times or days of transactions, a notation of transaction amounts, a notation of at least one party to one or more transactions, a notation of items (e.g., physical items such as food or electronics, virtual items such as songs or movies or games or in-game abilities, a combination thereof, etc.) or services (e.g., physical services such as a massage or a car wash, virtual services such as streaming media or a membership, a combination thereof, etc.) involved in one or more transactions, some combination thereof, or so forth. However, claimed subject matter is not limited to any particular described embodiments, implementations, examples, etc.

For certain example embodiments, one or more user statuses 318 may include, but are not limited to, a location status update, a health status update, an alert (e.g., as to whether a person has possession or has lost possession of a device; as to whether a device has exceeded some percentage—e.g. 50% or 75% or 100%—of an allotted amount, such as of minutes of talking, bytes of data, messages of texting, dollars of a fund, time of use, etc.; as to where a person is currently located; a combination thereof; etc.), a current (e.g., most recent, present, a combination thereof, etc.) activity update, some combination thereof, or so forth. However, claimed subject matter is not limited to any particular described embodiments, implementations, examples, etc.

For certain example embodiments, one or more other acts 320 may include, but are not limited to, other user behaviors, user habits, user actions, user movements, user interactions, user visitations, user transactions, device features (e.g., capabilities, native applications, operating system functions, a combination thereof, etc.) employed, a combination thereof, etc. that a device may monitor (e.g., detect, observe, discern, ascertain, a combination thereof, etc.); other acts reflecting user behavior; other acts described herein; some combination thereof; or so forth. However, claimed subject matter is not limited to any particular described embodiments, implementations, examples, etc.

For certain example embodiments, one or more predicted acts 322 may include, but are not limited to, an act that is predicted based at least partially on any one or more of other indications 302-320; an act that is predicted to be performed by an authorized user; an act corresponding to a particular likelihood level of re-occurring; an act that is predicted to re-occur in view of one or more observed acts of at least one authorized user of one or more user devices; an act that is predicted to occur based at least partially on a statistical analysis (e.g., a likelihood function, a histogram evaluation, a probabilistic approach, a Bayesian analysis, a stochastic mechanism, a correlation procedure, a probability density function, a normal/Gaussian distribution, a cumulative distribution function, an expected value, a combination thereof, etc.) of one or more historically-monitored acts; an act that has been repeatedly performed in certain manner(s) or at particular time(s) such that it can be expected to be performed again in such certain manner(s) or at such particular time(s); an act that is derived or results from a conversion of monitored act(s) corresponding to one device to at least one act corresponding to another device; some combination thereof; or so forth. However, claimed subject matter is not limited to any particular described embodiments, implementations, examples, etc.

For certain example embodiments, one or more other indications 324 may include, but are not limited to, static characteristics of an authorized user, individuals that are related to an authorized user, characteristics of individuals that are related to an authorized user; nature of relationships between or among an authorized user and other individuals, some combination thereof, or so forth. Non-exhaustive examples of other indications or indicators 324 are provided herein below with particular reference to FIGS. 7A-7C, 8A-8M, and 9A-9G. However, claimed subject matter is not limited to any particular described embodiments, implementations, examples, etc.

Figure 4:
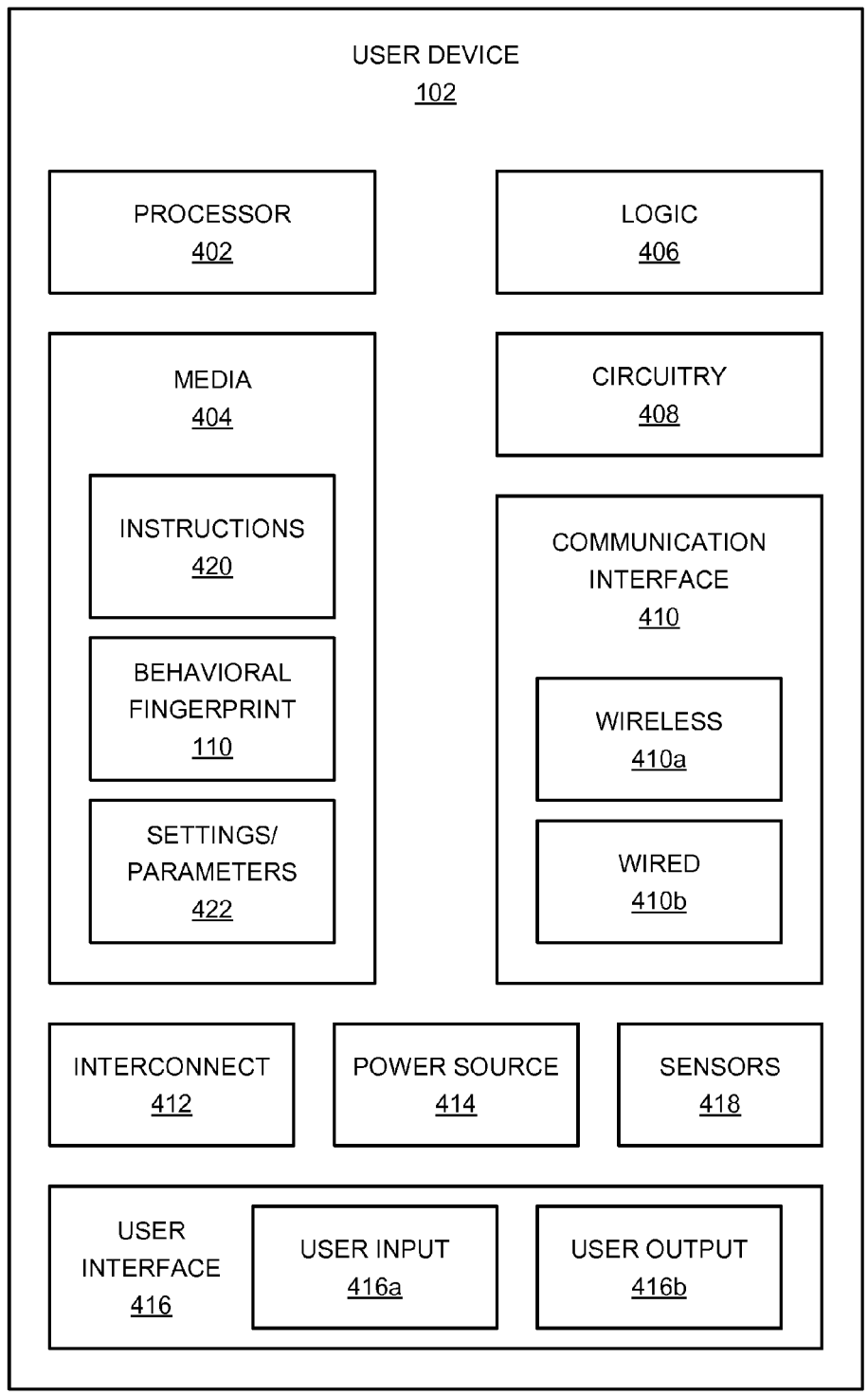
FIG. 4 is a schematic diagram of an example user device including one or more example components in accordance with certain example embodiments.

FIG. 4 is a schematic diagram 400 of an example user device including one or more example components in accordance with certain example embodiments. As shown in FIG. 4, a user device 102 may include one or more components such as: at least one processor 402, one or more media 404, logic 406, circuitry 408, at least one communication interface 410, at least one interconnect 412, at least one power source 414, at least one user interface 416, one or more sensors 418, some combination thereof, or so forth. Furthermore, as shown in schematic diagram 400, one or more media 404 may comprise one or more instructions 420, at least one behavioral fingerprint 110, one or more settings or parameters 422, some combination thereof, or so forth; a communication interface 410 may comprise at least one wireless communication interface 410a, at least one wired communication interface 410b, some combination thereof, or so forth; or a user interface 416 may comprise at least one user input interface 416a, at least one user output interface 416b, some combination thereof, or so forth. However, a user device 102 may alternatively include more, fewer, or different component(s) from those that are illustrated without departing from claimed subject matter.

For certain example embodiments, a user device 102 may include or comprise at least one electronic device. User device 102 may comprise, for example, a computing platform or any electronic device having at least one processor or memory. Processor 402 may comprise, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, a combination thereof, etc. instructions 420, which may be executable by a processor 402; at least one behavioral fingerprint 110; one or more settings/parameters 422; some combination thereof; or so forth. Instructions 420 may comprise, by way of example but not limitation, a program, a module, an application or app (e.g., that is native, that runs in a browser, that runs within a virtual machine, a combination thereof, etc.), an operating system, a combination thereof, etc. or portion thereof; operational data structures; source code, object code, just-in-time (JIT) compiled code, a combination thereof, etc.; processor-executable instructions; other code; some combination thereof; or so forth. Media 404 may comprise, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, a combination thereof, etc.) that is capable of bearing instructions, a behavioral fingerprint, settings, parameters, some combination thereof, or so forth.

For certain example embodiments, execution of instructions 420 by one or more processors 402 may transform user device 102 into a special-purpose computing device, apparatus, platform, machine, some combination thereof, or so forth. Instructions 420 may comprise, for example, instructions that are capable of realizing at least a portion of one or more flow diagrams, methods, processes, procedures, operations, functionality, technology, mechanisms, a combination thereof, etc. that are described herein or illustrated in the accompanying drawings. Settings/parameters 422 may comprise, by way of example but not limitation, one or more settings or parameters that may be established or determined by a user or other entity, one or more or settings or parameters that may be determined or detected by a user device 102, one or more settings or parameters that may be received from another device that determined or detected them, one or more settings or parameters that may determine at least partly how a user device 102 is to operate or respond to a situation or a behavioral fingerprint, one or more settings or parameters (e.g., values) that may be used to realize flow diagrams, methods, processes, procedures, operations, functionality, technology, mechanisms, a combination thereof, etc. that are described herein or illustrated in the accompanying drawings. Settings/parameters 422 may control at least partially how at least one behavioral fingerprint 110 is configured, stored, shared, used, applied, some combination thereof, or so forth. Additionally or alternatively, at least a portion of settings/parameters 422 may be at least partially integrated with at least one behavioral fingerprint 110.

For certain example embodiments, logic 406 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings. Circuitry 408 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings, wherein circuitry 408 comprises at least one physical or hardware component or aspect.

For certain example embodiments, one or more communication interfaces 410 may provide one or more interfaces between user device 102 and another device or a person/operator. With respect to a person/operator, a communication interface 410 may include, by way of example but not limitation, a screen, a speaker, a keyboard or keys, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a combination thereof, etc.), a physical or logical network adapter or port, a frequency converter, a baseband processor, a combination thereof, etc. to communicate wireless signals or wired signals via one or more wireless communication links or wired communication links, respectively, such as over at least one channel 108 (e.g., of FIGS. 1 and 2A). Communications with at least one communication interface 410 may enable transmitting, receiving, or initiating of transmissions, just to name a few examples.

For certain example embodiments, at least one interconnect 412 may enable signal communication between or among components of user device 102. Interconnect 412 may comprise, by way of example but not limitation, one or more buses, channels, switching fabrics, some combination thereof, or so forth. Although not explicitly illustrated in FIG. 4, one or more components of user device 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of user device 102. Power source 414 may comprise, by way of example but not limitation, a battery, a power connector, a solar power source or charger, a mechanical power source or charger, a fuel source, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), some combination thereof, or so forth. Values provided by at least one sensor 418 may comprise, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, finger placements, flex detections, some combination thereof, or so forth.

For certain example embodiments, a user interface 416 may enable one or more users to interact with user device 102. Interactions between a user and a user device may relate, by way of example but not limitation: to touch/tactile/feeling/haptic sensory (e.g., a user may shake, rotate, decline/incline, bend, twist, or move a user device which may be detected by a gyroscope, an accelerometer, a compass, a combination thereof, etc.; a user may press a button, slide a switch, rotate a knob, etc.; a user may touch a touch-sensitive screen; a device may vibrate; some combination thereof; or so forth), to sound/hearing/speech sensory (e.g., a user may speak into a microphone, a device may generate sounds via a speaker, a combination thereof, etc.), to sights/vision sensory (e.g., a device may activate one or more lights, modify an image presented on a display screen, a combination thereof, etc.), some combination thereof, or so forth.

For certain example embodiments, a user interface 416 may comprise a user input interface 416a, a user output interface 416b, some combination thereof, or so forth. A user input interface 416a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, a virtual button/slider/keyboard/etc. presented on a touch-sensitive screen, some combination thereof, or so forth. A user output interface 416b may comprise, by way of example but not limitation, a speaker, a screen (e.g., with or without touch-sensitivity), a vibrating haptic feature, some combination thereof, or so forth. Certain user interfaces 416 may enable both user input and user output. For example, a touch-sensitive screen may be capable of providing user output and accepting user input.

Additionally or alternatively, a user interface 416 component (e.g., that may be integrated with or separate from a user device 102), such as a headset that has a microphone and a speaker, may enable both user input and user output.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with respect to a user, as a user input interface 416a, or as a user output interface 416b. Additionally or alternatively, one or more instructions 420 may function to realize at least part of a behavioral fingerprint 110 or at least one setting or parameter 422.

It should also be understood that for certain example implementations components that are illustrated in schematic diagram 400 or described herein may or may not be integral with or integrated into a user device 102. For example, a component may be removably connected to a user device 102, a component may be wirelessly coupled to a user device 102, some combination thereof, or so forth. By way of example only, instructions 420 may be stored on a removable card having at least one medium 404. Additionally or alternatively, a user interface 416 (e.g., a wired or wireless headset, a screen, a video camera, a keyboard, a combination thereof, etc.) may be coupled to a user device 102 wirelessly or by wire. However, claimed subject matter is not limited to any particular described embodiments, implementations, examples, etc.

Figure 5:
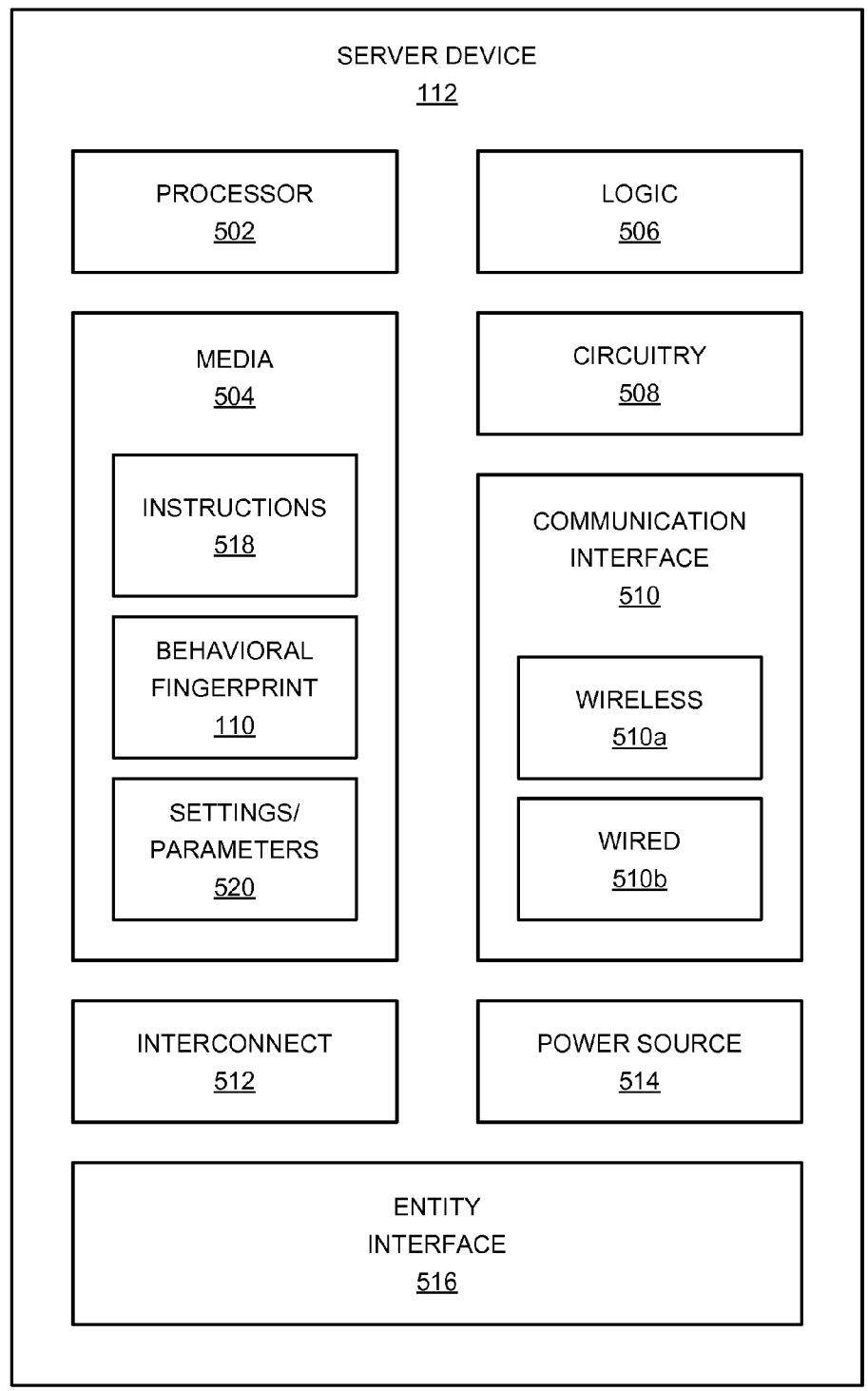
FIG. 5 is a schematic diagram of an example server device including one or more example components in accordance with certain example embodiments.

FIG. 5 is a schematic diagram 500 of an example server device including one or more example components in accordance with certain example embodiments. As shown in FIG. 5, a server device 112 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may comprise one or more instructions 518, at least one behavioral fingerprint 110, one or more settings or parameters 520, some combination thereof, or so forth; or communication interface 510 may comprise at least one wireless communication interface 510a, at least one wired communication interface 510b, some combination thereof, or so forth. However, a server device 112 may alternatively include more, fewer, or different component(s) from those that are illustrated without departing from claimed subject matter.

For certain example embodiments, a server device 112 may include or comprise at least one processing or computing device or machine. Server device 112 may comprise, for example, a computing platform or any electronic device or devices having at least one processor or memory. Processor 502 may comprise, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, a combination thereof, etc. instructions 518, which may be executable by a processor 502; at least one behavioral fingerprint 110; one or more settings/parameters 520; some combination thereof; or so forth. Instructions 518 may comprise, by way of example but not limitation, a program, a module, an application or app (e.g., that is native, that runs in a browser, that runs within a virtual machine or server, a combination thereof, etc.), an operating system, a combination thereof, etc. or portion thereof; operational data structures; source code, object code, just-in-time (JIT) compiled code, a combination thereof, etc.; processor-executable instructions; other code; some combination thereof; or so forth. Media 504 may comprise, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, a combination thereof, etc.) that is capable of bearing instructions, at least one behavioral fingerprint, settings, parameters, some combination thereof, or so forth.

For certain example embodiments, execution of instructions 518 by one or more processors 502 may transform server device 112 into a special-purpose computing device, apparatus, platform, machine, some combination thereof, or so forth. Instructions 518 may comprise, for example, instructions that are capable of realizing at least a portion of one or more flow diagrams methods, processes, procedures, operations, functionality, technology, mechanisms, a combination thereof, etc. that are described herein or illustrated in the accompanying drawings. Settings/parameters 520 may comprise, by way of example but not limitation, one or more settings or parameters that may be established by a user or other entity, one or more settings or parameters that may be determined by a server device 112, one or more settings or parameters that may be determined by a user or other entity, one or more settings or parameters that may be detected by a server device 112, one or more settings or parameters that may be received from another device that detected them, one or more settings or parameters that may determine at least partly how a server device 112 is to operate or respond to a situation or a behavioral fingerprint, one or more settings or parameters (e.g., values) that may be used to realize flow diagrams, methods, processes, procedures, operations, functionality, technology, mechanisms, a combination thereof, etc. that are described herein or illustrated in the accompanying drawings. Settings/parameters 520 may control at least partially how at least one behavioral fingerprint 110 is configured, stored, shared, used, applied, some combination thereof, or so forth. Additionally or alternatively, at least a portion of settings/parameters 520 may be at least partially integrated with at least one behavioral fingerprint 110.

For certain example embodiments, logic 506 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings. Circuitry 508 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings, wherein circuitry 508 comprises at least one physical or hardware component or aspect.

For certain example embodiments, one or more communication interfaces 510 may provide one or more interfaces between server device 112 and another device or a person/operator/entity directly or indirectly. A wireless communication interface 510a or a wired communication interface 510b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, a combination thereof, etc.), a physical or logical network adapter or port, a frequency converter, a baseband processor, an internet or telecommunications backbone connector, a fiber optic connector, a storage area network (SAN) connector, a combination thereof, etc. to communicate wireless signals or wired signals via one or more wireless communication links or wired communication links, respectively, such as over one or more channels 108 (e.g., of FIGS. 1 and 2A). Communications with at least one communication interface 510 may enable transmitting, receiving, or initiating of transmissions, just to name a few examples.

For certain example embodiments, at least one interconnect 512 may enable signal communication between or among components of server device 112. Interconnect 512 may comprise, by way of example but not limitation, one or more buses, channels, switching fabrics, local area networks (LANs), storage area networks (SANs), some combination thereof, or so forth. Although not explicitly illustrated in FIG. 5, one or more components of server device 112 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of server device 112. Power source 514 may comprise, by way of example but not limitation, a power connector for accessing an electrical grid, a fuel cell, a solar power source, some combination thereof, or so forth.

For certain example embodiments, an entity interface 516 may enable one or more entities (e.g., another device, a person, a group, a robotic entity, a combination thereof, etc.) to provide input to or receive output from server device 112. Interactions between an entity and a device may relate, by way of example but not limitation, to inputting or outputting instructions, commands, settings, parameters, indications, some combination thereof, or so forth. Certain entity interfaces 516 may enable both entity input and entity output at server device 112 or over at least one network link, such as one or more channels 108 (e.g., of FIGS. 1 and 2A).

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize at least one setting or parameter 520.

It should also be understood that for certain example implementations components that are illustrated in schematic diagram 500 or described herein may not be integral or integrated with a server device 112. For example, a component may be removably connected to a server device 112, a component may be wirelessly coupled to a server device 112, one or more components of a server device 112 may be geographically distributed or separated from one another, some combination thereof, or so forth. By way of example only, instructions 518 may be stored on one medium 504, and settings/parameters 520 (or another portion of instructions 518) may be stored on a different medium 504, which may comprise a same server or a part of a different server of, e.g., a server farm. Additionally or alternatively, respective processor-media sets may be physically realized on different or respective server blades or server containers. Multiple server blades, for instance, may be linked or interlinked to realize at least one server device 112. However, claimed subject matter is not limited to any particular described embodiments, implementations, examples, etc.

Figure 6A:
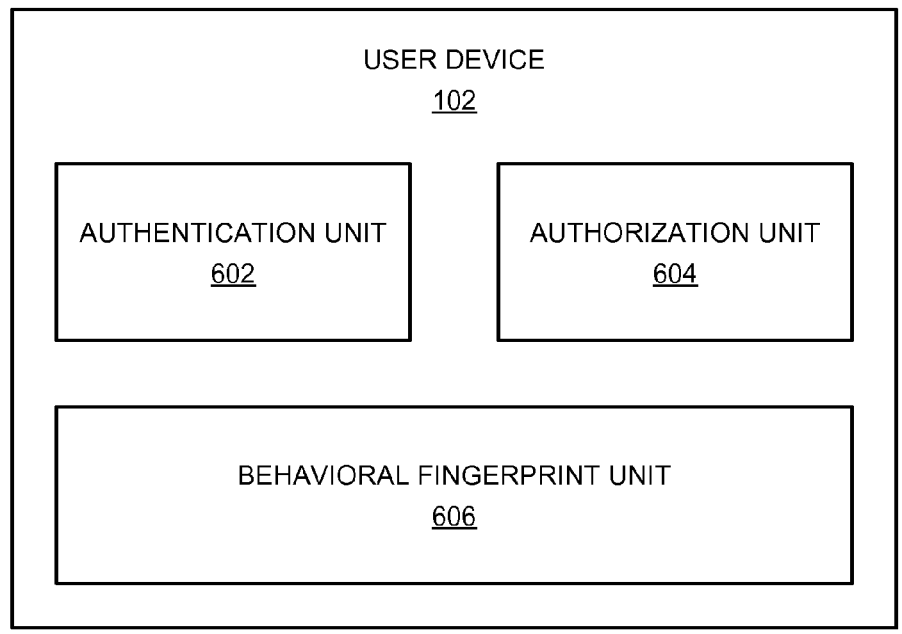
FIGS. 6A and 6B are schematic diagrams of an example user device and an example server device, respectively, that have one or more functional units in accordance with certain example embodiments.
Figure 6B:
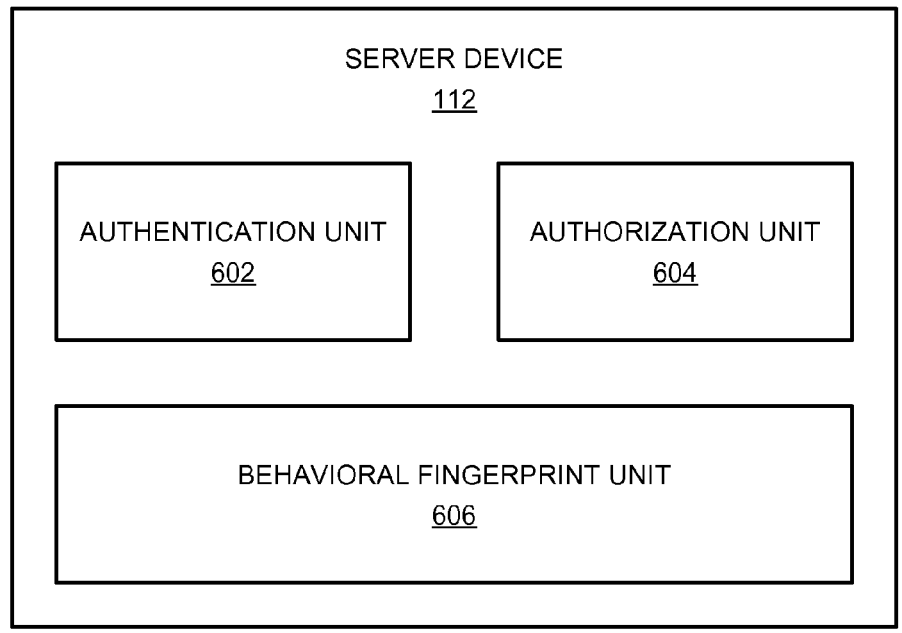

FIGS. 6A and 6B are schematic diagrams 600A and 600B of an example user device and an example server device, respectively, that have one or more functional units in accordance with certain example embodiments. As shown in FIGS. 6A and 6B, by way of example but not limitation, schematic diagrams 600A and 600B may comprise a user device 102 and a server device 112, respectively. As illustrated in schematic diagrams 600A and 600B, a user device 102 or a server device 112 may include, but are not limited to, at least one authentication unit 602, at least one authorization unit 604, at least one behavioral fingerprint unit 606, a combination thereof, or so forth. However, a user device 102 or a server device 112 may alternatively include more, fewer, or different unit(s) from those that are illustrated without departing from claimed subject matter.

For certain example embodiments, a unit may be comprised of at least one processor (e.g., a processor 402 of FIG. 4, a processor 502 of FIG. 5, a combination thereof, etc.), one or more media (e.g., a medium 404 of FIG. 4, a media medium 504 of FIG. 5, a combination thereof, etc.), instructions (e.g., processor-executable instructions, instructions 420 of FIG. 4, instructions 518 of FIG. 5, computer-implementable instructions, a combination thereof, etc.), logic (e.g., logic 406 of FIG. 4, logic 506 of FIG. 5, a combination thereof, etc.), circuitry (e.g., circuitry 408 of FIG. 4, circuitry 508 of FIG. 5, a combination thereof, etc.), other described or illustrated component(s), some combination thereof, or so forth. For certain example implementations, one or more units (e.g., an authentication unit 602, an authorization unit 604, a behavioral fingerprint unit 606, a combination thereof, etc.) of at least one user device 102 may function or interoperate with one or more units of at least one server device 112. However, claimed subject matter is not limited to any particular described embodiments, implementations, examples, etc.

For certain example embodiments, an authentication unit 602 may operate to authenticate a user of a device. For certain example implementations, a user of a device may be authenticated by determining to some (e.g., reasonable, acceptable, measurable, quantifiable, a combination thereof, etc.) degree an identity of a user. By way of example but not limitation, an authentication unit 602 may enable implementation of multiple degrees of authentication, with different degrees of authentication corresponding to different levels of certainty of an identity of a user. Example aspects related to authentication are described further herein (e.g., at least herein above with particular reference to FIG. 1). However, claimed subject matter is not limited to any particular described embodiments, implementations, examples, etc.

For certain example embodiments, an authorization unit 604 may operate to permit or enable full or at least partial access to, use of, implementation of, execution of, a combination thereof, etc. one or more features, applications, accounts, profiles, data, capabilities, a combination thereof, etc. of at least one device, such as a user device 102 or a server device 112. For certain example implementations, authorization may be fully or at least partially granted, denied, withheld, a combination thereof, etc. based at least partially on an authentication determination, a result from an authentication unit 602, some combination thereof, or so forth. By way of example but not limitation, an authorization unit 604 may provide for different levels of authorization, including but not limited to for a given authorized user, that correspond to different degrees of authentication, that correspond to different user identities, some combination thereof, or so forth. Example aspects related to authorization are described further herein (e.g., at least herein above with particular reference to FIG. 1). However, claimed subject matter is not limited to any particular described embodiments, implementations, examples, etc.

For certain example embodiments, a behavioral fingerprint unit 606 may operate to implement, perform, facilitate performance of, a combination thereof, etc. one or more flow diagrams, methods, processes, procedures, operations, functionality, technology, mechanisms, a combination thereof, etc. that are described herein or illustrated in the accompanying drawings or that relate to at least one behavioral fingerprint. For certain example implementations, a behavioral fingerprint unit 606 may provide information, monitored acts, likelihood values, determinations, comparisons, analyses, indications, predicted acts, a combination thereof, etc. to an authentication unit 602 on which it may at least partially base an authentication determination. Example aspects related to behavioral fingerprinting are described further herein above and below. However, claimed subject matter is not limited to any particular described embodiments, implementations, examples, etc.

FIG. 7A is a schematic diagram 700A that includes at least one example device that is capable of handling scenarios for behavioral fingerprinting via derived personal relation in accordance with certain example embodiments. As shown in FIG. 7A, by way of example but not limitation, schematic diagram 700A includes at least one device that may comprise a personal relation indication derivation unit 702 or a behavioral fingerprint incorporation unit 704. More specifically, schematic diagram 700A may include a user device 102 or a server device 112. By way of example but not limitation, a personal relation indication derivation unit 702 or a behavioral fingerprint incorporation unit 704 may comprise one or more modules, hardware, software, firmware, logic, circuitry, some combination thereof, or so forth. However, claimed subject matter is not limited to any particular described embodiments, implementations, examples, etc.

For certain example embodiments, a personal relation indication derivation unit 702 or a behavioral fingerprint incorporation unit 704 may be implemented separately or at least partially jointly or in combination. A personal relation indication derivation unit 702 may be configured to derive at least one indication of personal relation for at least one authorized user via at least one user-device interaction. A behavioral fingerprint incorporation unit 704 may be configured to incorporate the at least one indication of personal relation into at least one behavioral fingerprint that is associated with the at least one authorized user, with the at least one behavioral fingerprint including one or more indicators of utilization of one or more user devices by the at least one authorized user. However, claimed subject matter is not limited to any particular described embodiments, implementations, examples, etc.

Figure 7B:
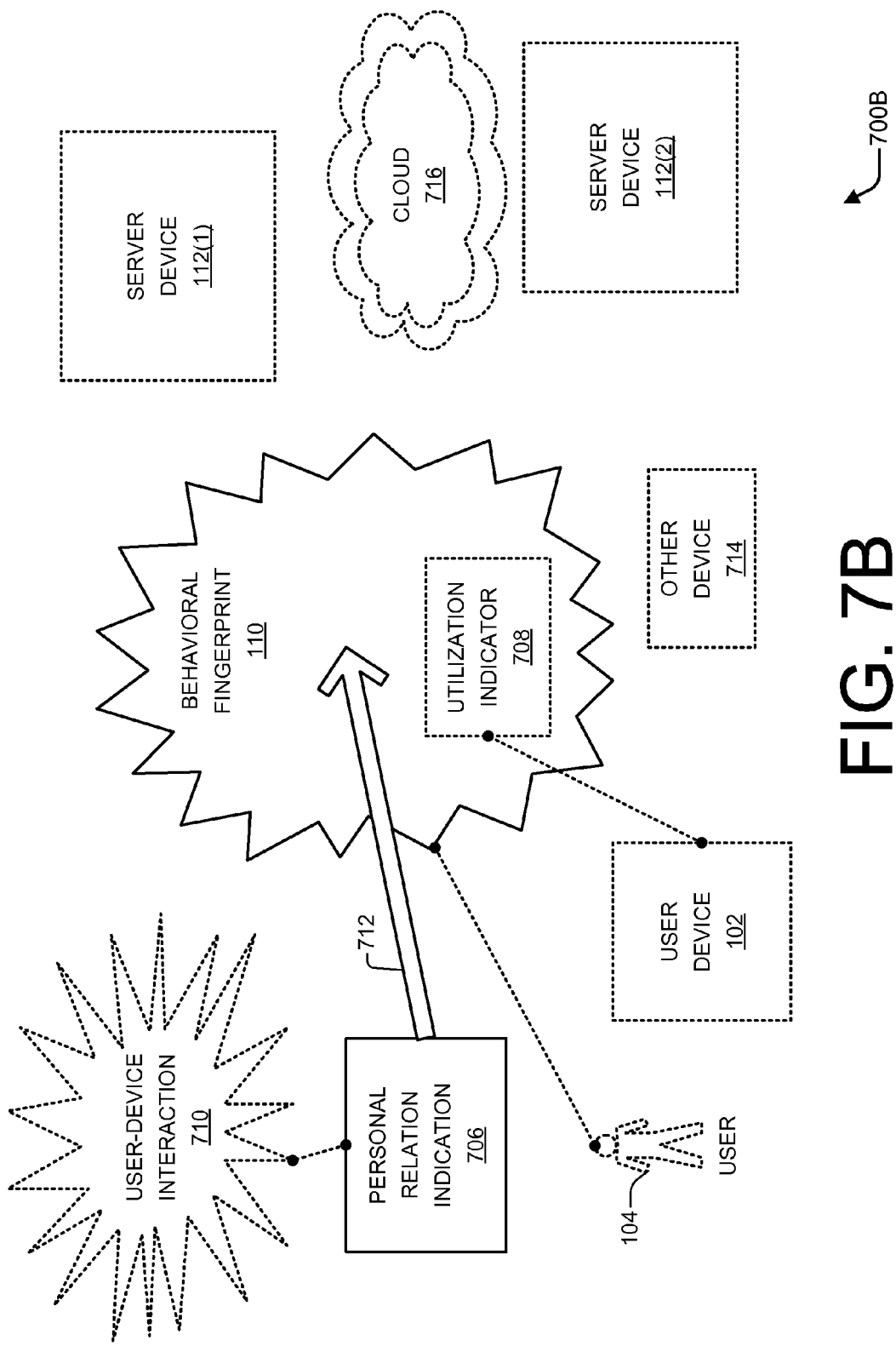
FIGS. 7B-7D are schematic diagrams that include at least one example device and that depict example scenarios for implementing behavioral fingerprinting via derived personal relation in accordance with certain example embodiments.
Figure 7C:
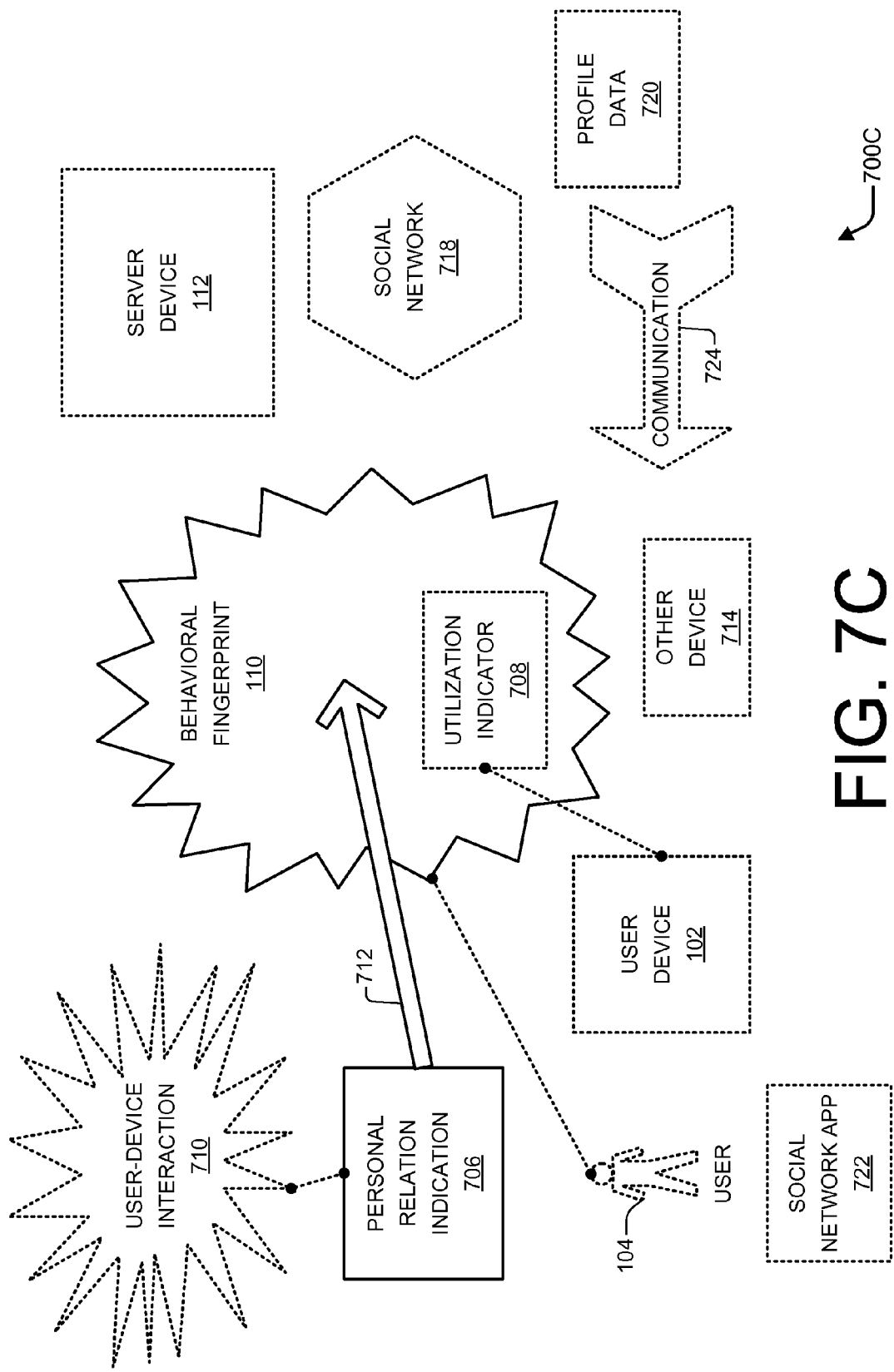
Figure 7D:
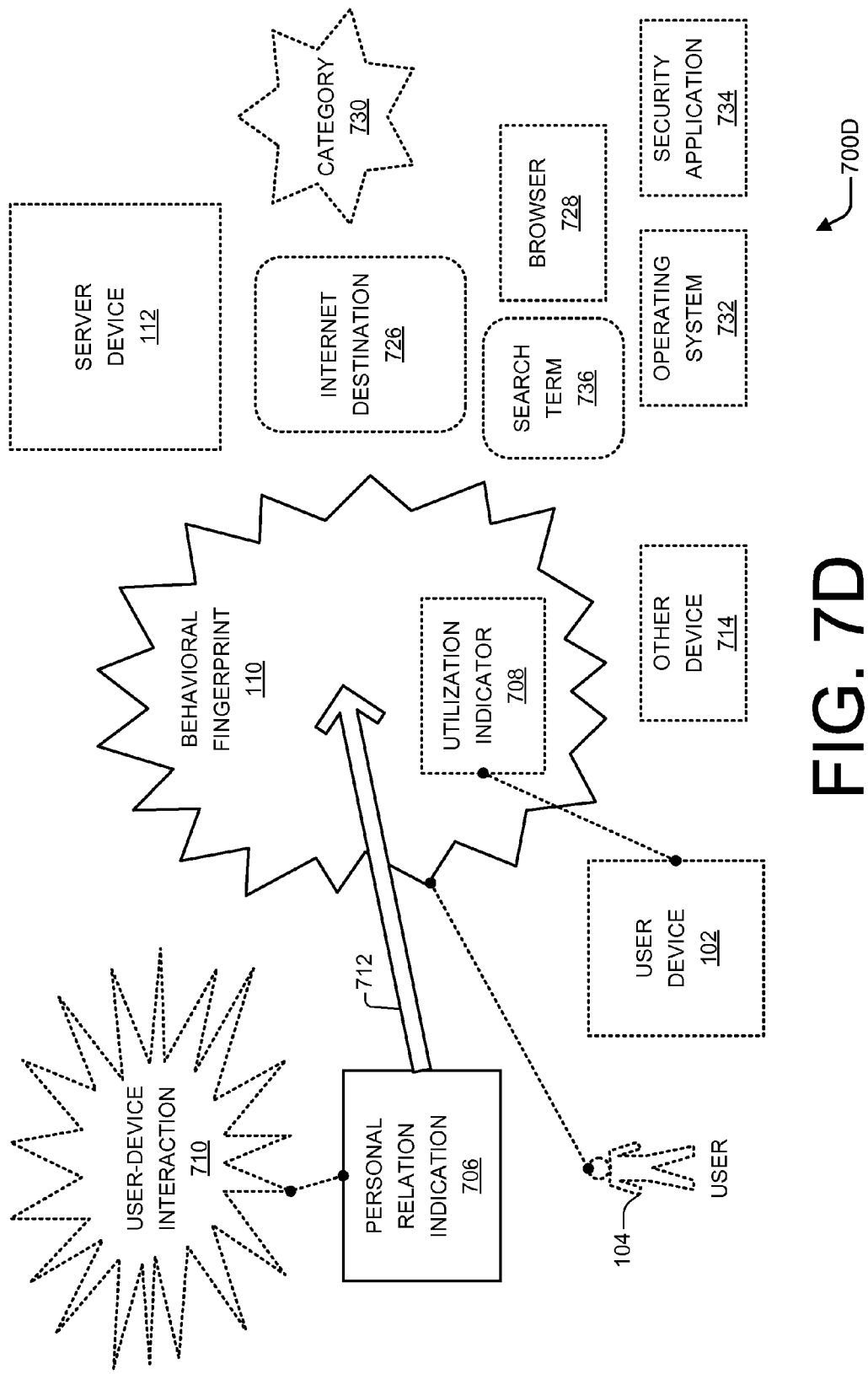

FIGS. 7B-7D are schematic diagrams 700B-700D that include at least one example device and that depict example scenarios for implementing behavioral fingerprinting via derived personal relation in accordance with certain example embodiments. As shown in FIGS. 7B-7D, by way of example but not limitation, one or more of schematic diagrams 700B-700D may include at least one user device 102, at least one user 104, at least one behavioral fingerprint 110, at least one server device 112, at least one personal relation indication 706, at least one utilization indicator 708, at least one user-device interaction 710, at least one incorporation 712, or at least one other device 714. Each of schematic diagrams 700B-700D may include alternative or additional depictions, which may relate to behavioral fingerprinting via derived personal relation, as described herein. In addition to or in alternative to description herein below with specific reference to FIGS. 7B-7D, illustrated aspects of schematic diagrams 700B-700D may be relevant to example description with reference to FIG. 8A-8L or 9A-9G. However, claimed subject matter is not limited to any particular described embodiments, implementations, examples, etc.

As shown in FIG. 7B, by way of example but not limitation, schematic diagram 700B may include at least one user device 102, at least one user 104, at least one behavioral fingerprint 110, at least one server device 112, at least one personal relation indication 706, at least one utilization indicator 708, at least one user-device interaction 710, at least one incorporation 712, at least one other device 714, or at least one cloud 716. More specifically, schematic diagram 700B may include a user device 102 that may correspond to a user 104, which user may comprise an authorized user or an unauthorized user; a server 112(1) or a server 112(2); an indication of personal relation 706; an indicator of utilization 708 of one or more user devices, such as a user device 102; or at least one user-device interaction 710, which may facilitate derivation of at least one personal relation indication 706. For certain example embodiments, at least one personal relation indication 706 may include an indication of if, whether, how, a combination thereof, etc. a particular individual is related from a family or relational perspective to a user 104. An indication of personal relation 706 (or personal relation indication 706) may comprise, by way of example but not limitation, at least one other indication 324 (e.g., of FIG. 3) or at least one utilization indicator 708. For certain example embodiments, a user-device interaction 710 may include a passive, an active, a receptive, an initiated, a monitoring, a participating, a combination thereof, etc. type of interaction between at least one user and one or more devices (e.g., a user device 102, a server device 112, a combination thereof, etc.). For certain example implementations, an incorporation 712 may include incorporating at least a portion of a personal relation indication 706 into at least one behavioral fingerprint 110. However, claimed subject matter is not limited to any particular described embodiments, implementations, examples, etc.

For certain example embodiments, at least one utilization indicator 708 may correspond to (e.g., be monitored, detected, observed, effected, a combination thereof, etc. at or by) a user device 102. An indicator of utilization 708 (or utilization indicator 708) may comprise, by way of example but not limitation, at least one indicator of any of indicators 302-322 (e.g., of FIG. 3). An indication of personal relation 706 (or personal relation indication 706) may comprise, by way of example but not limitation, at least one other indication 324 (e.g., of FIG. 3). However, claimed subject matter is not limited to any particular described embodiments, implementations, examples, etc.

For certain example embodiments, a server device 112(1) may be operated by or for a social network. A social network may include, by way of example but not imitation, a network, a service, an internet destination, a website, a computing infrastructure, an application, an interface, cloud computing, a combination thereof, etc. that enables or facilitates interaction (e.g., via text, images, audio, video, a combination thereof, etc.) between or among two or more members of the social network. The term "social" in social networks should not be interpreted to exclude networks designed or intended for professional or specific purposes. Examples of social networks may include, but are not limited to, Facebook, Google+, Twitter, LinkedIn, Myspace, Pinterest, Classmates [dot]com, Flickr, Foursquare, Friendster, Netlog, Orkut, Sina Weibo, Ozone, Habbo, Instagram, and so forth. For certain example embodiments, a server device 112(2) may be operated by or for another entity, such as a third party. For certain example implementations, another entity that is affiliated with a server device 112(2) may comprise a provider or utilizer of a cloud service or cloud computing, as represented by cloud 716. However, claimed subject matter is not limited to any particular described embodiments, implementations, examples, etc.

For certain example embodiments, an other device 714 may be operated or owned by a user 104, may be operated or owned by a service provider, may be operated or owned by a social network, may be operated or owned by a third party, may be operated by one of the above and owned by another, and so forth. For certain example implementations, other device 714 may be communicatively coupled to user device 102. By way of example but not limitation, other device 714: may be integrated with user device 102, may be physically connected to user device 102, may be wirelessly coupled to user device 102, may be coupled by wire to user device 102, a combination thereof, and so forth. Other device 714 may additionally or alternatively be capable of bidirectional or unidirectional communication with a server 112(1) or a server 112(2) (e.g., via one or more channels 108 (e.g., of FIGS. 1 and 2A), which channel(s) may include at least one network, such as an internet). Other device 714 may comprise, by way of example but not limitation, a point-of-sale (POS) terminal, such as a register; an attachment augmenting a POS terminal; an attachment to a user device 102; a device that accepts credit, debit, or other payment cards and is coupled to a user device 102; a device that accepts or generates sensor readings and forwards them to a server 112; a device that forwards other data collected or produced at user device 102 to a server 112; a combination thereof; and so forth. Data (e.g., relating to behavioral fingerprinting, social networking, personal relations, a combination thereof, etc.) may be collected at or by other device 714 or funneled through other device 714 between or among at least one user device 102 or one or more server devices 112. However, claimed subject matter is not limited to any particular described embodiments, implementations, examples, etc. Additional or alternative description that may be relevant to schematic diagram 700B is provided herein below with particular reference to one or more of any of FIGS. 8A-8L or FIGS. 9A-9G.

As shown in FIG. 7C, by way of example but not limitation, schematic diagram 700C may include at least one user device 102, at least one user 104, at least one behavioral fingerprint 110, at least one server device 112, at least one personal relation indication 706, at least one utilization indicator 708, at least one user-device interaction 710, at least one incorporation 712, at least one other device 714, at least one social network 718, at least some profile data 720, at least one social network app 722, or at least one social network communication 724. Additional or alternative description that may be relevant to schematic diagram 700C is provided herein below with particular reference to one or more of any of FIGS. 8A-8L or FIGS. 9A-9G.

As shown in FIG. 7D, by way of example but not limitation, schematic diagram 700D may include at least one user device 102, at least one user 104, at least one behavioral fingerprint 110, at least one server device 112, at least one personal relation indication 706, at least one utilization indicator 708, at least one user-device interaction 710, at least one incorporation 712, at least one other device 714, one or more internet destinations 726, at least one browser 728, at least one category 730, at least one operating system (OS) 732, at least one security application 734, or one or more search terms 736. Additional or alternative description that may be relevant to schematic diagram 700D is provided herein below with particular reference to one or more of any of FIGS. 8A-8L or FIGS. 9A-9G.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
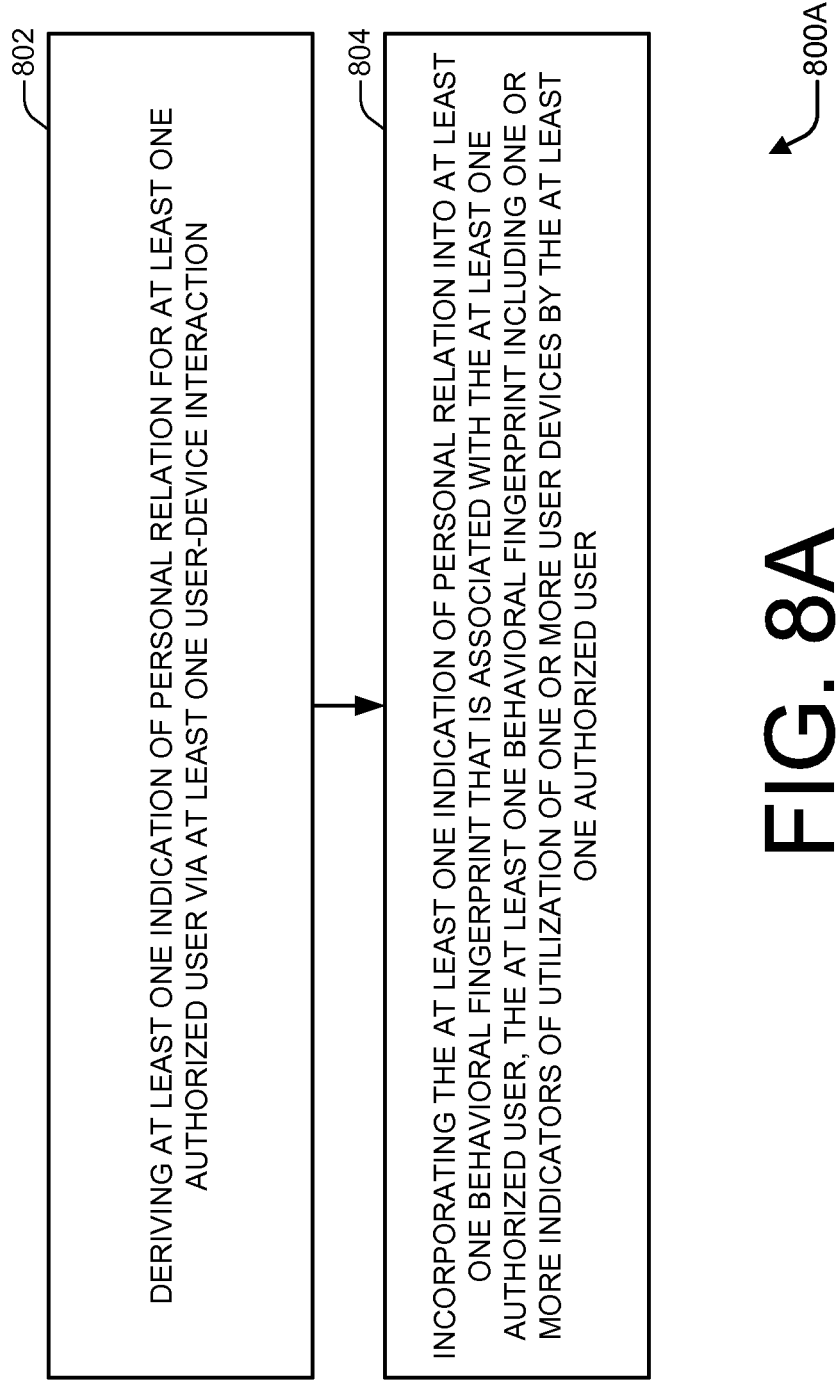
FIG. 8A is a flow diagram illustrating an example method for at least one device with regard to behavioral fingerprinting via derived personal relation in accordance with certain example embodiments.

FIG. 8A is a flow diagram 800A illustrating an example method for at least one device with regard to behavioral fingerprinting via derived personal relation in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one user device (e.g., a user device 102) or at least one server device (e.g., a server device 112).

For certain example embodiments, a method for behavioral fingerprinting via derived personal relation, which method may be at least partially implemented using hardware (e.g., circuitry, at least one processor, processor-accessible memory, a combination thereof, etc.) such as that of a user device or a server device, may comprise an operation 802 or an operation 804. An operation 802 may be directed at least partially to deriving at least one indication of personal relation for at least one authorized user via at least one user-device interaction. For certain example implementations, at least one device 102 or 112 (e.g., a user device 102, a server device 112, multiple ones thereof, etc.) may derive (e.g., deduce, ascertain, infer, conclude an existence of, glean, surmise, discover, determine, a combination thereof, etc.) at least one indication of personal relation 706 (e.g., one or more indications representing one or more familial relations (e.g., legal, biological, marital, family-in-law such as mother-in-law, parent-child, natural parent-child, adopted parent-child, daughter, uncle, spouse, domestic partner, significant other, boyfriend, girlfriend, partner, a combination thereof, etc.), one or more trust relations (e.g., attorney, doctor, nanny, babysitter, god parent, accountant, personal assistant, best friend, a combination thereof, etc.), one or more intimate relations (e.g., boyfriend, girlfriend, significant other, partner, fiancé, spouse, domestic partner, a combination thereof, etc.), one or more employment relations (e.g., employer, employee, contractor, boss, a combination thereof, etc.), some combination thereof, etc. between or among at least one authorized user and one or more individuals) for at least one authorized user (e.g., a user 104 that is authorized to use a given user device 102 to at least some extent, a user 104 that is associated with a behavioral fingerprint 110 corresponding to a given user device 102, a combination thereof, etc.) via at least one user-device interaction 710 (e.g., at least one interaction (e.g., a user inputting or sending data or information into or to a device, a user selecting from between or among options provided or offered by a device, a user submitting a request to a device, a user responding to an inquiry from a device, a user viewing or otherwise visiting one or more internet destinations via a device, a user entering one or more search terms via a device, a user making one or more purchases via a device, a user visiting one or more physical locations with a device, a combination thereof, etc.) between or among at least one user (e.g., an authorized user, an unauthorized user, a user that is authorized by designation, a combination thereof, etc.) and one or more devices (e.g., a user device 102, a server device 112, a combination thereof, etc.)). By way of example but not limitation, a service provider (e.g., an authentication service provider operating at least partially via a cloud computing service or a web infrastructure, such as Apple's iCloud or ebay's PayPal) may derive (e.g., deduce based at least partly on (i) a user response to a device inquiry or (ii) a user submission of a request to a device) at least one indication (e.g., a label, a categorization, a code, a tag, an assignment, one or more words, a combination thereof, etc.) of personal relation (e.g., a parent-child or spousal family relationship, an employee-employer relationship, a co-parent relationship, a fiancé relationship, a combination thereof, etc.) for at least one authorized user (e.g., an owner or permitted operator of an Apple iPhone) via at least one user-device interaction (e.g., a user visiting a website, a user entering at least one search term, a combination thereof, etc.). However, claimed subject matter is not limited to any particular described embodiments, implementations, examples, etc.

For certain example embodiments, an operation 804 may be directed at least partially to incorporating the at least one indication of personal relation into at least one behavioral fingerprint that is associated with the at least one authorized user, the at least one behavioral fingerprint including one or more indicators of utilization of one or more user devices by the at least one authorized user. For certain example implementations, at least one device 102 or 112 (e.g., a user device 102, a server device 112, multiple ones thereof, etc.) may incorporate 712 (e.g., add, integrate, supplement with, establish links between or among individuals reflecting familial relations thereof, update using, augment with, replace with, modify using, adapt using, delete at least a portion of, change statistics using, create at least one new predicted act based at least partially on, alter at least one existing predicted act based at least partially on, a combination thereof, etc.) at least one indication of (e.g., a label, a categorization, a code, a tag, an assignment, one or more words, a combination thereof, etc. communicating or representing a) personal relation 706 into at least one behavioral fingerprint 110 that is associated with at least one authorized user, with at least one behavioral fingerprint 110 including one or more indicators 302-322 (e.g., one or more of any of indicators 302-322 of FIG. 3 as described herein above, including but not limited to predicted acts 322) of utilization 708 (e.g., accessing, using, interacting with, carrying, moving from place to place, providing input to, receiving output from, communicating with, running apps on, requesting or completing or effecting transactions via, directing operation of, a combination thereof, etc.) of one or more user devices 102 by at least one authorized user 104. By way of example but not limitation, a service provider (e.g., an authentication service provider operating at least partially via the Internet, such as a Google web service, or a mobile device operating system, such as a Google Android OS) may incorporate (e.g., add at least one piece of datum of) at least one indication of personal relation (e.g., a label that is also applicable for a contact entry) into at least one behavioral fingerprint (e.g., a collection of observed or predicted acts or characteristics) that is associated with (e.g., that are derived from or attributable to) at least one authorized user (e.g., an owner or registered user of an Android-based smart phone), with the at least one behavioral fingerprint including one or more indicators of utilization (e.g., one or more stored representations of how a user operates a user interface of an Android device, an identification of one or more entities interacted with via the Android device, or a listing of one or more locations visited using the Android device) of one or more user devices (e.g., an Android-based mobile device such as a Samsung Galaxy smart phone) by the at least one authorized user. However, claimed subject matter is not limited to any particular described embodiments, implementations, examples, etc.

FIGS. 8B-8L depict example additions or alternatives for a flow diagram of FIG. 8A in accordance with certain example embodiments. As illustrated, flow diagrams of FIGS. 8B-8L may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8L may be performed so as to be fully or partially overlapping with other operation(s).

Figure 8B:
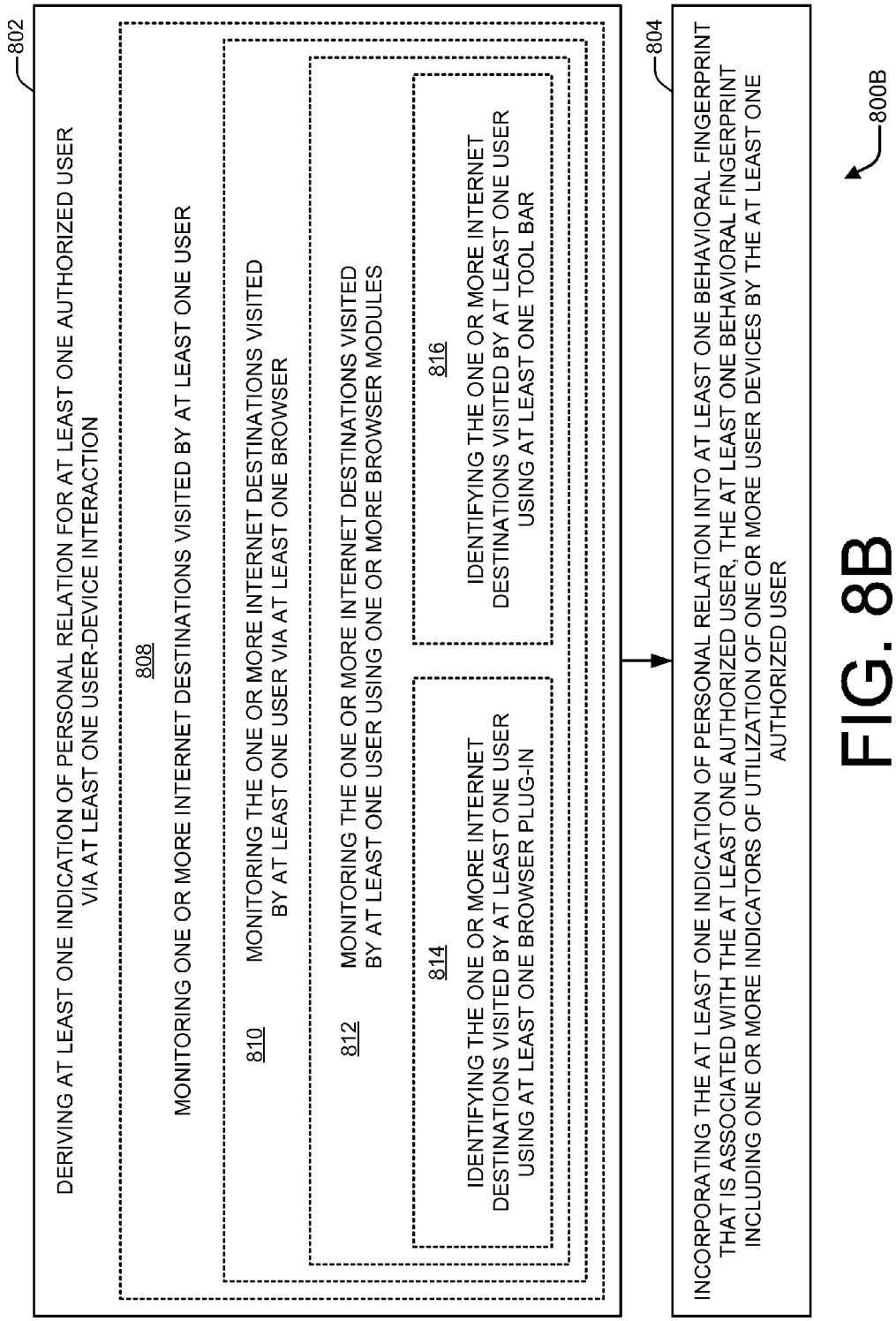

FIG. 8B illustrates a flow diagram 800B having example operations 808, 810, 812, 814, or 816. For certain example embodiments, an operation 808 may be directed at least partially to wherein the deriving at least one indication of personal relation for at least one authorized user via at least one user-device interaction (of operation 802) comprises monitoring one or more internet destinations visited by at least one user. For certain example implementations, at least one device may monitor (e.g., observe, detect, record, ascertain, store, a combination thereof, etc.) one or more internet destinations 726 (e.g., at least part of one or more web pages, internet sites, internet locations, URLs, internet-connected servers that may be contacted via or as a result of execution of at least one app or browser, a combination thereof, etc.) visited (e.g., at least partially rendered, displayed, viewed, downloaded, printed, electronically-contacted, information retrieved from, information provided to, a combination thereof, etc. as a result of typing at least a portion of an internet destination address into a browser address bar, as a result of clicking on a link in a browser or email or document, as a result of selecting a favorite or historical internet destination item, as a result of using an app, as a consequence of app or OS execution, a combination thereof, etc.) by at least one user 104. By way of example but not limitation, a cloud-based mechanism (e.g., an Amazon server providing server-enhanced Silk browsing) may monitor one or more internet destinations visited (e.g., may record which websites are viewed on a Kindle Fire or which internet locations are accessed by apps executing on a Kindle Fire) by at least one user. However, claimed subject matter is not limited to any particular described embodiments, implementations, examples, etc.

For certain example embodiments, an operation 810 may be directed at least partially to wherein the monitoring one or more internet destinations visited by at least one user (of operation 808) comprises monitoring the one or more internet destinations visited by at least one user via at least one browser. For certain example implementations, at least one device may monitor one or more internet destinations 726 visited by at least one user 104 via at least one browser 728 (e.g., a web browser, a desktop browser, a mobile browser, an open source browser, a proprietary browser, a stand-alone browser, an embedded browser, any combination thereof, etc.). By way of example but not limitation, a browser (e.g., a Google Chrome browser running on a desktop machine) may monitor (e.g., detect and record locally or report remotely) one or more internet destinations (e.g., a sequence of news-oriented websites such as NBC, CNN, and Fox News) that are visited by at least one user (e.g., an authorized user). However, claimed subject matter is not limited to any particular described embodiments, implementations, examples, etc.

For certain example embodiments, an operation 812 may be directed at least partially to wherein the monitoring the one or more internet destinations visited by at least one user via at least one browser (of operation 810) comprises monitoring the one or more internet destinations visited by at least one user using one or more browser modules. For certain example implementations, at least one device may monitor one or more internet destinations 726 that are visited by at least one user 104 using one or more modules of a browser 728. By way of example but not limitation, a toolbar-providing company (e.g., Ask[dot]com) may monitor one or more internet destinations visited by at least one user (e.g., may store visited websites or may organize visited websites by category) using one or more browser modules (e.g., a toolbar). However, claimed subject matter is not limited to any particular described embodiments, implementations, examples, etc.

For certain example embodiments, an operation 814 may be directed at least partially to wherein the monitoring the one or more internet destinations visited by at least one user using one or more browser modules (of operation 812) comprises identifying the one or more internet destinations visited by at least one user using at least one browser plug-in. For certain example implementations, at least one device may identify one or more internet destinations 726 visited by at least one user 104 using at least one plug-in for a browser 728. By way of example but not limitation, an internet security company (e.g., McAfee) may identify one or more internet destinations visited by at least one user (e.g., may store locally on a user device or send to a remote server device) using at least one browser plug-in (e.g., a safe-surfing Internet Explorer plug-in running on a user device). However, claimed subject matter is not limited to any particular described embodiments, implementations, examples, etc.

For certain example embodiments, an operation 816 may be directed at least partially to wherein the monitoring the one or more internet destinations visited by at least one user using one or more browser modules (of operation 812) comprises identifying the one or more internet destinations visited by at least one user using at least one tool bar. For certain example implementations, at least one device may identify one or more internet destinations 726 visited by at least one user 104 using at least one tool bar (e.g., an app, a feature, a module, a combination thereof, etc. that integrates at least partially with a browser and offers augmented or alternative functionality). By way of example but not limitation, a payments company (e.g., Google with Google Wallet) may identify one or more internet destinations visited by at least one user (e.g., track and retain visited websites in a user profile) using at least one tool bar (e.g., a Google Tool Bar for an Internet Explorer or Firefox browser). However, claimed subject matter is not limited to any particular described embodiments, implementations, examples, etc.

Figure 8C:
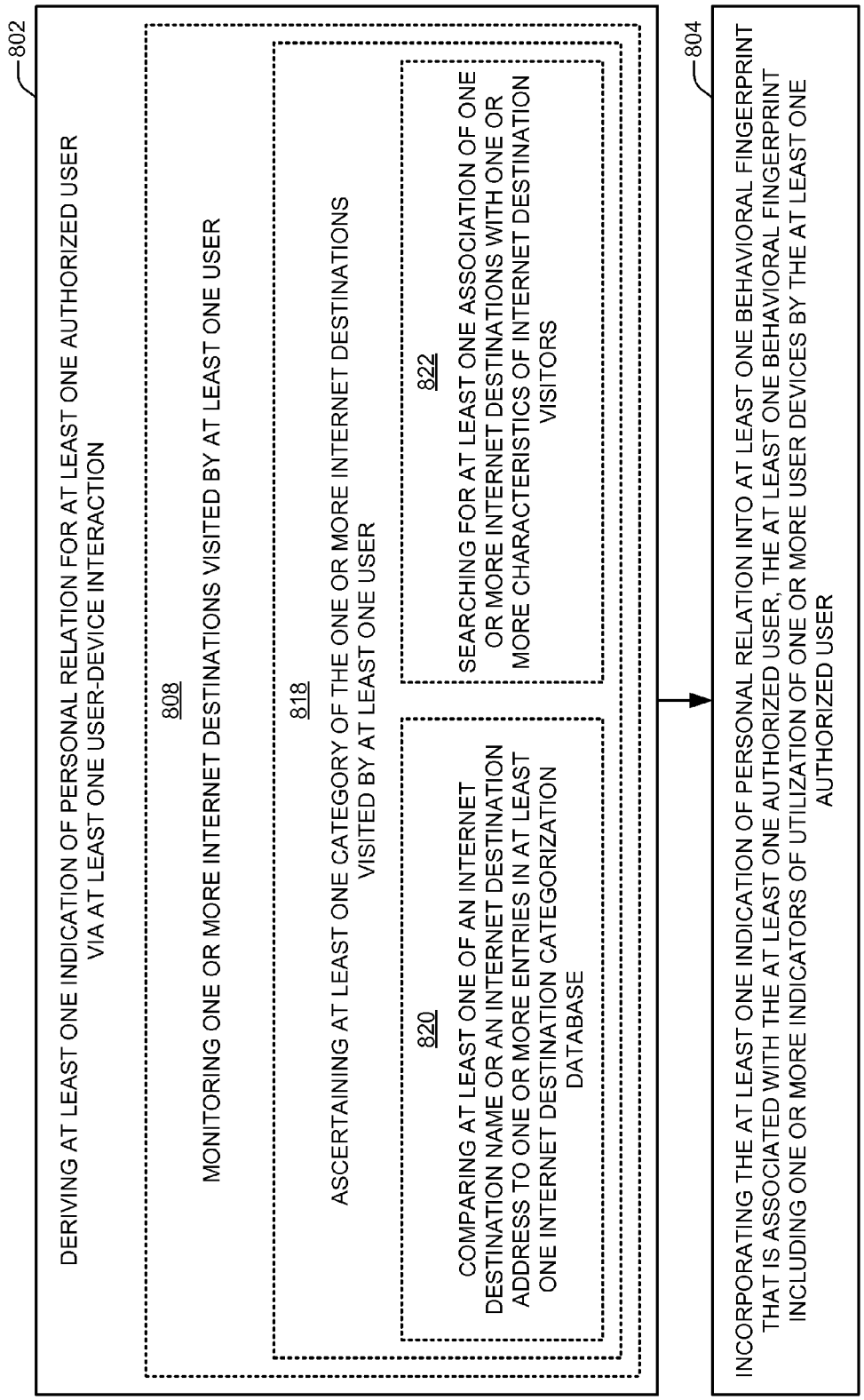

FIG. 8C illustrates a flow diagram 800C having example operations 818, 820, or 822. For certain example embodiments, an operation 818 may be directed at least partially to wherein the monitoring one or more internet destinations visited by at least one user (of operation 808) comprises ascertaining at least one category of the one or more internet destinations visited by at least one user. For certain example implementations, at least one device may ascertain (e.g., determine, acquire, divine, a combination thereof, etc.) at least one category 730 (e.g., a topic; a subject-matter; a target-audience; a direct user, such as viewer; an indirect user, such as an entity of benefit like a charity or a gift recipient of something offered; a sub-topic; an age, gender, or other demographic attribute of a targeted audience; a combination thereof; etc.) of one or more internet destinations 726 visited by at least one user 104. By way of example but not limitation, a payments company that is interested in authentication (e.g., Paypal) may ascertain at least one category (e.g., maternity or baby-related) of one or more internet destinations visited by at least one user. However, claimed subject matter is not limited to any particular described embodiments, implementations, examples, etc.

For certain example embodiments, an operation 820 may be directed at least partially to wherein the ascertaining at least one category of the one or more internet destinations visited by at least one user (of operation 818) comprises comparing at least one of an internet destination name or an internet destination address to one or more entries in at least one internet destination categorization database. For certain example implementations, at least one device may compare at least one of an internet destination name (e.g., at least a portion of a name of a website owner or purveyor of goods or services thereof) or an internet destination address (e.g., a URL or underlying numerical designation) to one or more entries (e.g., at least a part of one or more fields, blocks, variables, tables, indexes, a combination thereof, etc.) in at least one internet destination categorization database (e.g., a hierarchical, networked, relational, a combination thereof, etc. database that links internet destinations to at least one corresponding category). By way of example but not limitation, a company that authorizes transactions (e.g., Amazon) may compare at least one of an internet destination name (e.g., Pottery Barn) or an internet destination address (e.g., "potterybarn[dot]com") to one or more entries in at least one internet destination categorization database (e.g., a database that links particular internet destinations to demographic information on people likely to want products from the particular internet destinations). However, claimed subject matter is not limited to any particular described embodiments, implementations, examples, etc.

For certain example embodiments, an operation 822 may be directed at least partially to wherein the ascertaining at least one category of the one or more internet destinations visited by at least one user (of operation 818) comprises searching for at least one association of one or more internet destinations with one or more characteristics of internet destination visitors. For certain example implementations, at least one device may search (e.g., analyze, review, inspect, a combination thereof, etc. tables, entries, spreadsheets, data structures, databases, a combination thereof, etc.) for at least one association (e.g., a one-way linking, a two-way linking, a tuple, a relation, a combination thereof, etc.) of one or more internet destinations with one or more characteristics (e.g., demographic information such as age, gender, income level, education a combination thereof, etc.; preferred style attributes; category of consumer; geographical location; likely related items desired; some combination thereof; and so forth) of internet destination visitors. By way of example but not limitation, a device running an operating system building a behavioral fingerprint (e.g., a tablet computer running a Microsoft Windows 8 OS) may search for at least one association of one or more internet destinations with one or more characteristics of internet destination visitors (e.g., may attempt to identify with consultation of a data structure an age and gender associated with typical visitors to various Disney websites). However, claimed subject matter is not limited to any particular described embodiments, implementations, examples, etc.

Figure 8D:
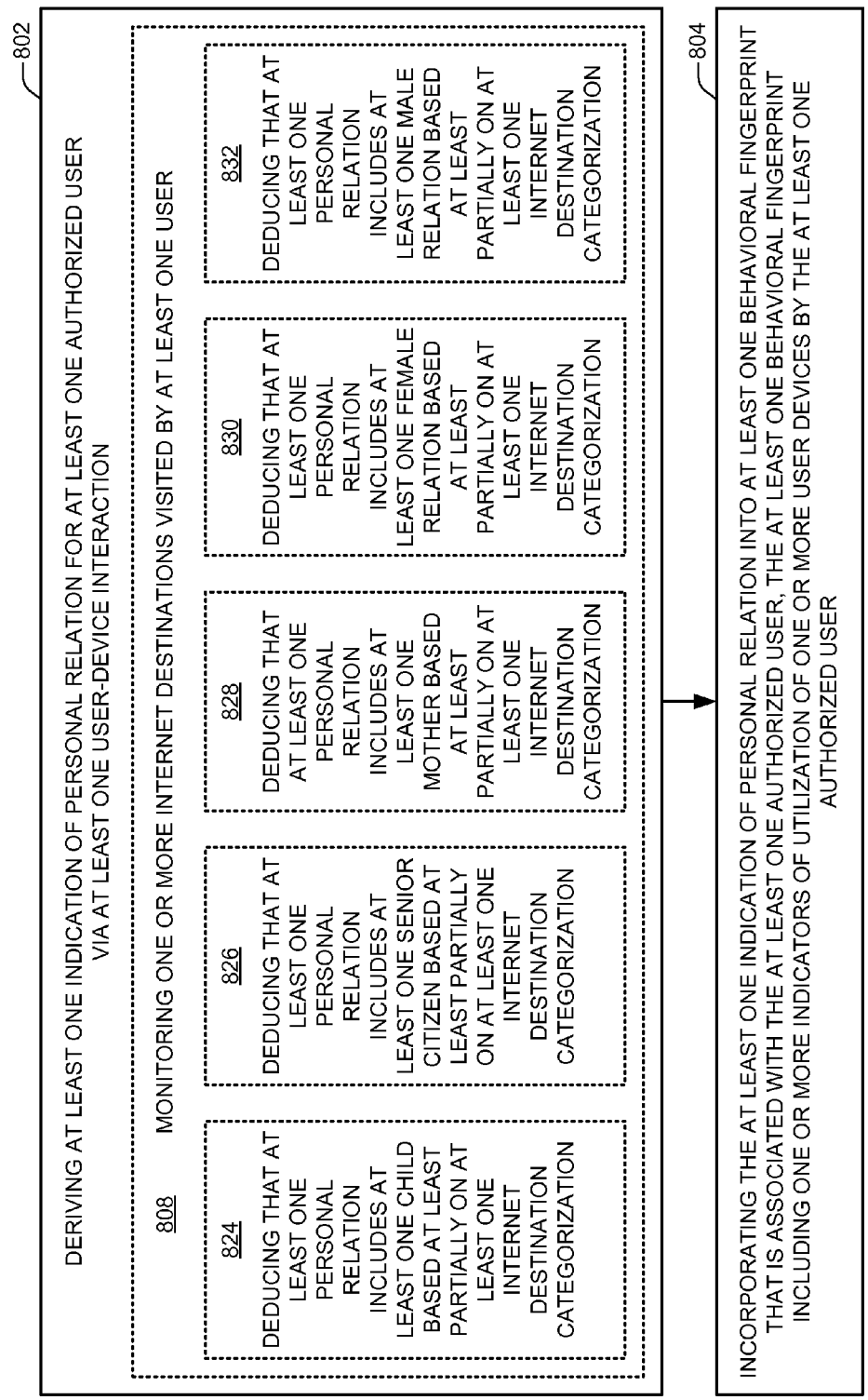

FIG. 8D illustrates a flow diagram 800D having example operations 824, 826, 828, 830, or 832. For certain example embodiments, an operation 824 may be directed at least partially to wherein the monitoring one or more internet destinations visited by at least one user (of operation 808) comprises deducing that at least one personal relation includes at least one child based at least partially on at least one internet destination categorization. For certain example implementations, at least one device may deduce (e.g., infer, conclude from evidence, determine, reason, surmise, glean, a combination thereof, etc.) that at least one personal relation (e.g., at least one person that is a legal or effective family member) includes at least one child (e.g., a person under 18, a teenager, a juvenile, an infant, a combination thereof, etc.) based at least partially on at least one internet destination categorization (e.g., a category applied to or associated with an internet destination). By way of example but not limitation, an internet security suite (e.g., from Kaspersky) may deduce that at least one personal relation includes at least one child (e.g., that an authorized user has a child between the ages of 7 and 13) based at least partially on at least one internet destination categorization (e.g., based on a kid categorization of one or more Nickelodeon websites that are viewed or Nickelodeon internet locations that are contacted via an app). However, claimed subject matter is not limited to any particular described embodiments, implementations, examples, etc.

For certain example embodiments, an operation 826 may be directed at least partially to wherein the monitoring one or more internet destinations visited by at least one user (of operation 808) comprises deducing that at least one personal relation includes at least one senior citizen based at least partially on at least one internet destination categorization. For certain example implementations, at least one device may deduce that at least one personal relation includes at least one senior citizen (e.g., a person over 55 years old, a person over 65 years old, a person that is retired, a person that is eligible for age-based governmental benefits, a combination thereof, etc.) based at least partially on at least one internet destination categorization (e.g., a group of websites reachable via an active seniors website gateway). By way of example but not limitation, an operating system (e.g., Apple OS X) or component thereof may deduce that at least one personal relation includes at least one senior citizen (e.g., may infer that an authorized user of age 40 has a living senior citizen parent) based at least partially on at least one internet destination categorization (e.g., a senior citizen categorization for an AARP internet destination or an AMAC internet destination that has been visited). However, claimed subject matter is not limited to any particular described embodiments, implementations, examples, etc.

For certain example embodiments, an operation 828 may be directed at least partially to wherein the monitoring one or more internet destinations visited by at least one user (of operation 808) comprises deducing that at least one personal relation includes at least one mother based at least partially on at least one internet destination categorization. For certain example implementations, at least one device may deduce that at least one personal relation includes at least one mother (e.g., a biological mother, a mother-in-law, a step-mother, a child that has become a mother, etc.) based at least partially on at least one internet destination categorization. By way of example but not limitation, a mobile device (e.g., authentication software running on an smart phone having an Android OS) may deduce that at least one personal relation includes at least one mother (e.g., that a 62 year old authorized user has a living mother) based at least partially on at least one internet destination categorization (e.g., a mother's day internet destination categorization for "1800flowers[dot]com" that is visited annually within a month of mother's day in conjunction with a happy-birthday-mom e-card that is sent each year in mid-April from an online card internet destination). However, claimed subject matter is not limited to any particular described embodiments, implementations, examples, etc.

For certain example embodiments, an operation 830 may be directed at least partially to wherein the monitoring one or more internet destinations visited by at least one user (of operation 808) comprises deducing that at least one personal relation includes at least one female relation based at least partially on at least one internet destination categorization. For certain example implementations, at least one device may deduce that at least one personal relation includes at least one female relation (e.g., a woman, a wife, a girl, a mom, a daughter, a grandmother, a combination thereof, etc.) based at least partially on at least one internet destination categorization. By way of example but not limitation, a mobile device (e.g., an iPad running Apple's iOS) may deduce that at least one personal relation (e.g., of an authorized user) includes at least one female relation (e.g., a wife or girlfriend) based at least partially on at least one internet destination categorization (e.g., a male authorized user is visiting and purchasing from multiple lingerie websites). However, claimed subject matter is not limited to any particular described embodiments, implementations, examples, etc.

For certain example embodiments, an operation 832 may be directed at least partially to wherein the monitoring one or more internet destinations visited by at least one user (of operation 808) comprises deducing that at least one personal relation includes at least one male relation based at least partially on at least one internet destination categorization. For certain example implementations, at least one device may deduce that at least one personal relation includes at least one male relation (e.g., a man, a husband, a boy, a father, a son, a grandfather, a combination thereof, etc.) based at least partially on at least one internet destination categorization. By way of example but not limitation, a server device (e.g., that is part of a cloud-based authentication service for mobile-device carrying customers) may deduce that at least one personal relation includes at least one male relation (e.g., a young son of an authorized user) based at least partially on at least one internet destination categorization (e.g., a young boy categorization from visitation of Pokemon websites via a home computer, which is linked to the authorized user, while a mobile device of the authorized user is with the authorized user at work). However, claimed subject matter is not limited to any particular described embodiments, implementations, examples, etc.

Figure 8E:
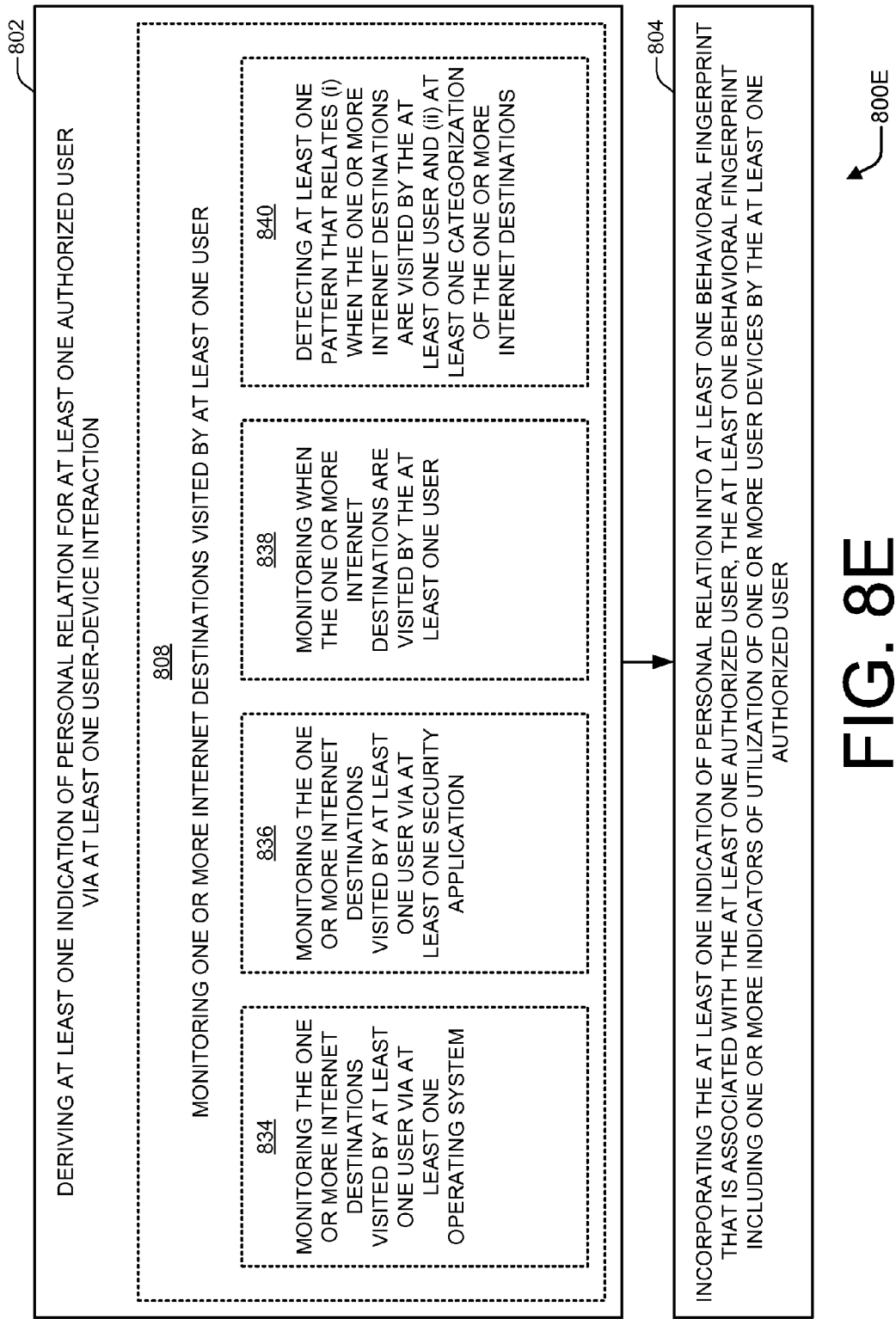

FIG. 8E illustrates a flow diagram 800E having example operations 834, 836, 838, or 840. For certain example embodiments, an operation 834 may be directed at least partially to wherein the monitoring one or more internet destinations visited by at least one user (of operation 808) comprises monitoring the one or more internet destinations visited by at least one user via at least one operating system. For certain example implementations, at least one device may monitor one or more internet destinations 726 visited by at least one user 104 via at least one operating system 732 (e.g., a desktop OS, a laptop OS, a tablet/slate OS, a mobile phone OS, an entertainment device OS, a combination thereof, etc.). By way of example but not limitation, a mobile device (e.g., an Apple iPhone or a Samsung Galaxy Tab) may monitor one or more internet destinations visited by at least one user (e.g., may collect or store or index internet destinations viewed on or otherwise visited via the mobile device) via (e.g., operating under the control or execution of) at least one operating system (e.g., a mobile OS such as an Apple iOS or a Google Android OS). However, claimed subject matter is not limited to any particular described embodiments, implementations, examples, etc.

For certain example embodiments, an operation 836 may be directed at least partially to wherein the monitoring one or more internet destinations visited by at least one user (of operation 808) comprises monitoring the one or more internet destinations visited by at least one user via at least one security application. For certain example implementations, at least one device may monitor one or more internet destinations 726 visited by at least one user 104 via at least one security application 734 (e.g., a desktop security application, a mobile device security application, a cloud-based security application, a stand-alone security application, a security application embedded or included in another application, a combination thereof, etc.). By way of example but not limitation, a desktop/laptop device (e.g., a Microsoft Windows notebook computer) may monitor one or more internet destinations visited by at least one user (e.g., may collect or store or index internet destinations requested from the desktop/laptop device) via (e.g., operating under the control or execution of) at least one security application (e.g., Symantec's Norton Internet Security Suite). However, claimed subject matter is not limited to any particular described embodiments, implementations, examples, etc.

For certain example embodiments, an operation 838 may be directed at least partially to wherein the monitoring one or more internet destinations visited by at least one user (of operation 808) comprises monitoring when the one or more internet destinations are visited by the at least one user. For certain example implementations, at least one device may monitor when (e.g., what time(s) of the day, what day(s) of the week, what date(s) each month, how frequently, at what level of repetition, a combination thereof, etc.) one or more internet destinations 726 are visited by at least one user 104. By way of example but not limitation, a server device (e.g., running a cloud-based authentication service for a user utilizing a mobile device to make purchases, open locked items, start vehicles, etc.) may monitor when one or more internet destinations are visited by at least one user (e.g., may discern that a flurry of internet destinations are visited most weekdays between 8:00 and 9:00 am during prime commuting time). However, claimed subject matter is not limited to any particular described embodiments, implementations, examples, etc.

For certain example embodiments, an operation 840 may be directed at least partially to wherein the monitoring one or more internet destinations visited by at least one user (of operation 808) comprises detecting at least one pattern that relates (i) when the one or more internet destinations are visited by the at least one user and (ii) at least one categorization of the one or more internet destinations. For certain example implementations, at least one device may detect at least one pattern (e.g., a recurring set of characteristics, a repeated occurrence of certain website viewings, a combination thereof, etc.) that relates (i) when one or more internet destinations 726 are visited by at least one user 104 and (ii) at least one categorization (e.g., application or assignment of at least one category 730) of the one or more internet destinations. By way of example but not limitation, a cloud-based payment authorization service (e.g., a server device operating in the cloud for Google Wallet, which may send authentication updates or authorizations to an Android mobile device) may detect at least one pattern that relates (i) when one or more internet destinations are visited by at least one user and (ii) at least one categorization of the one or more internet destinations (e.g., realize that websites devoted to four to six year old children are viewed each weekday between 12:30 and 1:00 pm, when a kindergartener may be returning home from school). However, claimed subject matter is not limited to any particular described embodiments, implementations, examples, etc.

FIG. 8F illustrates a flow diagram 800F having example operations 844, 846, 848, 850, or 852. For certain example embodiments, an operation 844 may be directed at least partially to wherein the deriving at least one indication of personal relation for at least one authorized user via at least one user-device interaction (of operation 802) comprises monitoring one or more search terms provided by at least one user. For certain example implementations, at least one device may monitor (e.g., observe, detect, record, ascertain, a combination thereof, etc.) one or more search terms 736 (e.g., words, phrases, alphanumeric characters, images, faces, sounds, a combination thereof, etc.) provided (e.g., entered, input, typed in, scanned in, referenced, forwarded, sampled, identified, clicked on, selected from a list of suggested searches or search terms, a combination thereof, etc.) by at least one user 104. By way of example but not limitation, a search mechanism implemented via an Internet connection (e.g., a map search) may monitor (e.g., apply to indexing or save for future search result ranking or for personal relation analysis) one or more search terms provided by at least one user (e.g., one or more word search terms entered verbally using Siri with an Apple iPhone). However, claimed subject matter is not limited to any particular described embodiments, implementations, examples, etc.

For certain example embodiments, an operation 846 may be directed at least partially to wherein the monitoring one or more search terms provided by at least one user (of operation 844) comprises monitoring the one or more search terms provided by at least one user via at least one browser. For certain example implementations, at least one device may monitor one or more search terms 736 provided by at least one user 104 via at least one browser 728 (e.g., a web browser, a desktop browser, a mobile browser, an open source browser, a proprietary browser, a stand-alone browser, an embedded browser, any combination thereof, etc.). By way of example but not limitation, a mobile browser (e.g., Safari running on an Apple iPad) may monitor (e.g., detect and store locally or report remotely) one or more search terms (e.g., a three word phrase) provided by at least one user via at least one browser (e.g., entered into a search bar integrated into a browser). However, claimed subject matter is not limited to any particular described embodiments, implementations, examples, etc.

For certain example embodiments, an operation 848 may be directed at least partially to wherein the monitoring the one or more search terms provided by at least one user via at least one browser (of operation 846) comprises monitoring the one or more search terms provided by at least one user using one or more browser modules. For certain example implementations, at least one device may monitor one or more search terms 736 provided by at least one user 104 using one or more modules of at least one browser 728. By way of example but not limitation, an extension to a browser (e.g., an extension to a Firefox browser running on a table computer) may monitor one or more search terms (e.g., a search suggestion on a Microsoft Bing webpage) provided by at least one user (e.g., selected by a user from a list of suggestions). However, claimed subject matter is not limited to any particular described embodiments, implementations, examples, etc.

For certain example embodiments, an operation 850 may be directed at least partially to wherein the monitoring the one or more search terms provided by at least one user using one or more browser modules (of operation 848) comprises identifying the one or more search terms provided by at least one user using at least one browser add-on. For certain example implementations, at least one device may identify one or more search terms 736 provided by at least one user 104 using at least one add-on to a browser 728. By way of example but not limitation, a company attempting to authenticate a mobile device user in order to authorize transactions (e.g., a credit card company such as Visa) may identify one or more search terms (e.g., "Decatur youth soccer league") provided by at least one user using at least one browser add-on (e.g., a server device of Visa may receive search terms sent from a browser add-on to Internet Explorer that is executing on a mobile device, which server device may authenticate or authorize a purchase of a soccer ball). However, claimed subject matter is not limited to any particular described embodiments, implementations, examples, etc.

For certain example embodiments, an operation 852 may be directed at least partially to wherein the monitoring the one or more search terms provided by at least one user using one or more browser modules (of operation 848) comprises identifying the one or more search terms provided by at least one user using at least one search tool bar. For certain example implementations, at least one device may identify one or more search terms 736 provided by at least one user 104 using at least one search tool bar (e.g., a an app, a feature, a module, a combination thereof, etc. that integrates at least partially into a browser and offers augmented or different search functionality, such as increased personalization). By way of example but not limitation, a payments company (e.g., Google's Google Wallet) may identify one or more search terms provided by at least one user using at least one search tool bar (e.g., a Google Search Tool Bar added to Internet Explorer may forward search terms to a Google server device in the cloud). However, claimed subject matter is not limited to any particular described embodiments, implementations, examples, etc.

FIG. 8G illustrates a flow diagram 800G having example operations 854, 856, 858, or 860. For certain example embodiments, an operation 854 may be directed at least partially to wherein the monitoring one or more search terms provided by at least one user (of operation 844) comprises ascertaining a category of the one or more search terms provided by at least one user. For certain example implementations, at least one device may ascertain (e.g., determine, acquire, divine, a combination thereof, etc.) a category 730 (e.g., an associated topic; a corresponding subject-matter; a label for likely requester or submitter; an associated subtopic; an age, gender, or other demographic attribute of a likely requester or submitter; a combination thereof; etc.; including, but not limited to, a category applicable to one or more search results, such as a likely viewer of such search results) of one or more search terms 736 provided by at least one user 104. By way of example but not limitation, a security company operating in the cloud (e.g., via at least one server device) may ascertain a category of one or more search terms provided by at least one user (e.g., TrendMicro may ascertain that an image search corresponds to a "theme park" category). However, claimed subject matter is not limited to any particular described embodiments, implementations, examples, etc.

For certain example embodiments, an operation 856 may be directed at least partially to wherein the ascertaining a category of the one or more search terms provided by at least one user (of operation 854) comprises comparing at least one search term to one or more entries in a search term categorization database. For certain example implementations, at least one device may compare at least one search term 736 to one or more entries (e.g., at least a part of one or more fields, blocks, variables, tables, indexes, a combination thereof, etc.) in a search term categorization database (e.g., a hierarchical, networked, relational, a combination thereof, etc. database that links search terms to at least one corresponding category). By way of example but not limitation, an app on a mobile device (e.g., a customer rewards and payment app from Target) may compare at least one search term (e.g., "disposable" and "diapers") to one or more entries in a search term categorization database (e.g., a Target app, that has local or remote, direct or indirect, access to a database that categorizes search terms may ascertain a baby category from "disposable" and "diapers" search terms). However, claimed subject matter is not limited to any particular described embodiments, implementations, examples, etc.

For certain example embodiments, an operation 858 may be directed at least partially to wherein the ascertaining a category of the one or more search terms provided by at least one user (of operation 854) comprises searching for at least one association of one or more search terms with one or more characteristics of search users. For certain example implementations, at least one device may search (e.g., analyze, review, inspect, a combination thereof, etc. tables, entries, spreadsheets, data structures, databases, a combination thereof, etc.) for at least one association (e.g., a one-way linking, a two-way linking, a tuple, a relation, a combination thereof, etc.) of one or more search terms with one or more characteristics (e.g., demographic information such as age, gender, income level, education a combination thereof, etc.; preferred style attributes; a category of consumer; geographical location; common related interests, some combination thereof; and so forth) of search users. By way of example but not limitation, a cloud computing environment that offers authentication services (e.g., Goggle Wallet) may search for at least one association of one or more search terms with one or more characteristics of search users (e.g., a Google server may search for "kitchen renovation" search terms and locate an association with 40-55 year old homeowners). However, claimed subject matter is not limited to any particular described embodiments, implementations, examples, etc.

For certain example embodiments, an operation 860 may be directed at least partially to wherein the monitoring one or more search terms provided by at least one user (of operation 844) comprises deducing that the at least one user corresponds to at least one personal relation with respect to the at least one authorized user based at least partially on at least one search term categorization. For certain example implementations, at least one device may deduce (e.g., infer, conclude from evidence, determine, reason, surmise, glean, a combination thereof, etc.) that at least one user corresponds to at least one personal relation (e.g., at least one person that is a legal or effective family member, such as a nanny or babysitter) with respect to at least one authorized user based at least partially on at least one search term categorization (e.g., a category applied to or associated with at least one search term). By way of example but not limitation, a server device (e.g., of an internet service provider such as Comcast) may deduce that at least one user (e.g., a user that streams content every week day between 4 and 6 pm) corresponds to at least one personal relation (e.g., a child) with respect to at least one authorized user (e.g., an owner of a home computer that is also an account holder with Comcast) based at least partially on at least one search term categorization (e.g., a categorization of search terms as corresponding to pop music). However, claimed subject matter is not limited to any particular described embodiments, implementations, examples, etc.

FIG. 8H illustrates a flow diagram 800H having example operations 862, 864, 866, 868. For certain example embodiments, an operation 862 may be directed at least partially to wherein the monitoring one or more search terms provided by at least one user (of operation 844) comprises monitoring the one or more search terms provided by at least one user via at least one operating system. For certain example implementations, at least one device may monitor one or more search terms 736 provided by at least one user 104 via at least one operating system 732 (e.g., a desktop OS, a laptop OS, a tablet/slate OS, a mobile phone OS, an entertainment device OS, a combination thereof, etc.). By way of example but not limitation, a mobile device (e.g., an Apple iPad or a Samsung Galaxy phone) may monitor one or more search terms provided by at least one user (e.g., may collect or store or index search terms entered via a mobile device) via at least one operating system (e.g., a mobile OS such as an Apple iOS or a Google Android OS). However, claimed subject matter is not limited to any particular described embodiments, implementations, examples, etc.

For certain example embodiments, an operation 864 may be directed at least partially to wherein the monitoring one or more search terms provided by at least one user (of operation 844) comprises monitoring the one or more search terms provided by at least one user to at least one user device via at least one application that at least partially executes on and provides security functions for the at least one user device. For certain example implementations, at least one device may monitor one or more search terms 736 provided by at least one user 104 to at least one user device via at least one security application 734 (e.g., a desktop security application, a mobile device security application, a cloud-based security application, a stand-alone security application, a security application embedded or included in another application, a combination thereof, etc.) that at least partially executes on and provides security functions for the at least one user device. By way of example but not limitation, a security application (e.g., a version of McAfee running on a desktop or laptop device) that at least partially executes on and provides security functions for at least one user device may monitor one or more search terms provided by at least one user (e.g., may collect, store, report, or index search terms submitted to a desktop or laptop device) to the at least one user device. However, claimed subject matter is not limited to any particular described embodiments, implementations, examples, etc.

For certain example embodiments, an operation 866 may be directed at least partially to wherein the monitoring one or more search terms provided by at least one user (of operation 844) comprises monitoring the one or more search terms provided by at least one user, the one or more search terms provided for at least one of an intranet search or an internet search. For certain example implementations, at least one device may monitor one or more search terms 736 provided by at least one user 104, with one or more search terms 736 provided for at least one of an intranet search (e.g., a search that is facilitated by or conducted at least partially to cover material on an intranet, such as via a browser-based portal to a company intranet site) or an internet search (e.g., a search that is facilitated by or conducted at least partially to cover material on the internet, such as via a web search portal). By way of example but not limitation, a cloud-based authentication service (e.g., a Google server device operating at least partially on behalf of Google wallet) may monitor one or more search terms provided by at least one user (e.g., a string of internet searches directed to golf resorts on the coast of North Carolina), with the one or more search terms provided for at least one of an intranet search (e.g., a search intended to locate information on an intranet for Walgreen's) or an internet search (e.g., a string of internet searches input at google [dot]com for web searches). However, claimed subject matter is not limited to any particular described embodiments, implementations, examples, etc.

For certain example embodiments, an operation 868 may be directed at least partially to wherein the monitoring one or more search terms provided by at least one user (of operation 844) comprises monitoring the one or more search terms provided by at least one user, the one or more search terms provided for a local search of a user device. For certain example implementations, at least one device may monitor one or more search terms 736 provided by at least one user 104, with one or more search terms 736 provided for a local search of a user device (e.g., a search of memory or files located on/at or otherwise associated with a device of a user). By way of example but not limitation, an operating system (e.g., an Apple OS X or iOS operating system) may monitor one or more search terms provided by at least one user, with the one or more search terms provided for a local search of a user device (e.g., an Apple OS may incorporate categories related to local searches of material of a user's device into a behavioral-fingerprint-based authentication mechanism). However, claimed subject matter is not limited to any particular described embodiments, implementations, examples, etc.

Figure 8I:
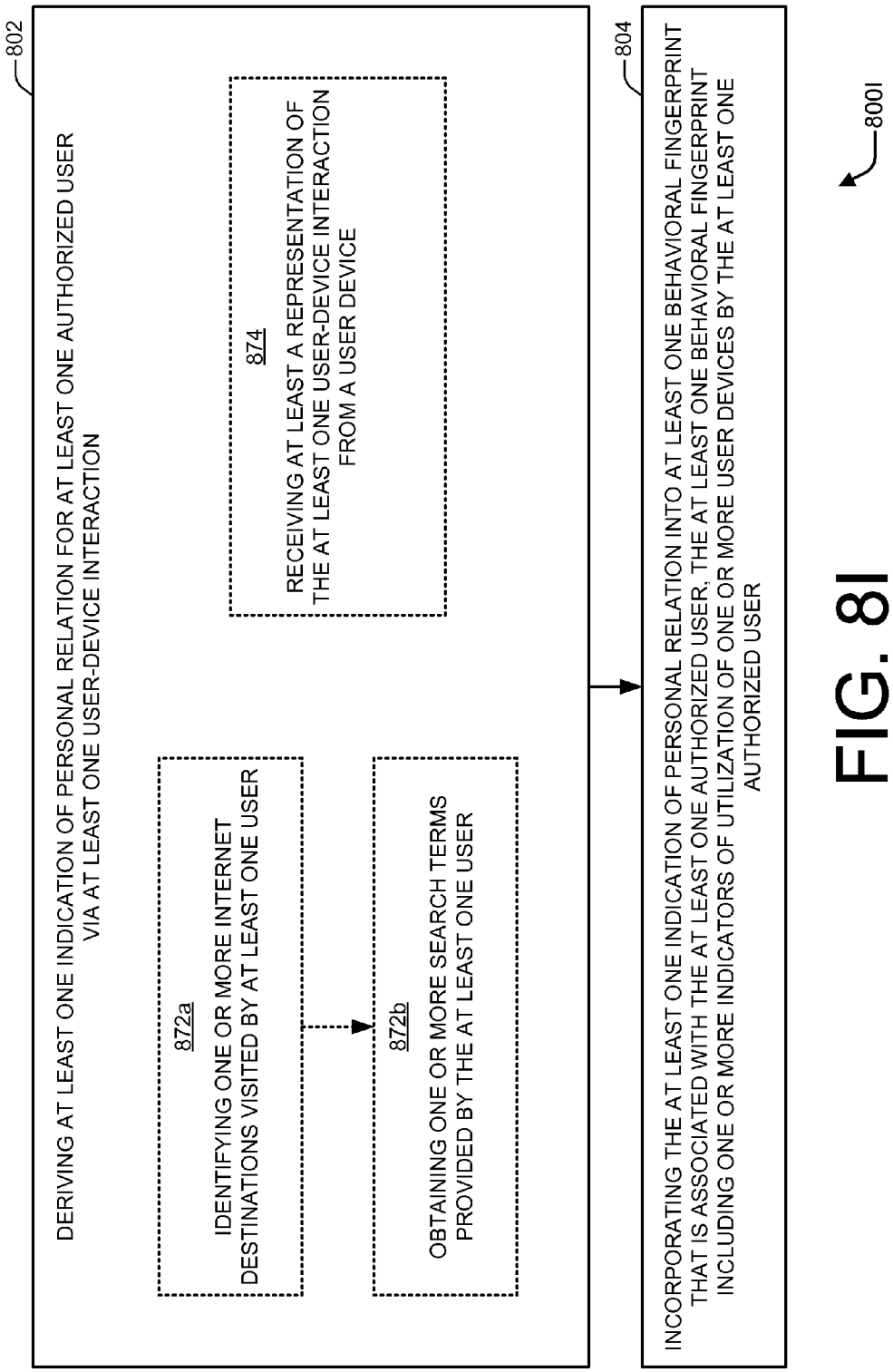

FIG. 8I illustrates a flow diagram 800I having example operations 872a, 872b, or 874. For certain example embodiments, an operation 872a or 872b may be directed at least partially to wherein the deriving at least one indication of personal relation for at least one authorized user via at least one user-device interaction (of operation 802) comprises identifying one or more internet destinations visited by at least one user; or obtaining one or more search terms provided by the at least one user. For certain example implementations, at least one device may identify (e.g., acquire, detect, record, ascertain, a combination thereof, etc.) one or more internet destinations 726 (e.g., at least part of one or more web pages, internet sites, internet locations, URLs, internet-connected servers that may be contacted via or as a result of execution of at least one app or browser, a combination thereof, etc.) visited (e.g., at least partially rendered, displayed, viewed, downloaded, printed, electronically-contacted, information retrieved from, information provided to, a combination thereof, etc. as a result of typing at least a portion of an internet destination address into a browser address bar, as a result of clicking on a link in a browser or email or document, as a result of selecting a favorite or historical internet destination item, a combination thereof, etc.) by at least one user 104 or may obtain (e.g., secure, retrieve, sniff, extract, ascertain, a combination thereof, etc.) one or more search terms 736 (e.g., words, phrases, alphanumeric characters, images, faces, sounds, a combination thereof, etc.) provided (e.g., entered, input, typed in, scanned in, referenced, forwarded, scanned, identified, clicked on, selected from a list of suggested searches or search terms, a combination thereof, etc.) by at least one user 104. By way of example but not limitation, a server device (e.g., a server that is part of a cloud computing environment of Google) may monitor one or more internet destinations visited by at least one user (e.g., a server device may receive website viewing updates from a Google Chrome browser or a Google Android OS) or monitor one or more search terms provided by the at least one user (e.g., a server device may receive entered search terms from a Google Search Tool Bar or from another server providing search results to a user that is signed into a Google account). However, claimed subject matter is not limited to any particular described embodiments, implementations, examples, etc.

For certain example embodiments, an operation 874 may be directed at least partially to wherein the deriving at least one indication of personal relation for at least one authorized user via at least one user-device interaction (of operation 802) comprises receiving at least a representation of the at least one user-device interaction from a user device. For certain example implementations, at least one device may receive at least a representation of (e.g., a description of, a reference to, a code identifying, a summary of, a snapshot of, a combination thereof, etc.) at least one user-device interaction 710 (e.g., at least one interaction (e.g., a user inputting or sending data or information into or to a device, a user selecting from between or among options provided or offered by a device, a user submitting a request to a device, a user responding to an inquiry from a device, a user contacting one or more internet destinations via a device, a user entering one or more search terms via a device, a user making one or more purchases via a device, a user visiting one or more physical locations with a device, a combination thereof, etc.) between or among at least one user (e.g., an authorized user, an unauthorized user, a user that is authorized by designation, a combination thereof, etc.) and one or more devices (e.g., a user device 102, a server device 112, a combination thereof, etc.)) from a user device 102. By way of example but not limitation, a payment authorization service (e.g., a server device of American Express) may receive at least a representation of at least one user-device interaction from a user device (e.g., may receive a listing of internet destinations selected for contacting from a set of search results). However, claimed subject matter is not limited to any particular described embodiments, implementations, examples, etc.

Figure 8J:
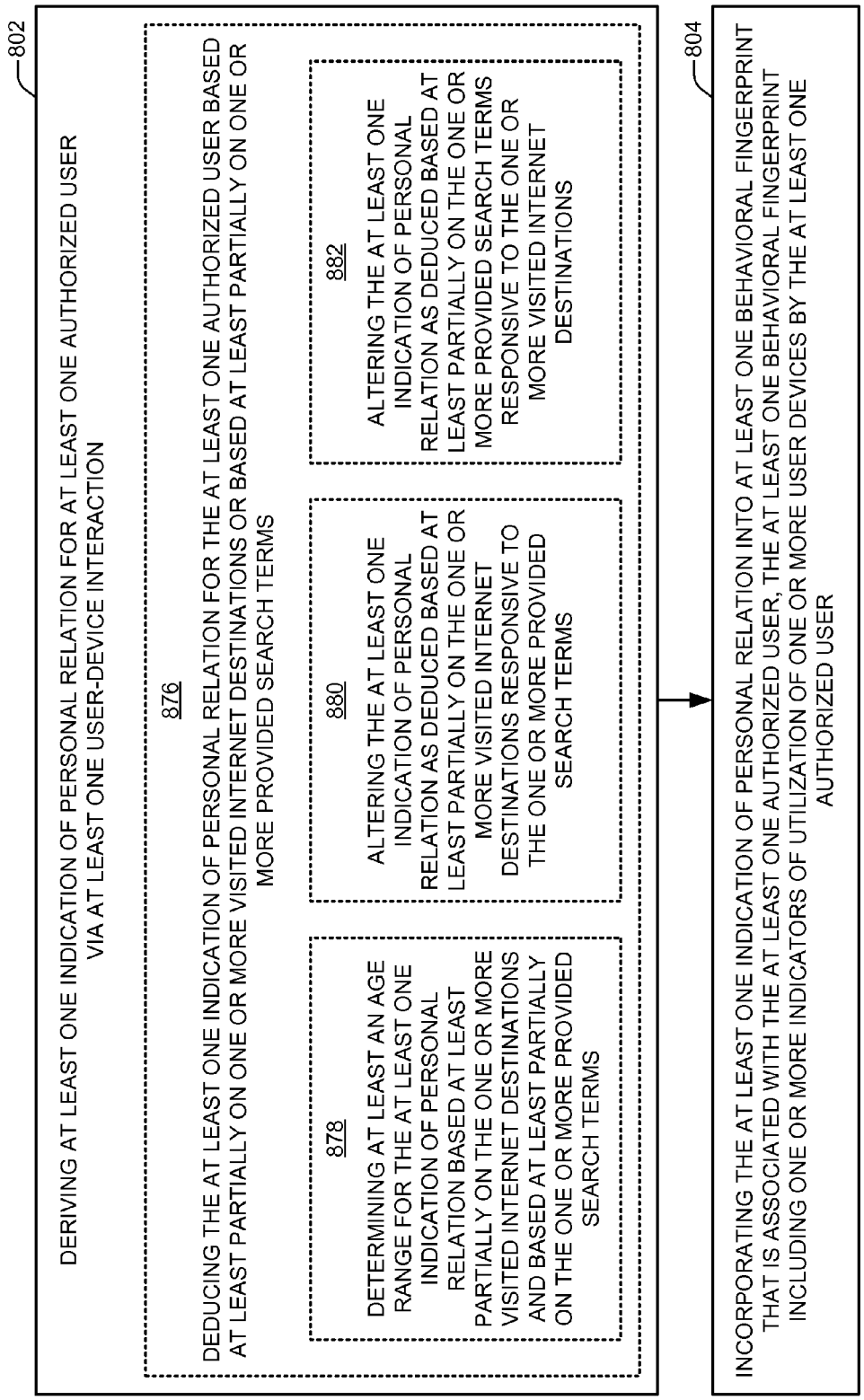

FIG. 8J illustrates a flow diagram 800J having example operations 876, 878, 880, or 882. For certain example embodiments, an operation 876 may be directed at least partially to wherein the deriving at least one indication of personal relation for at least one authorized user via at least one user-device interaction (of operation 802) comprises deducing the at least one indication of personal relation for the at least one authorized user based at least partially on one or more visited internet destinations or based at least partially on one or more provided search terms. For certain example implementations, at least one device may deduce (e.g., infer, conclude from evidence, determine, reason, surmise, glean, a combination thereof, etc.) at least one indication of personal relation 706 for at least one authorized user based at least partially on one or more visited internet destinations 726 (e.g., at least part of one or more web pages, internet sites, internet locations, URLs, internet-connected servers that may be contacted via or as a result of execution of at least one app or browser, a combination thereof, etc. that are at least partially retrieved or displayed or contacted) or based at least partially on one or more provided search terms 736 (e.g., words, phrases, alphanumeric characters, images, faces, sounds, a combination thereof, etc. that are entered or submitted). By way of example but not limitation, a security company (e.g., a server device of ADT) may deduce at least one indication of personal relation for at least one authorized user based at least partially on one or more visited internet destinations (e.g., may deduce that a customer has a baby from visits to "babiesrus[dot]com") or based at least partially on one or more provided search terms (e.g., may deduce that a customer has an inside dog based on "house training tips" search terms). However, claimed subject matter is not limited to any particular described embodiments, implementations, examples, etc.

For certain example embodiments, an operation 878 may be directed at least partially to wherein the deducing the at least one indication of personal relation for the at least one authorized user based at least partially on one or more visited internet destinations or based at least partially on one or more provided search terms (of operation 876) comprises determining at least an age range for the at least one indication of personal relation based at least partially on the one or more visited internet destinations and based at least partially on the one or more provided search terms. For certain example implementations, at least one device may determine at least an age range (e.g., by label such as infant, child, teen, etc.; by years, such as 2-4, 10-12, 16-18, etc.; a combination thereof; etc.) for at least one indication 706 of personal relation based at least partially on one or more visited internet destinations 726 and based at least partially on one or more provided search terms 736. By way of example but not limitation, a local app incarnation of a secure-safe purchasing service (e.g., a service that authorizes bank card debit transactions via a smart phone) may determine at least an age range for at least one indication of personal relation based at least partially on one or more visited internet destinations and based at least partially on one or more provided search terms (e.g., a service determines from a combination of youthful skateboarding websites and geometry-related search terms that an authorized user has a child between 13 and 16 years old). However, claimed subject matter is not limited to any particular described embodiments, implementations, examples, etc.

For certain example embodiments, an operation 880 may be directed at least partially to wherein the deducing the at least one indication of personal relation for the at least one authorized user based at least partially on one or more visited internet destinations or based at least partially on one or more provided search terms (of operation 876) comprises altering the at least one indication of personal relation as deduced based at least partially on the one or more visited internet destinations responsive to the one or more provided search terms. For certain example implementations, at least one device may alter (e.g., change, adjust, modify, extend, replace at least a portion, a combination thereof, etc.) at least one indication of personal relation 706 as deduced based at least partially on one or more visited internet destinations 726 responsive to one or more provided search terms 736. By way of example but not limitation, a server device (e.g., of Apple's iCloud service) may alter at least one indication of personal relation as deduced based at least partially on one or more visited internet destinations responsive to one or more provided search terms (e.g., change a gender of a surviving parent of an adult from being designated male/father, as deduced based on visited fishing-related websites, to being designated female/mother in response to search terms pertaining to celebrating grandparents day with a mother). However, claimed subject matter is not limited to any particular described embodiments, implementations, examples, etc.

For certain example embodiments, an operation 882 may be directed at least partially to wherein the deducing the at least one indication of personal relation for the at least one authorized user based at least partially on one or more visited internet destinations or based at least partially on one or more provided search terms (of operation 876) comprises altering the at least one indication of personal relation as deduced based at least partially on the one or more provided search terms responsive to the one or more visited internet destinations. For certain example implementations, at least one device may alter (e.g., change, adjust, modify, extend, replace at least a portion, a combination thereof, etc.) at least one indication of personal relation 706 as deduced based at least partially on the one or more provided search terms 736 responsive to one or more visited internet destinations 726. By way of example but not limitation, a server device (e.g., operated for or by Bank of America) may alter at least one indication of personal relation as deduced based at least partially on one or more provided search terms responsive to one or more visited internet destinations (e.g., an initial indication of personal relation that is deduced from search terms may be updated if visited internet destinations provide a different, more specific, or more certain deduction). However, claimed subject matter is not limited to any particular described embodiments, implementations, examples, etc.

FIG. 8K illustrates a flow diagram 800K having example operations 886, 888, or 890. For certain example embodiments, an operation 886 may be directed at least partially to wherein the deriving at least one indication of personal relation for at least one authorized user via at least one user-device interaction (of operation 802) comprises obtaining the at least one indication of personal relation for the at least one authorized user via at least one social networking user-device interaction from at least one social network. For certain example implementations, at least one device may obtain at least one indication of personal relation 706 for at least one authorized user via at least one social networking user-device interaction 710 from at least one social network 718 (e.g., a network, a service, an internet destination, a website, a computing infrastructure, an application, an interface, cloud computing, a combination thereof, etc. that enables or facilitates interaction (e.g., via text, images, audio, video, a combination thereof, etc.) between or among two or more members). By way of example but not limitation, a cloud-based service (e.g., a service from a debit card provider such as Bank of America) may obtain at least one indication of personal relation (e.g., an indication of the existence of an aunt) for at least one authorized user via at least one social networking user-device interaction (e.g., a message sent between or among at least two friends via a user device) from at least one social network (e.g., from Facebook or Myspace). However, claimed subject matter is not limited to any particular described embodiments, implementations, examples, etc.

For certain example embodiments, an operation 888 may be directed at least partially to wherein the obtaining the at least one indication of personal relation for the at least one authorized user via at least one social networking user-device interaction from at least one social network (of operation 886) comprises obtaining the at least one indication of personal relation for the at least one authorized user from the at least one social network from profile data that is associated with an account for the at least one authorized user with the at least one social network. For certain example implementations, at least one device may obtain at least one indication 706 of personal relation for at least one authorized user from at least one social network 718 from profile data 720 that is associated with an account for the at least one authorized user with the at least one social network. By way of example but not limitation, a web-based service (e.g., a service such as PayPal that may offer payment authentication services) may obtain at least one indication of personal relation (e.g., a spouse, a first child's name, a second child's name, etc.) for at least one authorized user from at least one social network (e.g., Facebook) from profile data (e.g., demographic or other data that may be provided if the authorized user establishes a Facebook account) that is associated with an account (e.g., identifiable by a username such as an email or phone number) for the at least one authorized user with the at least one social network. However, claimed subject matter is not limited to any particular described embodiments, implementations, examples, etc.

For certain example embodiments, an operation 890 may be directed at least partially to wherein the obtaining the at least one indication of personal relation for the at least one authorized user via at least one social networking user-device interaction from at least one social network (of operation 886) comprises retrieving the at least one indication of personal relation for the at least one authorized user from at least a part of one or more servers operated by or for the at least one social network. For certain example implementations, at least one device (e.g., at least one server 112(2)) may retrieve at least one indication 706 of personal relation for at least one authorized user from at least a part (e.g., from a single physical or virtual server, from a distributed server, from a part of a server farm, from multiple servers, a combination thereof, etc.) of one or more servers (e.g., at least one server 112(1)) operated by or for at least one social network 718. By way of example but not limitation, at least one server device (e.g., an actual or virtual server of a cloud service such as Apple's iCloud) may retrieve at least one indication of personal relation for at least one authorized user from at least a part of one or more servers operated by or for at least one social network (e.g., from one or more servers operated for or by Classmates[dot]com). However, claimed subject matter is not limited to any particular described embodiments, implementations, examples, etc.

Figure 8L:
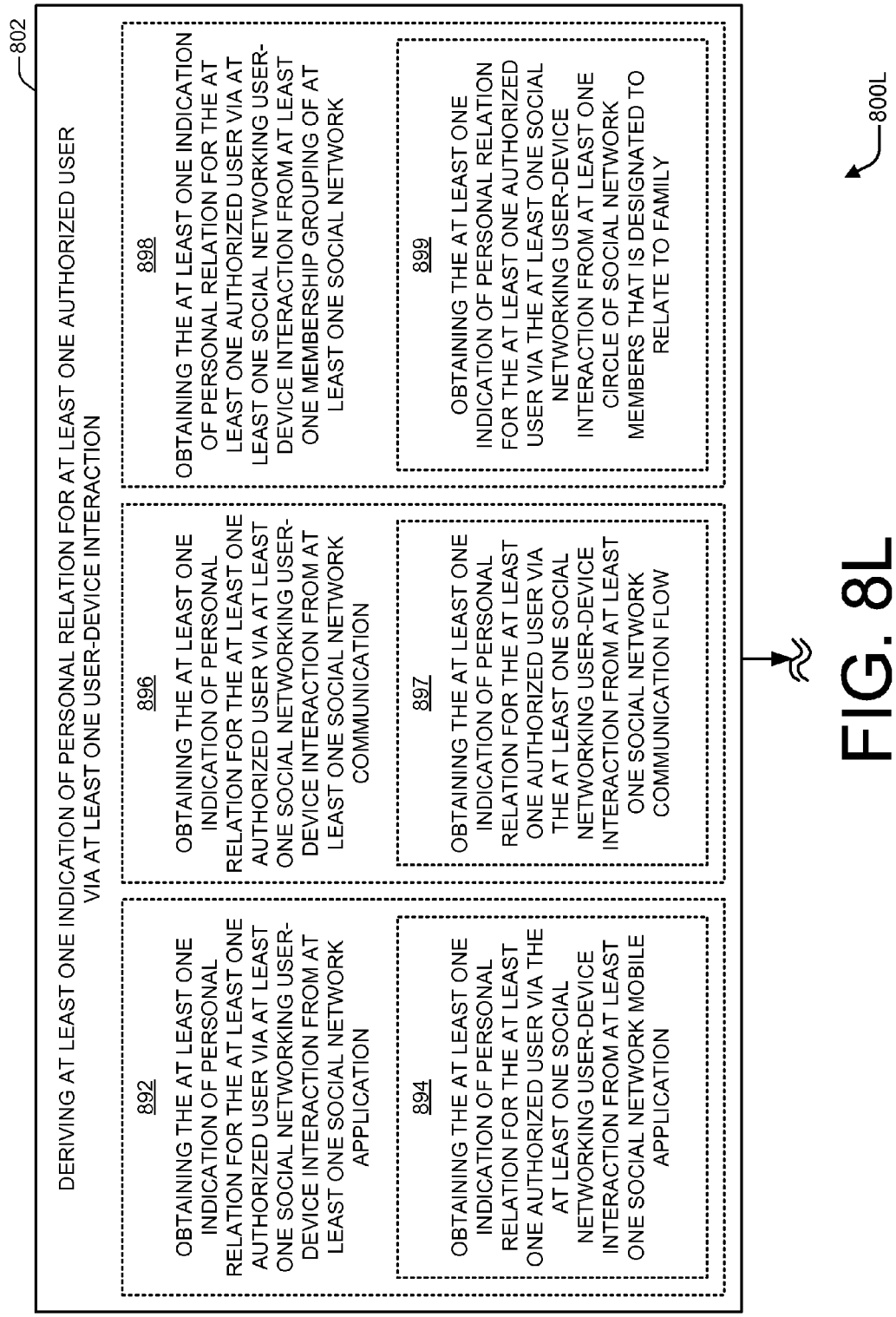

FIG. 8L illustrates a flow diagram 800L having example operations 892, 894, 896, 897, 898, or 899. For certain example embodiments, an operation 892 may be directed at least partially to wherein the deriving at least one indication of personal relation for at least one authorized user via at least one user-device interaction (of operation 802) comprises obtaining the at least one indication of personal relation for the at least one authorized user via at least one social networking user-device interaction from at least one social network application. For certain example implementations, at least one device may obtain at least one indication 706 of personal relation for at least one authorized user via at least one social networking user-device interaction 710 from (e.g., directly from, from data stored by, by querying, a combination thereof, etc.) at least one social network application 722 (e.g., a mobile or desktop application stored at, executing on, a combination thereof, etc. a user device 102 or an application that is separate from or at least partially integrated with an OS of a user device 102). By way of example but not limitation, code executing on a server (e.g., a server device 112(2) of FIG. 7B) may obtain at least one indication of personal relation for at least one authorized user via at least one social networking user-device interaction (e.g., a message sent via Facebook) from at least one social network application (e.g., a Facebook application). However, claimed subject matter is not limited to any particular described embodiments, implementations, examples, etc.

For certain example embodiments, an operation 894 may be directed at least partially to wherein the obtaining the at least one indication of personal relation for the at least one authorized user via at least one social networking user-device interaction from at least one social network application (of operation 892) comprises obtaining the at least one indication of personal relation for the at least one authorized user via the at least one social networking user-device interaction from at least one social network mobile application. For certain example implementations, at least one device may obtain at least one indication of personal relation 706 for at least one authorized user via at least one social networking user-device interaction 710 from at least one social network mobile application 722. By way of example but not limitation, a module of a mobile device operating system (e.g., at least a portion of an Android OS on an HTC smart phone) may obtain at least one indication of personal relation for at least one authorized user via at least one social networking user-device interaction (e.g., a message received via Facebook) from at least one social network mobile application (e.g., a Facebook Android application enhanced for tablet viewing). However, claimed subject matter is not limited to any particular described embodiments, implementations, examples, etc.

For certain example embodiments, an operation 896 may be directed at least partially to wherein the deriving at least one indication of personal relation for at least one authorized user via at least one user-device interaction (of operation 802) comprises obtaining the at least one indication of personal relation for the at least one authorized user via at least one social networking user-device interaction from at least one social network communication. For certain example implementations, at least one device may obtain at least one indication 706 of personal relation (e.g., a listing of in-laws living in the same state) for at least one authorized user via at least one social networking user-device interaction 710 from at least one social network communication 724 (e.g., a message, a tweet, a post, a pin, a picture, a video, wall writing, streamed items, news items, a combination thereof, etc. having or accompanying or being linked to an implicit or an explicit statement or implication of personal relationship). By way of example but not limitation, a cloud-based payment authorization service (e.g., Google Wallet) may obtain at least one indication of personal relation for at least one authorized user via at least one social networking user-device interaction from at least one social network communication (e.g., a Twitter tweet). However, claimed subject matter is not limited to any particular described embodiments, implementations, examples, etc.

For certain example embodiments, an operation 897 may be directed at least partially to wherein the obtaining the at least one indication of personal relation for the at least one authorized user via at least one social networking user-device interaction from at least one social network communication (of operation 896) comprises obtaining the at least one indication of personal relation for the at least one authorized user via the at least one social networking user-device interaction from at least one social network communication flow. For certain example implementations, at least one device may obtain at least one indication of personal relation 706 for at least one authorized user via at least one social networking user-device interaction 710 from at least one social network communication flow (e.g., a continuous or intermittent or ongoing flow of information from or to a social network). By way of example but not limitation, a cloud-based payment authorization service (e.g., PayPal) may obtain at least one indication of personal relation (e.g., a new addition to a family) for at least one authorized user via at least one social networking user-device interaction from at least one social network communication flow (e.g., a news feed, an update stream, an activity stream, a Twitter stream, a combination thereof, etc.). However, claimed subject matter is not limited to any particular described embodiments, implementations, examples, etc.

For certain example embodiments, an operation 898 may be directed at least partially to wherein the deriving at least one indication of personal relation for at least one authorized user via at least one user-device interaction (of operation 802) comprises obtaining the at least one indication of personal relation for the at least one authorized user via at least one social networking user-device interaction from at least one membership grouping of at least one social network. For certain example implementations, at least one device may obtain at least one indication 706 of personal relation for at least one authorized user via at least one social networking user-device interaction 710 from at least one membership grouping (e.g., a set or list—such as a circle or posting group—of social network members that are publicly or privately identified by at least one social network member as being related, as having something in common, as being addressable together for incoming or outgoing communications, as being appropriate for joint handling of associated social network communications, a combination thereof, etc.) of at least one social network. By way of example but not limitation, an internet or cloud-based payment service (e.g., an Intuit payment service) may obtain at least one indication of personal relation for at least one authorized user via at least one social networking user-device interaction from at least one membership grouping (e.g., a Facebook grouping that is labeled, tagged, or otherwise indicated to be related to a family unit or familial relations) of at least one social network (e.g., Facebook). However, claimed subject matter is not limited to any particular described embodiments, implementations, examples, etc.

For certain example embodiments, an operation 899 may be directed at least partially to wherein the obtaining the at least one indication of personal relation for the at least one authorized user via at least one social networking user-device interaction from at least one membership grouping of at least one social network (of operation 898) comprises obtaining the at least one indication of personal relation for the at least one authorized user via the at least one social networking user-device interaction from at least one circle of social network members that is designated to relate to family. For certain example implementations, at least one device may obtain at least one indication of personal relation 706 for at least one authorized user via at least one social networking user-device interaction 710 from at least one circle (e.g., a, defined, identified, selected, organized, a combination thereof, etc. set) of social network members (e.g., entities that have joined or have an account with a social network) that is designated to relate to family. By way of example but not limitation, an app executing on a user device (e.g., a Lookout security app for Android OS) may obtain at least one indication of personal relation for at least one authorized user via at least one social networking user-device interaction from at least one circle of social network members (e.g., a Google+ Circle) that is designated to relate to family (e.g., one that is titled "immediate family", described as "extended family" or "kids" or "parents", a combination thereof, etc.). However, claimed subject matter is not limited to any particular described embodiments, implementations, examples, etc.

FIGS. 9A-9G depict example additions or alternatives for a flow diagram of FIG. 8A in accordance with certain example embodiments. As illustrated, flow diagrams of FIGS. 9A-9G may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 9A-9G may be performed so as to be fully or partially overlapping with other operation(s).

FIG. 9A illustrates a flow diagram 900A having example operations 908, 910, 912, or 914. For certain example embodiments, an operation 908 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises adding the at least one indication of personal relation to the at least one behavioral fingerprint that is associated with the at least one authorized user. For certain example implementations, at least one device may add (e.g., augment, insert, include, supplement, append, join together, a combination thereof, etc.) at least one indication of personal relation 706 to at least one behavioral fingerprint 110 that is associated with at least one authorized user. By way of example but not limitation, an internet or cloud-based security service may add at least one indication of personal relation (e.g., an Apple iCloud server may insert an identification of a child) to at least one behavioral fingerprint that is associated with at least one authorized user (e.g., a behavioral fingerprint portion of an Apple ID profile stored at an Apple server farm). However, claimed subject matter is not limited to any particular described embodiments, implementations, examples, etc.

For certain example embodiments, an operation 910 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises updating the at least one behavioral fingerprint that is associated with the at least one authorized user with the at least one indication of personal relation. For certain example implementations, at least one device may update (e.g., replace a previous entry, modify a previous entry, remove at least part of a previous entry, connect, affix, a combination thereof, etc.) at least one behavioral fingerprint 110 that is associated with at least one authorized user with at least one indication 706 of personal relation. By way of example but not limitation, an internet or cloud-based security service may update (e.g., an Apple iCloud server may change a child named "Pat" from being designated a son to being designated a daughter) at least one behavioral fingerprint that is associated with at least one authorized user (e.g., a behavioral fingerprint portion of an Apple ID profile stored at a user's iPhone) with at least one indication of personal relation (e.g., an indication that a user's child named "Pat" has just joined "Curves"). However, claimed subject matter is not limited to any particular described embodiments, implementations, examples, etc.

For certain example embodiments, an operation 911 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises deleting at least a portion of the at least one behavioral fingerprint that is associated with the at least one authorized user based at least partially on the at least one indication of personal relation. For certain example implementations, at least one device may delete (e.g., remove, excise, write over, replace with something new, a combination thereof, etc.) at least a portion of at least one behavioral fingerprint 110 that is associated with at least one authorized user based at least partially on at least one indication of personal relation 706. By way of example but not limitation, an internet or cloud-based service may delete (e.g., a Microsoft-Azure based cloud service may remove) at least a portion of at least one behavioral fingerprint that is associated with at least one authorized user based at least partially on the at least one indication of personal relation (e.g., may remove a spousal personal (e.g., family) relationship from a behavioral fingerprint based at least partially on a Facebook post indicating that a divorce has occurred or may remove a significant other personal (e.g., intimate) relationship from a behavioral fingerprint based at least partially on a Facebook post indicating that a person is no longer in a relationship). However, claimed subject matter is not limited to any particular described embodiments, implementations, examples, etc.

For certain example embodiments, an operation 912 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises confirming that the at least one behavioral fingerprint that is associated with the at least one authorized user includes the at least one indication of personal relation. For certain example implementations, at least one device may confirm (e.g., compare at least one newly-received personal relation indication to one or more existing personal relation designations) that at least one behavioral fingerprint 110 that is associated with at least one authorized user includes at least one indication of personal relation 706. By way of example but not limitation, a cloud-type service (e.g., a Google service such as Google Wallet) may confirm that at least one behavioral fingerprint that is associated with at least one authorized user includes at least one indication of personal relation (e.g., verify that an obtained indication of sibling status exists or matches a current personal relation designation in a Google Wallet security profile). However, claimed subject matter is not limited to any particular described embodiments, implementations, examples, etc.

For certain example embodiments, an operation 914 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises establishing between or among one or more individuals at least one linkage that reflects at least one familial relation in the at least one behavioral fingerprint that is associated with the at least one authorized user based, at least partially, on the at least one indication of personal relation. For certain example implementations, at least one device may establish (e.g., set-up, create, organize, provide, set-forth, a combination thereof, etc.) between or among one or more individuals (e.g., people, persons, social network members, other entities, a combination thereof, etc.) at least one linkage (e.g., a reference, a vector, an arrow, a family tree indicator, a pointer, a combination thereof, etc.) that reflects (e.g., represents, indicates, defines, explains, a combination thereof, etc.) at least one familial relation in at least one behavioral fingerprint 110 that is associated with at least one authorized user based, at least partially, on at least one indication of personal relation 706. By way of example but not limitation, an operating system feature (e.g., a function of a Google Android OS of an HTC smartphone) may establish between or among one or more individuals at least one linkage that reflects at least one familial relation (e.g., may create a reference between a user and another individual with the reference representing a parental relationship) in at least one behavioral fingerprint (e.g., in a security or other user-related file on the HTC smartphone) that is associated with at least one authorized user based, at least partially, on at least one indication of personal relation. However, claimed subject matter is not limited to any particular described embodiments, implementations, examples, etc.

Figure 9B:
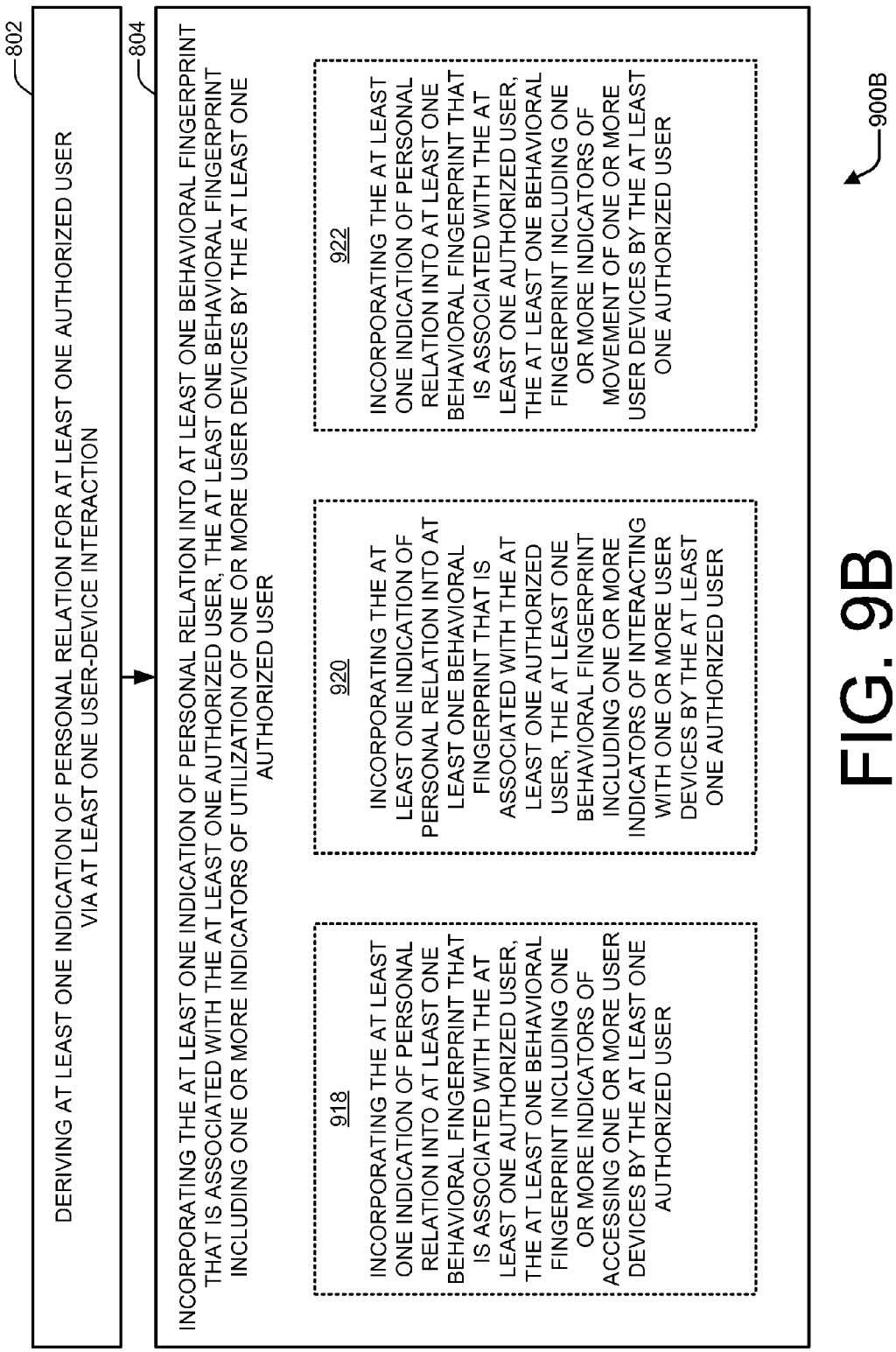

FIG. 9B illustrates a flow diagram 900B having example operations 918, 920, or 922. For certain example embodiments, an operation 918 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of accessing one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of accessing (e.g., changing settings, entering a password, executing apps, using OS features, communicating with, a combination thereof, etc.) one or more user devices 102 by the at least one authorized user. By way of example but not limitation, an app on a user device (e.g., an app on a RIM Blackberry) may incorporate at least one indication of personal relation into at least one behavioral fingerprint that is associated with the at least one authorized user, with the at least one behavioral fingerprint including one or more indicators of accessing one or more user devices by the at least one authorized user (e.g., indicator(s) that a particular user has executed a particular app or has regularly changed brightness settings). However, claimed subject matter is not limited to any particular described embodiments, implementations, examples, etc.

For certain example embodiments, an operation 920 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of interacting with one or more user devices by the at least one authorized user. For certain example implementations, at least one device may incorporate at least one indication 706 of personal relation into at least one behavioral fingerprint 110 that is associated with at least one authorized user, with at least one behavioral fingerprint 110 including one or more indicators 708 of interacting with (e.g., manipulating, controlling I/O functions, working a user interface (UI), playing games, creating files, producing documents, a combination thereof, etc.) one or more user devices 102 by the at least one authorized user. By way of example but not limitation, a shell on a smartphone (e.g., an HTC Sense UI or Touch Sense UI) may incorporate at least one indication of personal relation (e.g., an indication that another user of a device is a spouse) into at least one behavioral fingerprint that is associated with at least one authorized user, with the at least one behavioral fingerprint including one or more indicators of interacting with one or more user devices by the at least one authorized user (e.g., one or more indicators that a user has played certain games on a user device). However, claimed subject matter is not limited to any particular described embodiments, implementations, examples, etc.

For certain example embodiments, an operation 922 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of movement of one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of movement (e.g., shaking movements, movements resulting from being carried from place to place, movements while being carried from place to place, movements while a person walks or runs, movement while a person rides on a form of transportation, a combination thereof, etc.) of one or more user devices 102 by the at least one authorized user. By way of example but not limitation, an app that enables point of sale purchases (e.g., a Dunkin Donuts app) may incorporate at least one indication of personal relation into at least one behavioral fingerprint that is associated with at least one authorized user, with the at least one behavioral fingerprint including one or more indicators of movement of one or more user devices by the at least one authorized user (e.g., a Dunkin Donuts app can include indicators of which Dunkin Donut locations a user patronizes or what form of transportation—such as on foot or on a train—a user relies on to reach a given location). However, claimed subject matter is not limited to any particular described embodiments, implementations, examples, etc.

FIG. 9C illustrates a flow diagram 900C having example operations 924, 926, or 928. For certain example embodiments, an operation 924 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of providing input to one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of providing input (e.g., controlling a device via a UI, speaking into a microphone, touching a screen with at least one finger, swiping a screen with one or more fingers, pressing buttons, a combination thereof etc.) to one or more user devices 102 by the at least one authorized user. By way of example but not limitation, a retailer with a web presence (e.g., Walmart may incorporate at least one indication of personal relation into at least one behavioral fingerprint that is associated with at least one authorized user, with the at least one behavioral fingerprint including one or more indicators of providing input to one or more user devices by the at least one authorized user (e.g., a Walmart server—such as after an app from Walmart on a user device sends at least one personal relation indication to the Walmart server—may incorporate the at least one personal relation indication into a behavioral fingerprint that includes at least one user input characteristic, such as an indication of how a user swipes between pages or other visual screens on a user device). However, claimed subject matter is not limited to any particular described embodiments, implementations, examples, etc.

For certain example embodiments, an operation 926 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of receiving output from one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of receiving output from (e.g., images displayed on a device screen, sounds played from a speaker, a combination thereof, etc.) one or more user devices 102 by the at least one authorized user. By way of example but not limitation, a cloud server (e.g., a virtual server of a payment services company that leases server resources from a computing resources wholesaler, such as Amazon's Elastic Compute Cloud (ECC)) may incorporate at least one indication of personal relation into at least one behavioral fingerprint that is associated with at least one authorized user, with the at least one behavioral fingerprint including one or more indicators of receiving output from one or more user devices by the at least one authorized user (e.g., a virtual server of a payment services company may incorporate at least one personal relation indication into a behavioral fingerprint that includes at least one user output characteristic, such as volume levels used for phone calls and internet videos by a user). However, claimed subject matter is not limited to any particular described embodiments, implementations, examples, etc.

For certain example embodiments, an operation 928 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of communicating via one or more user devices by the at least one authorized user. For certain example implementations, at least one device may incorporate at least one indication 706 of personal relation into at least one behavioral fingerprint 110 that is associated with at least one authorized user, with at least one behavioral fingerprint 110 including one or more indicators 708 of communicating (e.g., indicators of how a user communicates—such as via text messaging, phone, email, a special app such as iMessage or Facetime, or video calling; indicators of to whom a user communicates—such as people or groups; indicators of when a user communicates; a combination thereof; etc.) via one or more user devices 102 by the at least one authorized user. By way of example but not limitation, a cloud security service that monitors a user device (e.g., a Trend Micro security suite that monitors device usage at least partially from a location remote from the user device) may incorporate at least one indication of personal relation into at least one behavioral fingerprint that is associated with at least one authorized user, with the at least one behavioral fingerprint including one or more indicators of communicating via one or more user devices by the at least one authorized user (e.g., a Trend Micro server may incorporate at least one personal relation indication into a behavioral fingerprint that includes an indicator of what times and days of week a user calls his mother). However, claimed subject matter is not limited to any particular described embodiments, implementations, examples, etc.

Figure 9D:
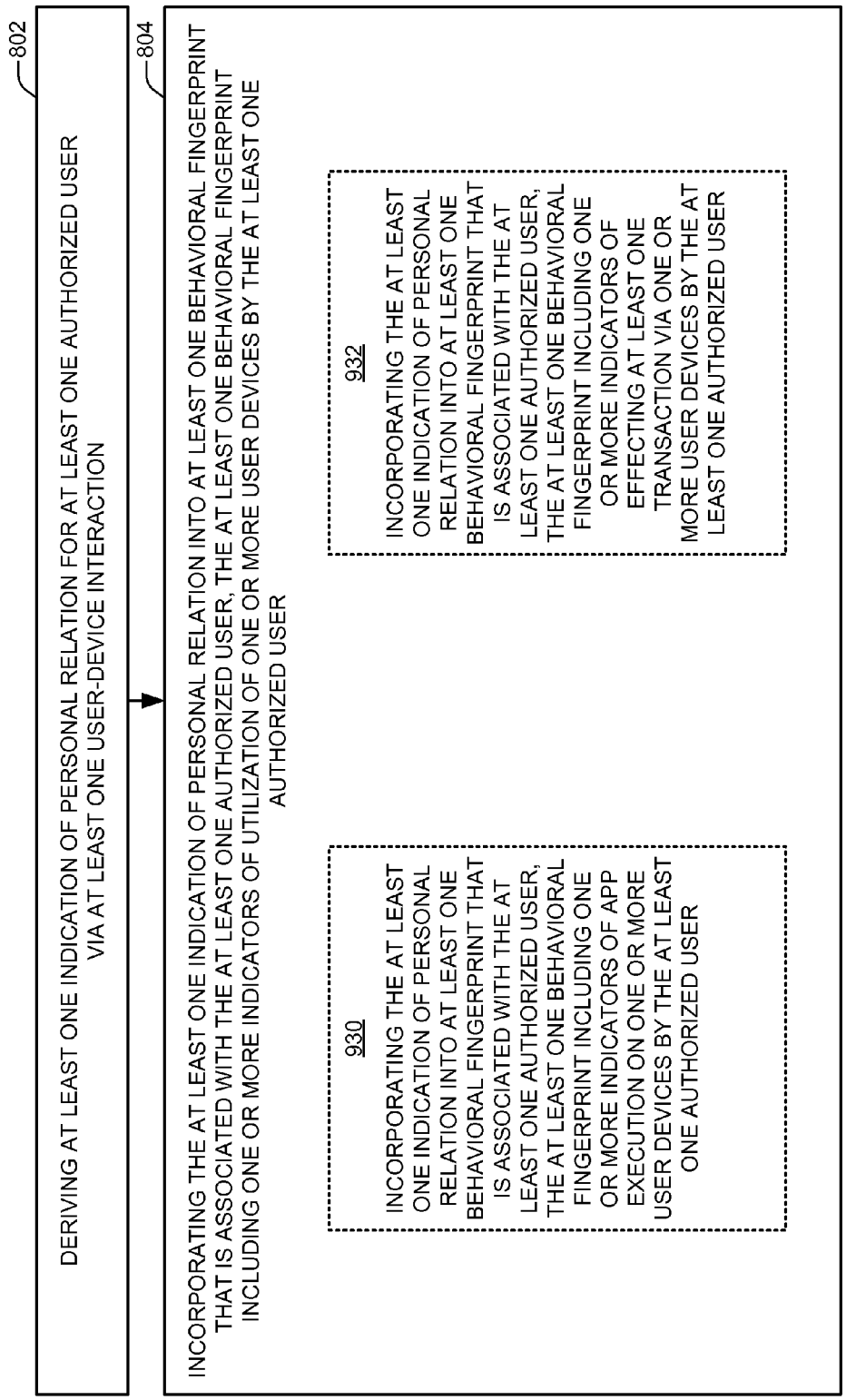

FIG. 9D illustrates a flow diagram 900D having example operations 930 or 932. For certain example embodiments, an operation 930 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of software application execution on one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of software application (e.g., app, program, code, a combination thereof, etc.) execution (e.g., at least one indicator of which apps are launched or run, how long apps are interacted with, a placement of app windows on a display screen, when apps are launched, a combination thereof, etc.) on one or more user devices 102 by the at least one authorized user. By way of example but not limitation, an app or feature with near-field communication (NFC) capabilities (e.g., an app or iOS feature on an Apple iPhone) may incorporate at least one indication of personal relation into at least one behavioral fingerprint that is associated with at least one authorized user, with the at least one behavioral fingerprint including one or more indicators of software application execution on one or more user devices by the at least one authorized user (e.g., an app or iOS feature of an iPhone may incorporate at least one personal relation indication into a behavioral fingerprint that includes at least one app execution characteristic, such as how often a user accesses a Safari browser). However, claimed subject matter is not limited to any particular described embodiments, implementations, examples, etc.

For certain example embodiments, an operation 932 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of effecting at least one transaction via one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of effecting at least one transaction (e.g., conducting, initiating, concluding, providing authorization, providing a source of funds, a combination thereof, etc. at least one purchase, order, procurement, exchange of consideration, a combination thereof, etc.) via one or more user devices 102 by the at least one authorized user. By way of example but not limitation, a cloud component of a payment service (e.g., at least one server operated by or for PayPal) may incorporate at least one indication of personal relation into at least one behavioral fingerprint that is associated with at least one authorized user, with the at least one behavioral fingerprint including one or more indicators of effecting at least one transaction via one or more user devices (e.g., a server of PayPal may incorporate at least one personal relation indication into a behavioral fingerprint that includes at least one transaction characteristic, such as a vendor—e.g., Staples—that has been used before or an item category—e.g., ski equipment—that has been purchased from before) by the at least one authorized user. However, claimed subject matter is not limited to any particular described embodiments, implementations, examples, etc.

Figure 9E:
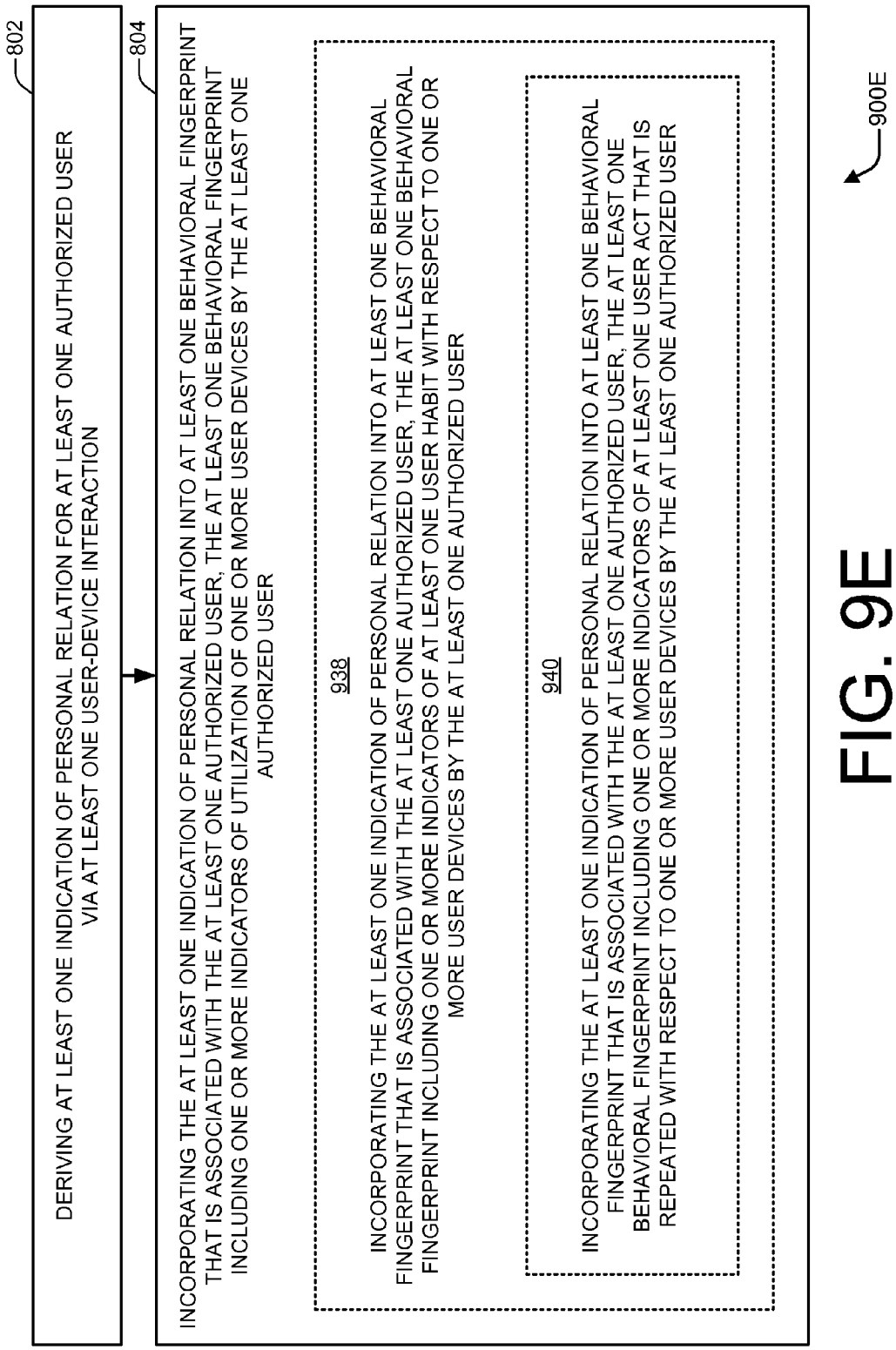

FIG. 9E illustrates a flow diagram 900E having example operations 938 or 940. For certain example embodiments, an operation 938 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of at least one user habit with respect to one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of at least one user habit (e.g., at least one act that is repeated at certain times of the day, on certain days of the week, in a certain manner, at a certain location, a combination thereof, etc.) with respect to one or more user devices 102 by the at least one authorized user. By way of example but not limitation, a retail app (e.g., an app by McDonald's) may incorporate at least one indication of personal relation into at least one behavioral fingerprint that is associated with at least one authorized user, with the at least one behavioral fingerprint including one or more indicators of at least one user habit (e.g., an app executing on a user device may incorporate at least one personal relation indication into a behavioral fingerprint—which behavioral fingerprint may be located on a user device or at a remote server device—that includes at least one indicator of (i) an act—e.g., a purchase of a Big Mac with cheese and a small fry and soft drink—that occurs every Tuesday and Thursday or (ii) an act—e.g., texting a spouse—that occurs every weekday between 10 and 10:30 am) with respect to one or more user devices (e.g., a Nokia Lumia phone is executing an app that enables purchases at McDonald's using the phone) by the at least one authorized user. However, claimed subject matter is not limited to any particular described embodiments, implementations, examples, etc.

For certain example embodiments, an operation 940 may be directed at least partially to wherein the incorporating the at least one indication of personal relation into at least one behavioral fingerprint that is associated with the at least one authorized user, the at least one behavioral fingerprint including one or more indicators of at least one user habit with respect to one or more user devices by the at least one authorized user, (of operation 938) comprises incorporating the at least one indication of personal relation into at least one behavioral fingerprint that is associated with the at least one authorized user, the at least one behavioral fingerprint including one or more indicators of at least one user act that is repeated with respect to one or more user devices by the at least one authorized user. For certain example implementations, at least one device may incorporate at least one indication 706 of personal relation into at least one behavioral fingerprint 110 that is associated with at least one authorized user, with at least one behavioral fingerprint 110 including one or more indicators 708 of at least one user act (e.g., viewing a series of three websites every Saturday and Sunday starting between 9:00 and 9:30 am) that is repeated with respect to one or more user devices 102 by the at least one authorized user. By way of example but not limitation, an OS of a mobile device (e.g., an Apple iOS) may incorporate at least one indication of personal relation into at least one behavioral fingerprint that is associated with at least one authorized user, with the at least one behavioral fingerprint including one or more indicators of at least one user act (e.g., an iPhone or iPad may incorporate at least one personal relation indication into a behavioral fingerprint that includes at least one repeated user act, such as using an iOS device to navigate to a lunch location each weekday starting at 11:00 am) that is repeated with respect to one or more user devices by the at least one authorized user. However, claimed subject matter is not limited to any particular described embodiments, implementations, examples, etc.

Figure 9F:
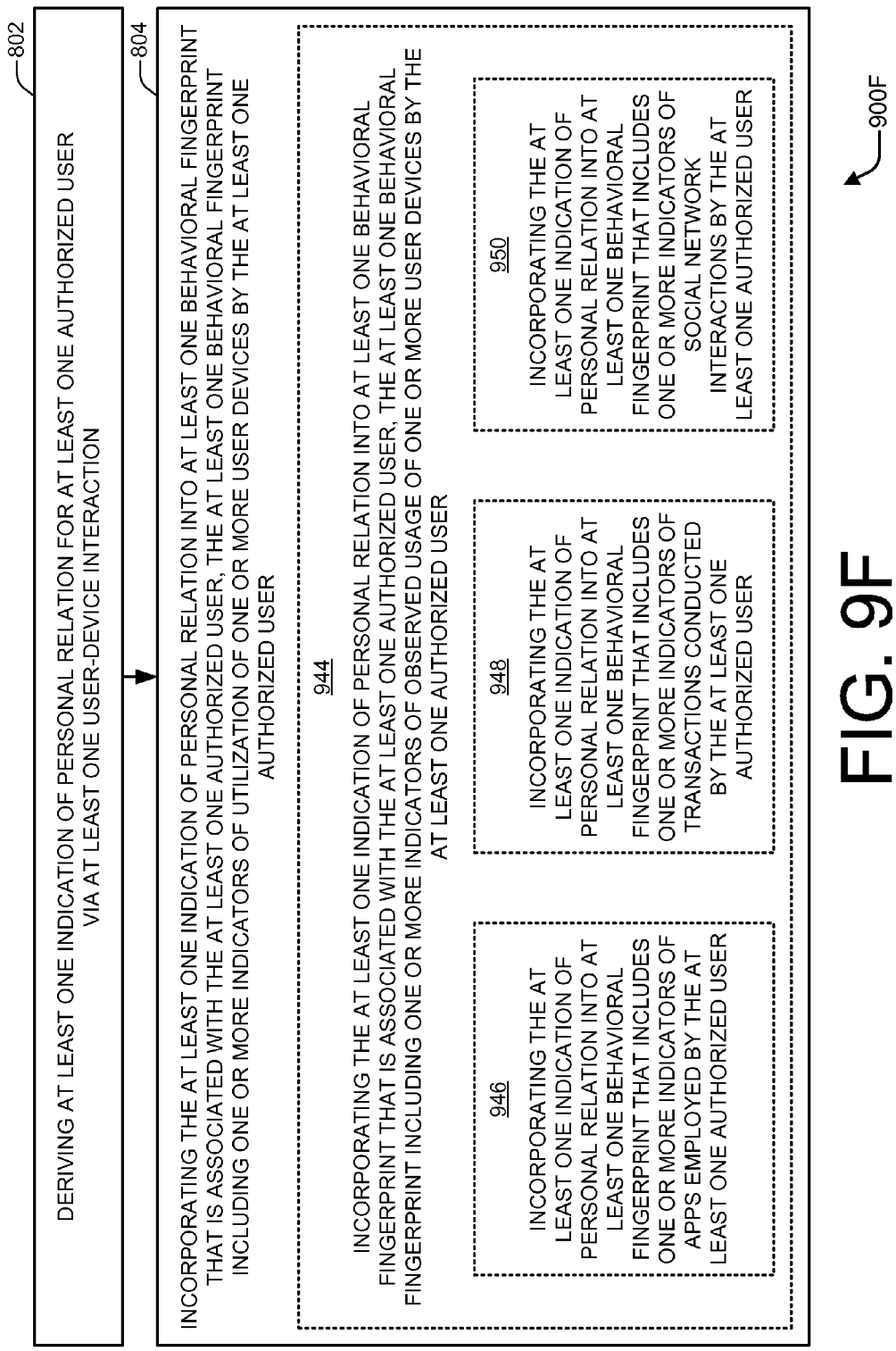

FIG. 9F illustrates a flow diagram 900F having example operations 944, 946, 948, or 950. For certain example embodiments, an operation 944 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of observed usage of one or more user devices by the at least one authorized user. For certain example implementations, at least one device may incorporate at least one indication of personal relation 706 into at least one behavioral fingerprint 110 that is associated with at least one authorized user, with at least one behavioral fingerprint 110 including one or more indicators 708 of observed usage (e.g., user interaction with, communication modes employed, apps employed, transactions conducted, social network interactions carried out, a combination thereof, etc.) of one or more user devices 102 by the at least one authorized user. By way of example but not limitation, a security app on a user device (e.g., a Symantec mobile security app) may incorporate at least one indication of personal relation into at least one behavioral fingerprint that is associated with at least one authorized user, with the at least one behavioral fingerprint including one or more indicators of observed usage of one or more user devices by the at least one authorized user (e.g., a mobile device executing a Symantec mobile security app may incorporate at least one personal relation indication into a behavioral fingerprint that includes at least one user act, such as a list of social network members contacted via at least one social network with the mobile device). However, claimed subject matter is not limited to any particular described embodiments, implementations, examples, etc.

For certain example embodiments, an operation 946 may be directed at least partially to wherein the incorporating the at least one indication of personal relation into at least one behavioral fingerprint that is associated with the at least one authorized user, the at least one behavioral fingerprint including one or more indicators of observed usage of one or more user devices by the at least one authorized user, (of operation 944) comprises incorporating the at least one indication of personal relation into at least one behavioral fingerprint that includes one or more indicators of apps employed by the at least one authorized user. For certain example implementations, at least one device may incorporate at least one indication of personal relation 706 into at least one behavioral fingerprint 110 that includes one or more indicators 708 of apps employed (e.g., an identification of an app, a chronological listing of apps used each day, a duration of interaction for each app, a number of uses per day for a number of apps, a quality of play for a given app, features utilized for a particular app, a list of people contacted with a particular app, a combination thereof, etc.) by at least one authorized user. By way of example but not limitation, a desktop user device (e.g., an Apple iMac or an HP personal computer (PC)) may incorporate at least one indication of personal relation into at least one behavioral fingerprint that includes one or more indicators of apps employed by at least one authorized user (e.g., an OS feature of an iMac, such as a feature of OS X, or of an HP PC, such as a feature of Microsoft Windows 8, may incorporate at least one personal relation indication into a behavioral fingerprint that indicates that Microsoft Office is open or running each day from about 8:00 am to 3:00 pm). However, claimed subject matter is not limited to any particular described embodiments, implementations, examples, etc.

For certain example embodiments, an operation 948 may be directed at least partially to wherein the incorporating the at least one indication of personal relation into at least one behavioral fingerprint that is associated with the at least one authorized user, the at least one behavioral fingerprint including one or more indicators of observed usage of one or more user devices by the at least one authorized user, (of operation 944) comprises incorporating the at least one indication of personal relation into at least one behavioral fingerprint that includes one or more indicators of transactions conducted by the at least one authorized user. For certain example implementations, at least one device may incorporate at least one indication of personal relation 706 into at least one behavioral fingerprint 110 that includes one or more indicators 708 of transactions conducted (e.g., a purchase, an order, a procurement, an exchange of consideration, a combination thereof, etc. that is initiated, concluded, authorized, financed, consummated, a combination thereof, etc.) by at least one authorized user. By way of example but not limitation, a payment authorization cloud service (e.g., an Amazon cloud service for authorizing payments for purchases made through Amazon via a user device) may incorporate at least one indication of personal relation into at least one behavioral fingerprint that includes one or more indicators of transactions conducted by the at least one authorized user (e.g., an Android user device that is in communication with an Amazon server may incorporate at least one personal relation indication into a behavioral fingerprint that includes a list of previous transactions made through Amazon or made with the Android user device). However, claimed subject matter is not limited to any particular described embodiments, implementations, examples, etc.

For certain example embodiments, an operation 950 may be directed at least partially to wherein the incorporating the at least one indication of personal relation into at least one behavioral fingerprint that is associated with the at least one authorized user, the at least one behavioral fingerprint including one or more indicators of observed usage of one or more user devices by the at least one authorized user, (of operation 944) comprises incorporating the at least one indication of personal relation into at least one behavioral fingerprint that includes one or more indicators of social network interactions by the at least one authorized user. For certain example implementations, at least one device may incorporate at least one indication of personal relation 706 into at least one behavioral fingerprint 110 that includes one or more indicators 708 of social network interactions (e.g., social networks logged into or otherwise accessed, social network members contacted, types of social network communication modes employed, times of social network use, social network apps used, games played via a social network, a combination thereof, etc.) by at least one authorized user. By way of example but not limitation, a payment authorization service (e.g., a bank debit card service) that is realized at least partially in a cloud environment may incorporate at least one indication of personal relation into at least one behavioral fingerprint that includes one or more indicators of social network interactions by at least one authorized user (e.g., a Bank of America service that monitors social network interactions of an authorized user may incorporate at least one personal relation indication into a behavioral fingerprint that indicates that the authorized user frequently posts to a particular neighbor's Facebook wall each day between lunch and dinner). However, claimed subject matter is not limited to any particular described embodiments, implementations, examples, etc.

FIG. 9G illustrates a flow diagram 900G having example operations 954 or 956. For certain example embodiments, an operation 954 may be directed at least partially to wherein the incorporating the at least one indication of personal relation into at least one behavioral fingerprint that is associated with the at least one authorized user, the at least one behavioral fingerprint including one or more indicators of utilization of one or more user devices by the at least one authorized user, (of operation 804) comprises incorporating the at least one indication of personal relation into at least one behavioral fingerprint that is associated with the at least one authorized user, the at least one behavioral fingerprint including one or more indicators of at least one observed action by the at least one authorized user with regard to one or more user devices. For certain example implementations, at least one device may incorporate at least one indication of personal relation 706 into at least one behavioral fingerprint 110 that is associated with at least one authorized user, with at least one behavioral fingerprint 110 including one or more indicators 708 of at least one observed action by the at least one authorized user (e.g., a UI action, a user movement, a location visited by a user, a user status alert, an interaction with an online entity or internet destination (e.g., an online game, an online betting activity, a social-networking entity, a combination thereof, etc.), a combination thereof, etc.) with regard to one or more user devices 102. By way of example but not limitation, an app for a user device that enables at least semi-automatic unlocking of real-world objects (e.g., a car or house door based at least partially on proximity of the user device) may incorporate at least one indication of personal relation into at least one behavioral fingerprint that is associated with at least one authorized user, with the at least one behavioral fingerprint including one or more indicators of at least one observed action by the at least one authorized user with regard to one or more user devices (e.g., one or more of the user devices may be executing a locking/unlocking app that may incorporate at least one personal relation indication into a behavioral fingerprint that includes at least one indicator of how a user navigates between apps or at least one indicator of how long a user keeps a user device in motion before a particular door is to be unlocked). However, claimed subject matter is not limited to any particular described embodiments, implementations, examples, etc.

For certain example embodiments, an operation 956 may be directed at least partially to wherein the incorporating the at least one indication of personal relation into at least one behavioral fingerprint that is associated with the at least one authorized user, the at least one behavioral fingerprint including one or more indicators of at least one observed action by the at least one authorized user with regard to one or more user devices, (of operation 954) comprises incorporating the at least one indication of personal relation into at least one behavioral fingerprint that is associated with the at least one authorized user, the at least one behavioral fingerprint including one or more indicators of at least one location visited by the at least one authorized user with regard to one or more user devices. For certain example implementations, at least one device may incorporate at least one indication of personal relation 706 into at least one behavioral fingerprint 110 that is associated with at least one authorized user, with at least one behavioral fingerprint 110 including one or more indicators 708 of at least one location visited (e.g., a virtual location—such as a website or virtual world or location thereof; a physical location—such as an address, coordinates, or an identifiable place like a neighborhood or friend's home; a combination thereof; etc.) by the at least one authorized user with regard to one or more user devices. By way of example but not limitation, an OS of a Sony PC (e.g., Microsoft's Windows 8 of a Sony Vaio) may incorporate at least one indication of personal relation into at least one behavioral fingerprint that is associated with at least one authorized user, with the at least one behavioral fingerprint including one or more indicators of at least one location visited by the at least one authorized user with regard to one or more user devices (e.g., an OS having security features, which may expose an authentication API to an app, may incorporate at least one personal relation indication into a behavioral fingerprint that includes a list of a person's daily destinations to which a user device is carried). However, claimed subject matter is not limited to any particular described embodiments, implementations, examples, etc.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A machine comprising:
   (A) circuitry for deriving at least one indication of personal relation for at least one authorized user via at least one user-device interaction, including at least:
      (1) circuitry for retrieving the at least one indication of personal relation for the at least one authorized user from at least a part of one or more servers operated by or for at least one social network; and
   (B) circuitry for incorporating the at least one indication of personal relation into at least one behavioral fingerprint that is associated with the at least one authorized user, the at least one behavioral fingerprint including at least one or more indicators of utilization of one or more user devices by the at least one authorized user.

2. The maching of claim 1, wherein the circuitry for deriving at least one indication of personal relation for at least one authorized user via at least one user-device interaction comprises:
   circuitry for monitoring one or more internet destinations visited by at least one user.

3. The machine of claim 2, wherein the circuitry for monitoring one or more internet destinations visited by at least one user comprises:
   circuitry for monitoring the one or more internet destinations visited by at least one user via at least one browser.

4. The machine of claim 3, wherein the circuitry for monitoring the one or more internet destinations visited by at least one user via at least one browser comprises:
   circuitry for monitoring the one or more internet destinations visited by at least one user using one or more browser modules.

5. The machine of claim 4, wherein the circuitry for monitoring the one or more internet destinations visited by at least one user using one or more browser modules comprises:
   circuitry for identifying the one or more internet destinations visited by at least one user using at least one browser plug-in.

6. The machine of claim 2, wherein the circuitry for monitoring one or more internet destinations visited by at least one user comprises:

circuitry for ascertaining at least one category of the one or more internet destinations visited by at least one user.

7. The machine of claim 6, wherein the circuitry for ascertaining at least one category of the one or more internet destinations visited by at least one user comprises:
   circuitry for comparing at least one of an internet destination name or an internet destination address to one or more entries in at least one internet destination categorization database.

8. The machine of claim 6, wherein the circuitry for ascertaining at least one category of the one or more internet destinations visited by at least one user comprises:
   circuitry for searching for at least one association of one or more internet destinations with one or more characteristics of internet destination visitors.

9. The machine of claim 2, wherein the circuitry for monitoring one or more internet destinations visited by at least one user comprises:
   circuitry for deducing that at least one personal relation includes at least one child based at least partially on at least one internet destination categorization.

10. The machine of claim 2, wherein the circuitry for monitoring one or more internet destinations visited by at least one user comprises:
    circuitry for deducing that at least one personal relation includes at least one senior citizen based at least partially on at least one internet destination categorization.

11. The machine of claim 2, wherein the circuitry for monitoring one or more internet destinations visited by at least one user comprises:
    circuitry for deducing that at least one personal relation includes at least one mother based at least partially on at least one internet destination categorization.

12. The machine of claim 2, wherein the circuitry for monitoring one or more internet destinations visited by at least one user comprises:
    circuitry for deducing that at least one personal relation includes at least one female relation based at least partially on at least one internet destination categorization.

13. The machine of claim 2, wherein the circuitry for monitoring one or more internet destinations visited by at least one user comprises:
    circuitry for deducing that at least one personal relation includes at least one male relation based at least partially on at least one internet destination categorization.

14. The machine of claim 2, wherein the circuitry for monitoring one or more internet destinations visited by at least one user comprises:
    circuitry for monitoring the one or more internet destinations visited by at least one user via at least one operating system.

15. The machine of claim 2, wherein the circuitry for monitoring one or more internet destinations visited by at least one user comprises:
    circuitry for monitoring the one or more internet destinations visited by at least one user via at least one security application.

16. The machine of claim 2, wherein the circuitry for monitoring one or more internet destinations visited by at least one user comprises:
    circuitry for monitoring when the one or more internet destinations are visited by the at least one user.

17. The machine of claim 2, wherein the circuitry for monitoring one or more internet destinations visited by at least one user comprises:
    circuitry for detecting at least one pattern that relates (i) when the one or more internet destinations are visited by the at least one user and (ii) at least one categorization of the one or more internet destinations.

18. The machine of claim 1, wherein the circuit for deriving at least one indication of personal relation for at least one authorized user via at least one user-device interaction comprises:
    circuitry for monitoring one or more search terms provided by at least one user.

19. The machine of claim 17, wherein the circuitry for monitoring one or more search terms provided by at least one user comprises:
    circuitry for monitoring the one or more search terms provided by at least one user via at least one browser.

20. The machine of claim 19, wherein the circuitry for monitoring the one or more search terms provided by at least one user via at least one browser comprises:
    circuitry for monitoring the one or more search terms provided by at least one user using one or more browser modules.

21. The machine of claim 20, wherein the circuitry for monitoring the one or more search terms provided by at least one user using one or more browser modules comprises:
    circuitry for identifying the one or more search terms provided by at least one user using at least one search tool bar.

22. The machine of claim 18, wherein the circuitry for monitoring one or more search terms provided by at least one user comprises:
    circuitry for ascertaining a category of the one or more search terms provided by at least one user.

23. The machine of claim 22, wherein the circuitry for ascertaining a category of the one or more search terms provided by at least one user comprises:
    circuitry for comparing at least one search term to one or more entries in a search term categorization database.

24. The machine of claim 22, wherein the circuitry for ascertaining a category of the one or more search terms provided by at least one user comprises:
    circuitry for searching for at least one association of one or more search terms with one or more characteristics of search users.

25. The machine of claim 18, wherein the circuitry for monitoring one or more search terms provided by at least one user comprises:
    circuitry for deducing that the at least one user corresponds to at least one personal relation with respect to the at least one authorized user based at least partially on at least one search term categorization.

26. The machine of claim 18, wherein the circuitry for monitoring one or more search terms provided by at least one user comprises:
    circuitry for monitoring the one or more search terms provided by at least one user via at least one operating system.

27. The machine of claim 18, wherein the circuitry for monitoring one or more search terms provided by at least one user comprises:
    circuitry for monitoring the one or more search terms provided by at least one user to at least one user device via at least one application that at least partially executes on and provides security functions for the at least one user device.

28. The machine of claim 18, wherein the circuitry for monitoring one or more search terms provided by at least one user comprises:

circuitry for monitoring the one or more search terms provided by at least one user, the one or more search terms provided for at least one of an intranet search or an internet search.

29. The machine of claim 18, wherein the circuitry for monitoring one or more search terms provided by at least one user comprises:
   circuitry for monitoring the one or more search terms provided by at least one user, the one or more search terms provided for a local search of a user device.

30. The machine of claim 1, wherein the circuitry for deriving at least one indication of personal relation for at least one authorized user via at least one user-device interaction comprises at least one of:
   circuitry for identifying one or more internet destinations visited by at least one user; or
   circuitry for obtaining one or more search terms provided by the at least one user.

31. The machine of claim 1, wherein the circuitry for deriving at least one indication of personal relation for at least one authorized user via at least one user-device interaction comprises:
   circuitry for receiving at least a representation of the at least one user-device interaction from a user device.

32. The machine of claim 1, wherein the circuitry for deriving at least one indication of personal relation for at least one authorized user via at least one user-device interaction comprises:
   circuitry for deducing the at least one indication of personal relation for the at least one authorized user based at least partially on at least one of one or more visited internet destinations or one or more provided search terms.

33. The machine of claim 32, wherein the circuitry for deducing the at least one indication of personal relation for the at least one authorized user based at least partially on at least one of one or more visited internet destinations or one or more provided search terms comprises:
   circuitry for determining at least an age range for the at least one indication of personal relation based at least partially on the one or more visited internet destinations and based at least partially on the one or more provided search terms.

34. The machine of claim 32, wherein the circuitry for deducing the at least one indication of personal relation for the at least one authorized user based at least partially on at least one of one or more visited internet destinations or one or more provided search terms comprises:
   circuitry for altering the at least one indication of personal relation as deduced based at least partially on the one or more visited internet destinations responsive to the one or more provided search terms.

35. The machine of claim 1, wherein the circuitry for deriving at least one indication of personal relation for at least one authorized user via at least one user-device interaction comprises:
   circuitry for obtaining from at least one social network the at least one indication of personal relation for the at least one authorized user via at least one social-networking-related user-device interaction.

36. The machine of claim 35, wherein the circuitry for obtaining from at least one social network the at least one indication of personal relation for the at least one authorized user via at least one social-networking-related user-device interaction comprises:
   circuitry for obtaining from the at least one social network the at least one indication of personal relation for the at least one authorized user from profile data that is associated with an account for the at least one authorized user with the at least one social network.

37. The machine of claim 1, wherein the circuitry for deriving at least one indication of personal relation for at least one authorized user via at least one user-device interaction comprises:
   circuitry for obtaining from at least one social network application the at least one indication of personal relation for the at least one authorized user via at least one social-networking-related user-device interaction.

38. The machine of claim 1, wherein the circuitry for for deriving at least one indication of personal relation for at least one authorized user via at least one user-device interaction comprises:
   circuitry for obtaining from at least one social network communication the at least one indication of personal relation for the at least one authorized user via at least one social networking user-device interaction.

39. The machine of claim 1, wherein the circuitry for deriving at least one indication of personal relation for at least one authorized user via at least one user-device interaction comprises:
   circuitry for obtaining from at least one membership grouping of at least one social network the at least one indication of personal relation for the at least one authorized user via at least one social-networking-related user-device interaction.

40. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user comprises:
   circuitry for performing at least one authentication-related determination with respect to at least one user of one or more user devices based at least partially on at least one behavioral fingerprint.

41. The machine of claim 40, wherein the circuitry for performing at least one authentication-related determination with respect to at least one user of one or more user devices based at least partially on at least one behavioral fingerprint comprises:
   circuitry for determining at least one degree to which at least one user of one or more user devices is identified as at least one authorized user of the one or more user devices.

42. The machine of claim 37, wherein the circuitry for obtaining from at least one social network application the at least one indication of personal relation for the at least one authorized user via at least one social-networking-related user-device interaction comprises:
   circuitry for obtaining from at least one social network mobile application the at least one indication of personal relation for the at least one authorized user via the at least one social-networking-related user-device interaction.

43. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
   circuitry for adding the at least one indication of personal relation to the at least one behavioral fingerprint that is associated with the at least one authorized user.

44. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for confirming that the at least one behavioral fingerprint that is associated with the at least one authorized user includes at least the at least one indication of personal relation.

45. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of accessing one or more user devices by the at least one authorized user.

46. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of interacting with one or more user devices by the at least one authorized user.

47. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of movement of one or more user devices by the at least one authorized user.

48. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of providing input to one or more user devices by the at least one authorized user.

49. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of communicating via one or more user devices by the at least one authorized user.

50. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of software application execution on one or more user devices by the at least one authorized user.

51. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of effecting at least one transaction via one or more user devices by the at least one authorized user.

52. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of at least one user act that is repeated with respect to one or more user devices by the at least one authorized user.

53. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:
  circuitry for incorporating the at least one indication of personal relation into at least one behavioral fingerprint that is associated with the at least one authorized user, the at least one behavioral fingerprint including at least one or more indicators of observed usage of one or more user devices by the at least one authorized user.

54. The machine of claim 53, wherein the circuitry for incorporating the at least one indication of personal relation into at least one behavioral fingerprint that is associated with the at least one authorized user, the at least one behavioral fingerprint including at least one or more indicators of observed usage of one or more user devices by the at least one authorized user, comprises:

circuitry for incorporating the at least one indication of personal relation into at least one behavioral fingerprint that includes at least one or more indicators of apps employed by the at least one authorized user.

55. The machine of claim 53, wherein the circuitry for incorporating the at least one indication of personal relation into at least one behavioral fingerprint that is associated with the at least one authorized user, the at least one behavioral fingerprint including at least one or more indicators of observed usage of one or more user devices by the at least one authorized user, comprises:

circuitry for incorporating the at least one indication of personal relation into at least one behavioral fingerprint that includes at least one or more indicators of transactions conducted by the at least one authorized user.

56. The machine of claim 53, wherein the circuitry for incorporating the at least one indication of personal relation into at least one behavioral fingerprint that is associated with the at least one authorized user, the at least one behavioral fingerprint including at least one or more indicators of observed usage of one or more user devices by the at least one authorized user, comprises:

circuitry for incorporating the at least one indication of personal relation into at least one behavioral fingerprint that includes at least one or more indicators of social network interactions by the at least one authorized user.

57. The machine of claim 1, wherein the circuitry for incorporating the at least one indication of personal relation into at least one behavioral fingerprint that is associated with the at least one authorized user, the at least one behavioral fingerprint including at least one or more indicators of utilization of one or more user devices by the at least one authorized user, comprises:

circuitry for incorporating the at least one indication of personal relation into at least one behavioral fingerprint that is associated with the at least one authorized user, the at least one behavioral fingerprint including at least one or more indicators of at least one location visited by the at least one authorized user with regard to one or more user devices.

58. The machine of claim 1, wherein the machine forms at least part of at least one of: (i) one or more user devices or (ii) one or more servers.

59. A machine comprising:
(A) circuitry for deriving at least one indication of personal relation for at least one authorized user via at least one user-device interaction, including at least:
  (1) circuitry for altering the at least one indication of personal relation as deduced based at least partially on one or more provided search terms responsive to one or more visited internet destinations; and
(B) circuitry for incorporating the at least one indication of personal relation into at least one behavioral fingerprint that is associated with the at least one authorized user, the at least one behavioral fingerprint including at least one or more indicators of utilization of one or more user devices by the at least one authorized user.

60. A machine comprising:
(A) means for deriving at least one indication of personal relation for at least one authorized user via at least one user-device interaction, including at least:
  (1) means for retrieving the at least one indication of personal relation for the at least one authorized user from at least a part of one or more servers operated by or for at least one social network; and
(B) means for incorporating the at least one indication of personal relation into at least one behavioral fingerprint that is associated with the at least one authorized user, the at least one behavioral fingerprint including at least one or more indicators of utilization of one or more user devices by the at least one authorized user,
wherein at least one of the means for deriving or the means for incorporating is at least partially implemented using one or more processing devices.

\* \* \* \* \*

UNITED STATES PATENT AND TRADEMARK OFFICE
CERTIFICATE OF CORRECTION

PATENT NO. : 9,015,860 B2  Page 1 of 1
APPLICATION NO. : 13/631667
DATED : April 21, 2015
INVENTOR(S) : Marc E. Davis et al.

It is certified that error appears in the above-identified patent and that said Letters Patent is hereby corrected as shown below:

Claims

At Column 62, Lines 9, Claim 19 please replace "The machine in claim 17, wherein the circuitry for" with -- The machine in claim 18, wherein the circuitry for --

Signed and Sealed this
Twelfth Day of July, 2016

Michelle K. Lee
*Director of the United States Patent and Trademark Office*